(12) United States Patent (10) Patent No.: US 12,335,246 B2
Lim et al. (45) Date of Patent: Jun. 17, 2025

(54) METHOD AND DEVICE FOR ONLINE MOVING OF BUNDLES OR PROFILES BETWEEN DEVICES

(71) Applicant: Samsung Electronics Co., Ltd., Gyeonggi-do (KR)

(72) Inventors: Taehyung Lim, Gyeonggi-do (KR); Jonghoe Koo, Gyeonggi-do (KR); Kangjin Yoon, Gyeonggi-do (KR); Duckey Lee, Gyeonggi-do (KR); Hyewon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 361 days.

(21) Appl. No.: 17/911,081

(22) PCT Filed: Mar. 16, 2021

(86) PCT No.: PCT/KR2021/003252
§ 371 (c)(1),
(2) Date: Sep. 12, 2022

(87) PCT Pub. No.: WO2021/187874
PCT Pub. Date: Sep. 23, 2021

(65) Prior Publication Data
US 2023/0136288 A1 May 4, 2023

(30) Foreign Application Priority Data
Mar. 16, 2020 (KR) .................. 10-2020-0032054
Jul. 15, 2020 (KR) .................. 10-2020-0087663

(51) Int. Cl.
*H04L 9/40* (2022.01)
(52) U.S. Cl.
CPC ...... *H04L 63/0442* (2013.01); *H04L 63/0823* (2013.01)

(58) Field of Classification Search
CPC .. H04L 63/0442; H04L 63/0823; G06F 21/32
(Continued)

(56) References Cited

U.S. PATENT DOCUMENTS 9,730,060 B2 * 8/2017 Kim .................. H04W 8/18
10,285,050 B2 5/2019 Park et al.
(Continued)

FOREIGN PATENT DOCUMENTS

KR 1020130033388 4/2013
KR 1020170098110 8/2017
(Continued)

OTHER PUBLICATIONS

ETSI TS 103 465 V15.0.0, ETSI, Smart Cards; Smart Secure Platform (SSP); Requirements Specification, May 30, 2019, 52 pages.
(Continued)

*Primary Examiner* — Samson B Lemma
(74) *Attorney, Agent, or Firm* — The Farrell Law Firm, P.C.

(57) ABSTRACT

A first terminal for providing a bundle to a second terminal in a wireless communication system, includes: a transceiver; and at least one processor configured to: obtain information about the bundle to be transmitted to the second terminal; based on bundle transfer configuration information including an indicator indicating whether the first terminal is able to transmit a bundle to another terminal, determine that the first terminal is able to transmit the bundle to the second terminal; generate a bundle transmission code including identification information of the bundle to be transmitted to the second terminal; transmit the generated bundle transmission code to the second terminal; and upload the bundle to be transmitted to the second terminal to a bundle management server.

15 Claims, 25 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 10,439,823 | B2* | 10/2019 | Park | H04L 9/3066 |
| 11,729,622 | B2* | 8/2023 | Kang | H04W 12/40 |
| | | | | 455/411 |
| 2011/0320608 | A1* | 12/2011 | Nelakonda | H04L 12/00 |
| | | | | 709/226 |
| 2016/0127132 | A1* | 5/2016 | Lee | H04L 9/0819 |
| | | | | 713/156 |
| 2016/0301529 | A1* | 10/2016 | Park | H04W 8/205 |
| 2018/0248971 | A1* | 8/2018 | Park | H04L 9/0891 |
| 2021/0011737 | A1* | 1/2021 | Yu | H04L 67/34 |
| 2021/0120424 | A1 | 4/2021 | Kang et al. | |

FOREIGN PATENT DOCUMENTS

| | | |
|---|---|---|
| WO | WO 2016/167551 | 10/2016 |
| WO | WO 2020/004901 | 1/2020 |

OTHER PUBLICATIONS

International Search Report dated Jun. 28, 2021 issued in counterpart application No. PCT/KR2021/003252, 19 pages.

* cited by examiner

METHOD AND DEVICE FOR ONLINE MOVING OF BUNDLES OR PROFILES BETWEEN DEVICES

PRIORITY

This application is a National Phase Entry of PCT International Application No. PCT/KR2021/003252, which was filed on Mar. 16, 2021, and claims priority to Korean Patent Application Nos. 10-2020-0032054 and 10-2020-0087663, which were filed on Mar. 16, 2020 and Jul. 15, 2020, respectively, the entire content of each of which is incorporated herein by reference.

TECHNICAL FIELD

The disclosure relates to a smart secure medium, and more particularly, to a method and apparatus for transferring, online, a bundle or profile between smart secure media.

BACKGROUND ART

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce propagation path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and received-interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

Various attempts have been made to apply 5G communication systems to IoT networks. For example, technology such as sensor network, M2M communication, or MTC is implemented by 5G communication technology such as beamforming, MIMO, or array antenna. The application of a cloud radio access network (RAN) as big data processing technology may also be considered as an example of convergence of 5G technology and IoT technology.

As described above, various services are able to be provided due to the development of mobile communication systems, and thus, there is need for methods of effectively providing such services. For example, a method of safely efficiently transferring, online, a bundle or profile (or profile package) between two devices is required.

DESCRIPTION OF EMBODIMENTS

Technical Problem

Provided are an apparatus and method enabling a reliable bundle or profile online transfer service when a bundle or profile is to be transferred online between security modules included in two electronic devices.

Solution to Problem

According to an embodiment of the disclosure, a first terminal for providing a bundle to a second terminal in a wireless communication system, obtains information about the bundle to be transmitted to the second terminal, based on bundle transfer configuration information including an indicator indicating whether the first terminal is able to transmit a bundle to another terminal, determines that the first terminal is able to transmit the bundle to the second terminal, generates a bundle transmission code including identification information of the bundle to be transmitted to the second terminal, transmits the generated bundle transmission code to the second terminal, and uploads the bundle to be transmitted to the second terminal to a bundle management server, wherein the bundle to be transmitted to the second terminal may be installed in the second terminal by being transmitted to the second terminal through the bundle management server.

Advantageous Effects of Disclosure

According to various embodiments of the disclosure, a bundle or profile installed in one device can be transmitted online to another device or installed in the other device through a safe and efficient method.

BEST MODE

Figure 1:
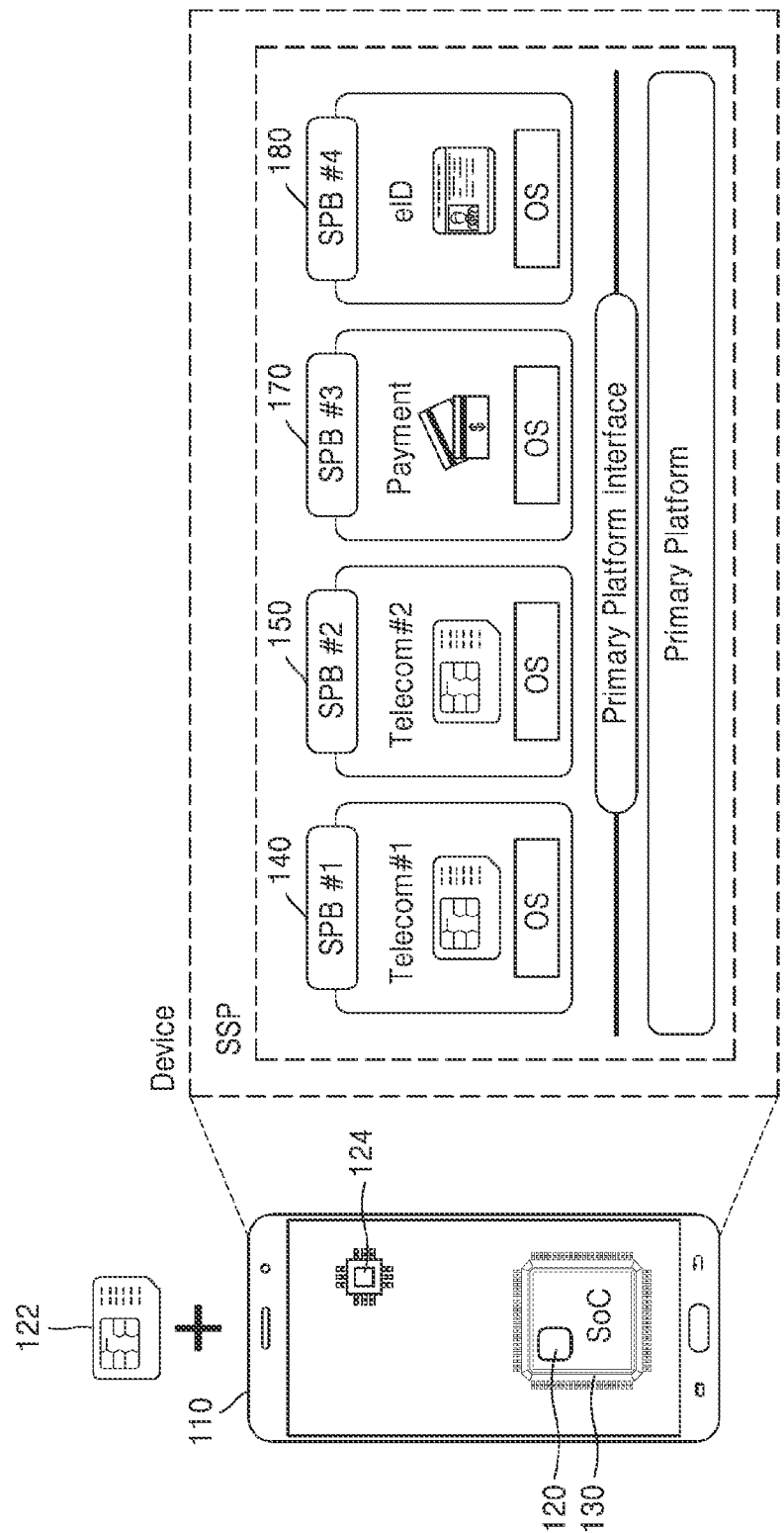
FIG. 1 illustrates a conceptual diagram of a smart secure platform (SSP) according to an embodiment of the disclosure.

According to an embodiment of the disclosure, a first terminal for providing a bundle to a second terminal in a wireless communication system includes a transceiver, and at least one processor. The at least one processor may be configured to obtain information about the bundle to be transmitted to the second terminal, based on bundle transfer configuration information including an indicator indicating whether the first terminal is able to transmit a bundle to another terminal, determine that the first terminal is able to transmit the bundle to the second terminal, generate a bundle transmission code including identification information of the bundle to be transmitted to the second terminal, transmit the generated bundle transmission code to the second terminal; and upload the bundle to be transmitted to the second terminal to a bundle management server, wherein the bundle to be transmitted to the second terminal is installed in the second terminal by being transmitted to the second terminal through the bundle management server.

The bundle transfer configuration information may include at least one of information about a condition required for bundle transmission between the first terminal and the second terminal, or an indicator indicating whether bundle transmission between the first terminal and the second terminal through the bundle management server is allowed.

The identification information of the bundle may include at least one of an identity (ID), a bundle family ID (Fid), or a bundle family custodian object ID (Oid) of the bundle to be transmitted to the second terminal, and the bundle transmission code may further include at least one of information related to an attribute of the bundle to be transmitted to the second terminal, an address of the bundle management server, information for connecting the first terminal to the second terminal, or encryption algorithm information supported by the first terminal.

The at least one processor may be further configured to transmit, to the bundle management server, bundle transfer authentication information including at least one of first smart secure platform (SSP) information of the first terminal, certificate negotiation information for authentication between the first terminal and the bundle management server, or version information of the first SSP, receive server authentication information from the bundle management server, based on the transmitted bundle transfer authentication information, transmit, to the bundle management server, first terminal authentication information and a bundle ID of the bundle to be transmitted to the second terminal, based on the received server authentication information, receive a bundle request message from the bundle management server, in response to the bundle management server determining, based on the first terminal authentication information, the first terminal as a terminal capable of transmitting the bundle to be transmitted to the second terminal, and upload the bundle to be transmitted to the second terminal to the bundle management server, based on the received bundle request message.

According to another embodiment of the disclosure, a second terminal for receiving a bundle from a first terminal in a wireless communication system includes a transceiver, and at least one processor. The at least one processor may be configured to receive, from the first terminal, a bundle transmission code including identification information of the bundle to be received by the second terminal, perform an authentication procedure with the bundle management server, based on the received bundle transmission code, transmit, to the bundle management server, information of the bundle to be received, in response to the authentication procedure with the bundle management server being successfully performed, and receive first bundle and first bundle information, in response to the bundle management server determining that a bundle received by the second terminal corresponds to the bundle to be received.

The identification information of the bundle to be received by the second terminal may include at least one of an identity (ID), a bundle family ID (Fid), or a bundle family custodian object ID (Oid) of the bundle to be received by the second terminal, and the bundle transmission code may further include at least one of information related to an attribute of the bundle to be received by the second terminal, an address of the bundle management server, information for connecting the first terminal and the second terminal, or encryption algorithm information supported by the first terminal.

The at least one processor may be further configured to transmit, to the bundle management server, second smart secure platform (SSP) information including certificate negotiation information for authentication between the bundle management server and a second SSP of the second terminal, receive, from the bundle management server, server authentication information generated by the bundle management server based on the second SSP information, transmit, to the bundle management server, second terminal information including an ID of the second SSP and an ID of the bundle to be received, based on the server authentication information, and receive, from the bundle management server, the first bundle and the first bundle information, in response to the bundle management server determining that an ID of the second SSP received from the first terminal and the identification information of the bundle to be received by the second terminal respectively correspond to the ID of the second SSP received from the second terminal and the ID of the bundle to be received.

The bundle management server may determine the second terminal as a terminal capable of receiving a bundle from another terminal, based on bundle transfer configuration information, and the bundle management server may determine the bundle to be received as a bundle capable of being installed in the second terminal.

According to another embodiment of the disclosure, a first terminal for providing a profile to a second terminal in a wireless communication system includes a transceiver, and at least one processor. The at least one processor is configured to determine a first profile to be transmitted to the second terminal from among profiles installed in the first terminal, determine that the first profile is capable of being transmitted to the second terminal through a profile management server, based on profile transfer configuration information including an identity (ID) of an embedded universal integrated circuit card (eUICC) of the second terminal, transmit, to the profile management server, first terminal authentication information including a first profile ID and eUICC ID of the first terminal, in response to verifying the profile management server, receive a profile request message from the profile management server, in response to the profile management server verifying that the first terminal is using the first profile, by using the first profile ID and eUICC ID of the first terminal, and transmit, to the profile management server, a profile package for the first profile, based on the profile request message.

The at least one processor may be further configured to receive, from the second terminal, the profile transfer configuration information including the ID of the eUICC and eUICC information of the second terminal, wherein the eUICC information of the second terminal may include information used to determine whether a profile to be received from the first terminal is capable of being normally installed and operated in the eUICC of the second terminal.

The at least one processor may be further configured to transmit the eUICC information of the first terminal to the profile management server, receive server authentication information of the profile management server, generated by the profile management server based on the eUICC information of the first terminal, and verify the profile management server based on the eUICC information of the first terminal and the server authentication information of the profile management server.

The profile package may include at least one of information about the first profile, first encryption key generation information used by the first terminal to encode the first profile, a first public key of the first terminal, second encryption key generation information used by the profile management server to encode the first profile, or a second public key of the profile management server.

According to another embodiment of the disclosure, a second terminal for receiving a profile from a first terminal in a wireless communication system includes a transceiver, and at least one processor. The at least one processor may be configured to transmit, to the first terminal, profile transfer configuration information including an identity (ID) of an embedded universal integrated circuit card (eUICC) of the second terminal, transmit eUICC information of the second terminal to a profile management server, receive authentication information of the profile management server, based on the eUICC information of the second terminal, transmit, to the profile management server, second terminal authentication information including an ID of a profile to be received and an eUICC ID of the second terminal, in response to verifying the profile management server based on the authentication information of the profile management server, and receive a profile package for a first profile from the profile management server, based on the second terminal authentication information.

The second terminal authentication information may include information used to determine whether a profile to be received from the first terminal is capable of being normally installed and operated in the eUICC of the second terminal.

The profile package may include at least one of information about the first profile, first encryption key generation information used by the first terminal to encode the first profile, a first public key of the first terminal, second encryption key generation information used by the profile management server to encode the first profile, or a second public key of the profile management server, and the at least one processor may be further configured to, when the received profile package for the first profile is encoded by the first terminal, decode the profile package for the first profile by using the first public key of the first terminal and a secret key of the second terminal, and when the received profile package for the first profile is encoded by the profile management server, decode the profile package for the first profile by using the second public key of the profile management server and the secret key of the second terminal.

Mode of Disclosure

Hereinafter, embodiments of the disclosure will be described with reference to accompanying drawings.

In describing the embodiments, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments are provided so that this disclosure will be thorough and complete and will fully convey the concept of the present embodiments of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks shown in succession may in fact be executed substantially concurrently or the blocks may sometimes be executed in the reverse order, depending upon the functionality involved.

Here, the term "unit" used in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card.

Hereinafter, a base station is an entity that allocates resources to a terminal, and may be at least one of a gNode B (gNB), an eNode B (eNB), a Node B (NB), a base station (BS), a wireless access unit, a BS controller, or a node on a network. Examples of a terminal may include user equipment (UE), a mobile station (MS), a cellular phone, a smartphone, a computer, and a multimedia system capable of performing a communication function. The disclosure is not limited to the above examples. Hereinafter, a technique for a terminal to receive broadcast information from a base station in a wireless communication system will be described. The disclosure relates to a communication technique and system for converging a $5^{th}$ generation (5G) communication system for supporting a higher data rate than a beyond 4th generation (4G) system with an Internet of Things (IoT) technology. The disclosure may be applied to intelligent services (e.g., smart homes, smart buildings, smart cities, smart cars or connected cars, health care, digital education, retail business, and security and safety related services) based on 5G communication technology and IoT related technology.

Hereinbelow, terms indicating broadcast information, terms indicating control information, terms related to communication coverage, terms indicating a change in a state (for example, an event), terms indicating network entities, terms indicating messages, and terms indicating components of an apparatus are exemplified for convenience of descriptions. Thus, the terms used in the disclosure are not limited and other terms having the same technical meanings may be used.

Hereinafter, for convenience of descriptions, some of terms and names defined by the 3rd generation partnership project long term evolution (3GPP LTE) standard may be used. However, the disclosure is not limited by such terms and names, and may be equally applied to systems conforming to other standards.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or an MS) transmits data or a control signal to a base station (BS) (e.g., eNode B), and the DL refers to a radio link through which a BS transmits data or a control signal to a terminal. The multiple access scheme as described above normally allocates and operates time-frequency resources for carrying data or control information of different users to prevent the time-frequency resources from overlapping with each other, that is, establish orthogonality therebetween, thereby identifying the data or the control information of each user.

As a future communication system after the LTE system, that is, a 5G communication system, has to be able to freely reflect various requirements of a user and a service provider, and thus, services satisfying various requirements need to be supported. The services considered for the 5G communication system include enhanced mobile broadband (eMBB), massive machine type communication (mMTC), ultra reliability low latency communication (hereinafter, URLLC), etc.

According to some embodiments, the eMBB aims to provide a higher data rate than a data rate supported by the LTE, LTE-A, or LTE-Pro system. For example, in the 5G communication system, the eMBB should be able to provide a peak data rate of 20 Gbps in the DL and a peak data rate of 10 Gbps in the UL from the viewpoint of one BS. At the same time, the eMBB should provide an increased user perceived data rate. In order to satisfy such requirements, improvement of various transmitting/receiving technologies including a further improved multiple-input and multiple-output (MIMO) transmission technology may be demanded. Also, the eMBB may satisfy a data rate required in the 5G communication system by using a frequency bandwidth wider than 20 MHz in a frequency band of 3 to 6 GHz or equal to or greater than 6 GHz instead of 2 GHz used by current LTE.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal may require a wider coverage than other services provided by the 5G communication system. The terminals that support the mMTC should be configured as inexpensive terminals and require very long battery lifetime because it is difficult to frequently replace batteries of the terminals.

Finally, the URLLC that is a cellular-based wireless communication service used for mission-critical purposes needs to provide communication providing ultra-low latency and ultra-high reliability as a service used in remote control for robots or machinery, industrial automation, unmanaged aerial vehicles, remote health care, or emergency alert. For example, a service supporting the URLLC should satisfy air interface latency smaller than 0.5 milliseconds and at the same time, requires a packet error rate of $10^{-5}$ or less. Accordingly, for the service supporting the URLLC, the 5G communication system is required to provide a transmit time interval (TTI) shorter than those for other services while allocating a broad resource in a frequency band. However, the mMTC, URLLC, and eMBB are examples of different service types, and service types to which the disclosure is applied are not limited thereto.

The services considered in the 5G communication system described above may be converted with each other and provided based on one framework. In other words, for efficient resource management and control, services may be integrated, controlled, and transmitted via one system instead of being independently operated.

Also, hereinbelow, one or more embodiments of the disclosure will be described as an example of an LTE, LTE-A, LTE Pro, or new radio (NR) system, but the one or more embodiments of the disclosure may also be applied to other communication systems having a similar technical background or channel form. Furthermore, embodiments of the disclosure are applicable to other communication systems through modification at the discretion of one of ordinary skill in the art without greatly departing from the scope of the disclosure.

In the disclosure, the modifiers, such as first, second, and the like, indicating terms may be used to distinguish the terms from each other while describing embodiments. The terms modified by the modifiers, such as first, second, and the like, may refer to different objects. Alternatively, the terms modified by the modifiers, such as first, second, and the like, may refer to a same object. In other words, the modifiers, such as first, second, and the like, may be used to refer to the same object from different perspectives. For example, the modifiers, such as first, second, and the like, may be used to distinguish the same object in terms of functions or operations. For example, a first user and a second user may refer to a same user.

Also, in the disclosure, each embodiment is described with an example of a smart secure platform (SSP) as a secure medium, but the scope of right of the disclosure is not limited by the SSP. For example, it would be obvious to one of ordinary skill in the art that various embodiments described below may be applied substantially identically or similarly to another secure medium performing substantially same or similar functions as the SSP.

Specific terms used in the description below are provided in order to help understanding the disclosure, and the specific terms may be changed to other forms within a range of the technical idea of the disclosure.

A secure element (SE) denotes a security module including a single chip capable of storing security information (for example, mobile communication network access key, user identification information such as identification card/passport, credit card information, or an encryption key), and loading and operating a control module (for example, a network access control module such as a universal subscriber identity module (USIM), an encryption module, or a key generation module) using the stored security information. The SE may be used in various electronic devices (for example, a smartphone, a tablet computer, a wearable device, a vehicle, and an IoT device), and provide a security service (for example, an access to a mobile communication network, payment, or user authentication) through the security information and control module.

The SE may be classified into a universal integrated circuit card (UICC), an embedded secure element (eSE), or an SSP in which a UICC and an eSE are integrated, and may be divided into a removable type, an embedded type, or an integrated type integrated to a specific device or a system-on-chip (SoC), depending on how the SE is connected to or installed in an electronic device.

A universal integrated circuit card (UICC) is a smart card inserted into a mobile communication terminal or the like to be used, and is also called a UICC card. The UICC may include an access control module for accessing a network of a mobile operator. Examples of the access control module include a universal subscriber identity module (USIM), a subscriber identity module (SIM), and an internet protocol (IP) multimedia service identity module (ISIM). The UICC including the USIM may also be generally referred to as a USIM card. Similarly, the UICC including the SIM may also be generally referred to as a SIM card. Meanwhile, the SIM may be mounted while the UICC is manufactured, or the SIM of a mobile communication service to be used may be downloaded to the UICC when a user desires. Also, a plurality of SIMs may be downloaded to and installed in the UICC, and at least one of the SIMs may be selected and used. The UICC may be fixed or not fixed to a terminal. The UICC that is used by being fixed to the terminal is referred to as an embedded UICC (eUICC), and in particular, a UICC embedded in an SoC including a communication processor, an application processor, or a single processor structure in which these two processors are integrated is referred to as an integrated UICC (iUICC). In general, the eUICC and the iUICC may denote a UICC that is used by being fixed to the terminal and includes a function of downloading at least one SIM remotely and selecting one of the downloaded at least one SIM. In the disclosure, the UICC that includes the function of downloading the at least one SIM remotely and selecting an SIM is collectively referred to as the eUICC or iUICC. In other words, among UICCs that include the function of downloading SIMs remotely and selecting an SIM, a UICC that is fixed or not fixed to the terminal is collectively referred to as a eUICC or iUICC.

In the disclosure, the terms UICC and SIM may be interchangeably used, and the terms eUICC and eSIM may be interchangeably used.

An eUICC identifier (ID) may be an intrinsic ID of an eUICC embedded in a terminal, and may be referred to as an EID. When a provisioning profile is pre-mounted on the eUICC, the eUICC ID may be a profile ID of the provisioning profile. Also, in an embodiment of the disclosure, when the terminal and an eUICC chip are not separated, the eUICC ID may be a terminal ID. The eUICC ID may refer to a specific secure domain of the eUICC chip.

An embedded secure element (eSE) denotes a fixed SE used by being fixed to an electronic device. The eSE is generally manufactured exclusively for a manufacturer according to a request of a terminal manufacturer, and may be manufactured including an operating system and a framework. The eSE may be installed as a service control module in an applet form is remotely downloaded, and the installed service control module may be used for various security services, such as an electronic wallet, ticketing, an electronic passport, and a digital key. In the disclosure, SEs that may be installed as the service control module is remotely downloaded and are in a form of a single chip attached to an electronic device are collectively referred to as an eSE.

A smart secure platform (SSP) denotes a single chip capable of integrally supporting a function of UICC and a function of eSE. The SSP may be divided into a removable type (removable SSP (rSSP)), an embedded type (embedded SSP (eSSP)), or an integrated type embedded in an SoC (integrated SSP (iSSP)). The SSP may include one primary platform (PP) and at least one secondary platform bundle (SPB) operating on the PP, wherein the primary platform may include at least one of a hardware platform and a low-level operating system (LLOS), and the secondary platform bundle may include at least one of a high-level operating system (HLOS) and an application driven on the HLOS. The secondary platform bundle is also referred to as an SPB or a bundle. The bundle may access resources of a central processing unit or memory of the PP through a primary platform interface (PPI) provided by the PP, and be driven on the PP through the resources. A communication application, such as a subscriber identification module (SIM), a universal SIM (USIM), or an IP multimedia SIM (ISIM) may be mounted on the bundle, or various applications, such as an electronic wallet, ticketing, an electronic passport, and a digital key may be mounted on the bundle. In the disclosure, the SSP may also be referred to as a smart secure medium.

The SSP may be used for the UICC or eSE described above, according to the downloaded and installed bundle, and as the plurality of bundles are installed and simultaneously operated in the single SSP, the SSP may be used for both the UICC and the eSE. In other words, when a bundle including a profile is operated, the SSP may be used for a UICC for accessing a network of a mobile operator. One or more profiles, such as the eUICC or iUICC described above, may be remotely downloaded to a UICC bundle, and at least one of the one or more profiles may be selected. Also, when a bundle including a service control module, on which an application capable of providing a service, such as an electronic wallet, ticketing, an electronic passport, or a digital key, on the SSP, is mounted, operates, the SSP may be used for the eSE. A plurality of service control modules may be integrally installed and operated in one bundle or may be installed and operated in independent bundles.

The bundle may be downloaded to and installed in the SSP from an external bundle management server (secondary platform bundle manager (SPB manager)) by using an over-the-air (OTA) technology, or the bundle may be transmitted from another terminal and installed in the SSP. In the disclosure, a method of installing the downloaded or received bundle may be identically applied to the removable SSP (rSSP) capable of being inserted into or detached from a terminal, the embedded SSP (eSSP) installed in a terminal, and an integrated SSP (iSSP) included in an SoC installed in a terminal. An SSP ID is a unique ID of an SSP embedded in a terminal, and may be referred to as sspID. Also, as in an embodiment of the disclosure, when the terminal and an SSP chip are not separated from each other, the SSP ID may be a terminal ID. Also, the SSP ID may refer to a specific bundle ID (SPB ID) in the SSP. In detail, the SSP ID may refer to a bundle ID of a secondary platform bundle loader (SPBL) or management bundle for managing installation, enabling, disabling, and deletion of another bundle in the SSP. Also, the SSP ID may refer to a primary platform identifier in the SSP. The SSP may have a plurality of SSP IDs and the plurality of SSP IDs may be values derived from a unique single SSP ID.

A part number ID is information connected to an SSP embedded in a terminal, and may be used to derive a manufacturer of a primary platform mounted on the SSP and model information of the primary platform.

A secondary platform bundle (SPB) is driven by using resources of a primary platform (PP) of an SSP on the PP, and for example, a UICC bundle may be obtained by packaging, in a form of software, an application, a file system, an authentication key, and the like stored in an existing UICC, and an operating system (HLOS) for operating the same. In the disclosure, the SPB may be referred to as a bundle.

In the disclosure, states of a bundle may be as follows.
[Enabled]
In the disclosure, an operation of a terminal or external server enabling a bundle may denote an operation of changing a state of an SPB to an enabled state such that the terminal may receive a service provided by the bundle (for example, a communication service through a mobile operator, a credit card payment service, or a user authentication service). The bundle in the enabled state may be referred to as an enabled bundle. The bundle in the enabled state may be stored, in an encoded state, in a storage space inside or outside an SSP.
[Active]
In the disclosure, an activated bundle may be changed to an active state according to a bundle external input (for example, a user input, push, a request of an application in a terminal, an authentication request of a mobile operator, or a PP management message) or an operation in the bundle (for example, a timer or polling). The bundle in the active state may denote a bundle in a state in which the bundle is loaded from a storage space inside or outside an SSP into a driving memory inside the SSP, security information is processed by using a secure CPU inside the SSP, and a security service is provided to a terminal.
[Disabled]
In the disclosure, an operation of a terminal or external server disabling a bundle may denote an operation of changing a state of the profile to a disabled state such that the terminal is unable to receive a service provided by the bundle. An SPB in a disabled state may be referred to as a disabled bundle. A bundle in a disabled state may be stored, in an encoded state, in a storage space inside or outside an SSP.
[Deleted]
In the disclosure, an operation of a terminal or external server deleting a bundle may denote an operation of changing a state of the bundle to a deleted state or deleting related data of the bundle as well as the bundle such that the terminal or external server is no longer able to activate, enable, or disable the bundle. The bundle in the deleted state may be referred to as a deleted bundle.

A bundle image or an image may be interchangeably used with a bundle or used to indicate a data object of a specific bundle, and may be referred to as a bundle tag, length, value (TLV) or a bundle image TLV. When the bundle image is encoded by using an encryption parameter, the bundle image may be referred to as a protected bundle image (PBI) or a protected bundle image TLV (PBI TLV). When the bundle image is encoded by using an encryption parameter that is decodable only by a specific SSP, the bundle image may be referred to as a bound bundle image (BBI) or a bound bundle image TLV (BBI TLV). The bundle image TLV may be a data set expressing information configuring a bundle in a form of TLV.

A bundle delimiter may be referred to as a factor matching a bundle ID (SPB ID), a bundle family ID (SPB family ID), a bundle family custodian object ID (SPB family custodian object ID), a bundle matching ID, or an event ID. The bundle ID (SPB ID) may indicate a unique ID of each bundle. The bundle family ID may indicate an ID distinguishing a type of a bundle (for example, a telecom bundle for accessing a mobile communication network). In the disclosure, the bundle family ID may be referred to as family ID, Fid, or FID. The bundle family custodian object ID may indicate an ID distinguishing a subject managing a bundle family ID (for example, a mobile operator, a terminal manufacturer, or a specific organization). In the disclosure, the bundle family custodian object ID may be referred to as OID or Oid. The bundle delimiter may be used as a value for indexing a bundle in a bundle management server or terminal.

Bundle metadata indicates a set of pieces of information that refer to or describe a bundle. The bundle metadata may include a bundle delimiter described above. Also, the bundle metadata may further include information about an attribute, characteristic, or configuration of a bundle. The bundle metadata may also be referred to as metadata.

A profile may denote a data object, such as an application, file system, or authentication key value stored in a UICC.

In the disclosure, a profile package may be obtained by packaging content of a profile in a form of software installable in a UICC. The profile package may be referred to as a profile TLV or profile package TLV. When the profile package is encoded by using an encryption parameter, the profile package may be referred to as a protected profile package (PPP) or PPP TLV. When the profile package is encoded by using an encryption parameter decodable only by a specific eUICC, the profile package may be referred to as a bound profile package (BPP) or a BPP TLV. The profile package TLV may be a data set expressing information configuring a profile in a form of TLV.

In the disclosure, a profile image may denote binary data in which a profile package is installed in a UICC. The profile image may be referred to as a profile TLV or a profile image TLV. When the profile image is encoded by using an encryption parameter, the profile image may be referred to as a protected profile image (PPI) or a protected profile image TLV (PPI TLV). When the profile image is encoded by using an encryption parameter decodable only by a specific eUICC, the profile image may be referred to as a bound profile image (BPI) or a bound profile image TLV (BPI TLV). The profile image TLV may be a data set expressing information configuring a profile in a form of TLV.

In the disclosure, states of a profile may be as follows.
[Enabled]
In the disclosure, an operation of a terminal enabling a profile may denote an operation of changing a state of the profile to an enabled state such that the terminal is able to receive a communication service via a mobile operator that provided the profile. The profile in the enabled state may be referred to as an enabled profile.

[Disabled]

In the disclosure, an operation of a terminal disabling a profile may denote an operation of changing a state of the profile to a disabled state such that the terminal is unable to receive a communication service via a mobile operator that provided the profile. The profile in the disabled state may be referred to as a disabled profile.

[Deleted]

In the disclosure, an operation of a terminal deleting a profile may denote an operation of changing a state of the profile to a deleted state such that the terminal is no longer able to enable or disable the profile. The profile in the deleted state may be referred to as a deleted profile.

In the disclosure, an operation of a terminal enabling, disabling, or deleting a profile may denote an operation in which a state of the profile is not immediately changed to an enabled state, a disabled state, or a deleted state, but is first marked as a to-be-enabled state, a to-be-disabled state, or a to-be-deleted state, and is changed to the enabled state, the disabled state, or the deleted state after the terminal or a UICC of the terminal performs a specific operation (for example, a refresh or reset command). An operations marking a specific profile as a to-be-state (for example, a to-be-enabled state, a to-be-disabled state, or a to-be-deleted state) is not necessarily limited to marking one to-be-state for one profile, and it is possible to mark one or more profiles as a same or different to-be-state, mark one profile as one or more to-be-states, or mark one or more profiles as same or different one or more to-be-states.

Also, when the terminal marks an arbitrary profile as one or more to-be-states, two to-be-state marks may be integrated into one. For example, when the arbitrary profile is marked as a to-be-disabled state and a to-be-deleted state, the profile may be integrally marked as to-be-disabled and deleted state.

An operation of the terminal marking a to-be-state for one or more profiles may be performed sequentially or simultaneously. Also, an operation of the terminal marking a to-be-state for one or more profiles and then actually changing states of the profiles may be performed sequentially or simultaneously.

A profile delimiter may be referred to as a factor matching a profile ID, an integrated circuit card ID (ICCID), a matching ID, an event ID, an activation code, an activation code token, a command code, a command code token, a signed command code, an unsigned command code, or ISD-P or profile domain (PD). The profile ID may indicate a unique ID of each profile. The profile delimiter may further include an address of a profile providing server (SM-DP+) capable of indexing a profile. The profile delimiter may further include a signature of the profile providing server (SM-DP+).

A bundle management server may include a function of generating a bundle, encode the generated bundle, generate a bundle remote management instruction, or encode the generated bundle remote management instruction, according to a request of a service provider or another bundle management server. The bundle management server providing such a function may be represented as at least one of a secondary platform bundle manager (SPBM), a remote bundle manager (RBM), an image delivery server (IDS), a subscription manager data preparation (SM-DP), a subscription manager data preparation plus (SM-DP+), a manager bundle server, a managing SM-DP+, a bundle encoding server, a bundle generation server, a bundle provisioner (BP), a bundle provider, and a bundle provisioning credentials (BPC) holder.

In the disclosure, the bundle management server may perform a function of managing a configuration of a certificate and key for downloading, installing, or updating a bundle from an SSP and remotely managing a state of the bundle. The bundle management server providing such a function may be represented as at least one of a secondary platform bundle manager (SPBM), a remote bundle manager (RBM), an image delivery server (IDS), a subscription manager secure routing (SM-SR), a subscription manager secure routing plus (SM-SR+), an off-card entity of eUICC profile manager or profile management credentials (PMC) holder, and an eUICC manager (EM).

In the disclosure, a subscription mediation server may receive, from one or more bundle management servers or subscription mediation servers, a register event request (event register request). One or more subscription mediation servers may be used in combination, and in this case, a first subscription mediation server may receive an event register request not only from a bundle management server, but also a second subscription mediation server. In the disclosure, a function of the subscription mediation server may be integrated into the bundle management server. The subscription mediation server providing such a function may be represented as at least one of a secondary platform bundle manager (SPBM), a remote bundle manager (RBM), a secondary platform bundle discovery server (SPBDS), a bundle discovery server (BDS), a subscription manager discovery service (SM-DS), a discovery service (DS), a root SM-DS, and an alternative SM-DS.

In the disclosure, a bundle management server may denote a server performing both a function of generating, encoding, and delivering a bundle or bundle remote management instruction, and a function of configuring an SSP and managing an installed bundle. Also, the bundle management server may denote a server capable of further performing a function of a subscription mediation server. Accordingly, in various embodiments of the disclosure below, operations of the bundle management server and subscription mediation server may be performed by one bundle management server. Alternatively, the functions may be separately performed by a plurality of separated bundle management servers. Also, the bundle management server or subscription mediation server in the specification of the disclosure may be referred to as a bundle server. The bundle server may be one of the bundle management server and the subscription mediation server, or may be an apparatus including functions or configurations of both the bundle management server and the subscription mediation server.

A remote SIM provisioning (RSP) server may be used to refer to a profile providing server described below and/or a profile management server and/or a subscription mediation server. The RSP server may be referred to as a subscription manager XX (SM-XX).

In the disclosure, a profile providing server may include a function of generating a profile, encoding a generated profile, generating a profile remote management instruction, or encoding a generated profile remote management instruction. The profile providing server may be referred to as subscription manager data preparation (SM-DP), subscription manager data preparation plus (SM-DP+), an off-card entity of profile domain, a profile encryption server, a profile generation server, a profile provisioner (PP), a profile provider, or a profile provisioning credentials (PPC) holder.

In the disclosure, a profile management server may include a function of managing a profile. The profile management server may be referred to as subscription manager secure routing (SM-SR), subscription manager secure routing plus (SM-SR+), an off-card entity of eUICC profile manager, a profile management credentials (PMC) holder, an eUICC manager (EM), or a profile manager (PP).

In the disclosure, the profile providing server may also include a function of the profile management server. Thus, according to various embodiments of the disclosure, an operation of the profile providing server may be performed by the profile management server. Similarly, an operation of the profile management server or SM-SR may be performed by the profile providing server.

In the disclosure, a subscription mediation server may be referred to as a subscription manager discovery service (SM-DS), a discovery service (DS), a root SM-DS, or an alternative SM-DS. The subscription mediation server may receive, from one or more profile providing servers or subscription mediation server, a register event request (event register request). One or more subscription mediation servers may be used in combination, and in this case, a first subscription mediation server may receive an event register request not only from a profile providing server, but also a second subscription mediation server.

A service provider may denote a business that issues a requirement to request a bundle management server to generate a bundle, and provides a service to a terminal through the bundle. For example, the service provider may denote a mobile operator providing a communication network access service through a bundle on which a communication application is mounted, and may collectively refer to all of a business supporting system (BSS), an operational supporting system (OSS), a point of sale (POS) terminal, and other IT systems of the mobile operator. Also, in the disclosure, the service provider is not limited to representing only one of specific businesses, and may be used to refer to a group or association (or consortium) of one or more businesses or a representative representing the group or association. In the disclosure, the service provider may be referred to as an operator (or OP or Op.), a bundle owner (BO), or an image owner (IO), and each service provider may be configured or assigned with at least one of a name and/or a unique identifier (object identifier (OID)). When the service provider refers to a group or association of one or more businesses or a representative, a name or unique ID of the group or association, or the representative may be a name or unique ID shared by all businesses belonging to the group or association, or all businesses cooperating with the representative.

A mobile operator may indicate a business that provides a communication service to a terminal, and may collectively refer to all of a business supporting system (BSS), operational supporting system (OSS), point of sale (POS) terminal, and other IT systems of the mobile operator. Also, in the disclosure, the mobile operator is not limited to representing only one of specific businesses providing a communication service, and may be used to refer to a group or association (or consortium) of one or more businesses or a representative representing the group or association. In the disclosure, the mobile operator may be referred to as an operator (or OP or Op.), a mobile network operator (MNO), a mobile virtual network operator (MVNO), a service provider (SP), or a profile owner (PO), and each mobile operator may be configured or assigned with at least one of a name and/or a unique identifier (object identifier (OID)) of the mobile operator. When the mobile operator refers to a group or association of one or more businesses or a representative, a name or unique ID of the group or association, or the representative may be a name or unique ID shared by all businesses belonging to the group or association, or all businesses cooperating with the representative.

A subscriber may be used to refer to a service provider having ownership of a terminal or an end user having ownership of a terminal. In general, a terminal owned by the service provider may be referred to as an M2M device, and a terminal owned by the end user may be referred to as a user terminal (consumer device). For the M2M device, there may be an end user who does have ownership of a terminal but uses the terminal by taking over or renting the terminal from the service provider, and in this case, the subscriber may be the same as or different from the service provider.

Subscriber intent may be used to collectively refer to intent of a subscriber to locally manage or remotely manage a bundle. For local management, the subscriber intent may be used to refer to end user intent, and for remote management, the subscriber intent may be used to refer to service provider intent.

End user consent may be used to indicate whether a user consents to performing of local management or remote management.

A terminal may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or another term. Various embodiments of the terminal may include not only a cellular phone, a smart phone having a wireless communication function, a personal digital assistant (PDA) having a wireless communication function, a wireless modem, a portable computer having a wireless communication function, an imaging apparatus, such as a digital camera, having a wireless communication function, a gaming device having a wireless communication function, a music storage and reproduction home appliance having a wireless communication function, and an Internet home appliance capable of wireless Internet access and browsing, but also portable units or terminals in which combinations of such functions are integrated. The terminal may also include a machine-to-machine (M2M) terminal or a machine type communication (MTC) terminal/device, but is not limited thereto. In the disclosure, the terminal may also be referred to as an electronic device.

In the disclosure, an SSP capable of downloading and installing a bundle may be embedded in an electronic device. When the SSP is not embedded in the electronic device, the SSP physically separated from the electronic device may be inserted into and connected to the electronic device. For example, the SSP may be inserted into the electronic device, in a form of a card. The electronic device may include a terminal, and the terminal may be a terminal including the SSP capable of downloading and installing a bundle. The SSP is able to be embedded in the terminal, and when the terminal and the SSP are separated, the SSP may be inserted into the terminal to be connected to the terminal.

In the disclosure, a UICC capable of downloading and installing a profile may be embedded in an electronic device. When the UICC is not embedded in the electronic device, the UICC physically separated from the electronic device may be inserted into and connected to the electronic device. For example, the UICC may be inserted into the electronic device in a form of a card. The electronic device may include a terminal, and at this time, the terminal may be a terminal including the UICC capable of downloading and installing a profile. The UICC is able to be embedded in the terminal, and when the terminal and the UICC are separated, the UICC may be inserted into the terminal to be connected to the terminal. The UICC capable of downloading and installing a profile may be referred to as, for example, an eUICC.

A local bundle assistant (LBA) may refer to software or application installed in a terminal or electronic device to control an SSP. The software or application may be referred to as a local bundle manager (LBM).

A loader (secondary platform bundle loader (SPBL)) may refer to a management bundle for managing installation, enablement, disablement, and deletion of another bundle in an SSP. An LBA of a terminal or a remote server may install, enable, disable, or delete a specific bundle through the loader. In the disclosure, an operation of the loader may also be described as an operation of the SSP including the loader.

A local profile assistant (LPA) may refer to software or application installed in a terminal or electronic device such that the terminal or electronic device controls a UICC or eUICC.

An event may be used for following purposes in the disclosure.

[When Used in Relation to a Bundle]

An event may be a term collectively referring to bundle download, remote bundle management, or another bundle or SSP management/processing command. The event may be referred to as a remote SIM provisioning operation (RSP operation) or event record, and each event may be identified as data including at least one of a corresponding event identifier (event ID or EventID) or matching identifier (matching ID or MatchingID), an address (fully qualified domain name (FQDN), IP address, or uniform resource locator (URL)) of a bundle management server or subscription mediation server where the event is stored, or an identifier of each server. The bundle download and bundle installation may be interchangeably used. Also, an event type may be used as a term indicating whether a specific event is bundle download, remote bundle management (for example, deletion, enablement, disablement, replacement, or update), or another bundle or SSP management/processing command. Also, the event type may be referred to as an operation type (OperationType), an operation class (OperationClass), an event request type, an event class, or an event request class.

Local bundle management (LBM) may be referred to as bundle local management, local management, a local management command, a local command, an LBM package, a bundle local management package, a local management package, a local management command package, or a local command package. The LBM may be used to install an arbitrary bundle through software or the like installed in a terminal, change a state (enabled, disabled, or deleted) of a specific bundle, or change (update) content (for example, a bundle nickname or bundle metadata) of a specific bundle. The LBM may include one or more local management commands, and in this case, bundles subject to the local management commands may be the same or different for each local management command.

Remote bundle management (RBM) may be referred to as bundle remote management, remote management, a remote management command, a remote command, an RBM package, a bundle remote management package, a remote management package, a remote management command package, or a remote command package. The RBM may be used to install an arbitrary bundle, change a state (enabled, disabled, or deleted) of a specific bundle, or change (update) content (for example, a bundle nickname or bundle metadata) of a specific profile. The RBM may include one or more remote management commands, and in this case, bundles subject to the remote management commands may be the same or different for each remote management command.

A target bundle may be used to refer to a bundle subject to a local management command or remote management command.

A bundle rule may be used to refer to information that needs to be identified by a terminal when performing local management or remote management on a target bundle. Also, the bundle rule may be interchangeably used with bundle policy, rule, or policy.

[When Used in Relation to a Profile]

An event may be a term collectively referring to profile download, remote profile management, or another profile or eUICC management/processing command. The event may be referred to as a remote SIM provisioning operation (RSP operation) or event record, and each event may be referred to as data including at least one of a corresponding event identifier (event ID or EventID) or matching identifier (matching ID or MatchingID), an address (FQDN, IP address, or URL) of a profile providing server (SM-DP+) or subscription mediation server (SM-DS) where the event is stored, a signature of the profile providing server (SM-DP+) or subscription mediation server (SM-DS), and a digital certificate of the profile providing server (SM-DP+) or subscription mediation server (SM-DS).

Data corresponding to the event may be referred to as a command code. A part or all of a procedure using the command code may be referred to as a command code processing procedure, a command code procedure, or a local profile assistant (LPA) application programming interface (API). The profile download and profile installation may be interchangeably used.

An event type may be used as a term indicating whether a certain event is profile download, remote profile management (for example, deletion, enablement, disablement, replacement, or update), or another profile or eUICC management/processing command, and may be referred to as an operation type (OperationType), an operation class (OperationClass), an event request type, an event class, or an event request class. An arbitrary event identifier (EventID or MatchingID) may be assigned with a path a terminal obtained the event identifier (eventID or MatchingID) or a purpose of use (EventID source or MatchingID source).

Local profile management (LPM) may be referred to as profile local management, local management, a local management command, a local command, an LPM package, a profile local management package, a local management package, a local management command package, or a local command package. The LPM may be used to change a state (enabled, disabled, or deleted) of a specific profile, or change (update) content (for example, a profile nickname or profile metadata) of a specific profile, through software or the like installed in a terminal. The LPM may include one or more local management commands, and in this case, profiles subject to the local management commands may be the same or different for each local management command.

Remote profile management (RPM) may be referred to as profile remote management, remote management, a remote management command, a remote command, an RPM package, a profile remote management package, a remote management package, a remote management command package, or a remote command package. The RPM may be used to change a state (enabled, disabled, or deleted) of a specific profile or change (update) content (for example, a profile nickname or profile metadata) of a specific profile. The RPM may include one or more remote management commands, and in this case, profiles subject to the remote management commands may be the same or different for each remote management command.

A certificate or digital certificate may indicate a digital certificate used for mutual authentication based on an asymmetric key including a pair of a public key (PK) and a secret key (SK). Each certificate may include one or more PKs, a PK identifier (PKID) corresponding to each PK, an identifier (ID) of a certificate issuer (CI) that issued the corresponding certificate, and a digital signature. The certificate issuer may be referred to as a certification issuer, a certificate authority (CA), or a certification authority. In the disclosure, a PK and a PKID may be used as a meaning indicating a storage space storing a specific PK or a certificate including the specific PK, a part of a specific PK or a part of a certificate including the specific PK, an operation result (for example, a hash value) of a specific PK or an operation result (for example, a hash value) of a certificate including the specific PK, an operation result (for example, a hash value) of a part of a specific PK or an operation result (for example, a hash value) of a part of a certificate including the specific PK, or data.

A certificate chain or certificate hierarchy may indicate, when certificates (primary certificates) issued by a certificate issuer are used to issue another certificate (secondary certificate) or when secondary certificates are used to connectionally issue ternary or higher certificates, correlations between corresponding certificates. Here, a CI certificate initially used to issue a certificate may be referred to as a root of certificate, a top certificate, a root CI, a root CI certificate, a root CA, or a root CA certificate.

While describing the disclosure, detailed description of related functions or configurations may be omitted when it is deemed that they may unnecessarily obscure the essence of the disclosure.

Hereinafter, various embodiments related to a method and apparatus for transferring a bundle between terminals and installing the bundle will be described. FIG. 1 illustrates a conceptual diagram of a smart secure platform (SSP) according to an embodiment of the disclosure.

Referring to FIG. 1, according to an embodiment of the disclosure, a terminal 110 may include an SSP 120. For example, the SSP 120 may be embedded in an SoC 130 of the terminal 110. Here, the SoC 130 may be a communication processor, an application processor, or a processor in which these two processors are integrated. As another example, the SSP 120 may be a detachable type 122 in a form of an independent chip that is not integrated with the SoC, or may be an embedded type 124 pre-embedded in the terminal 110.

According to various embodiments, the SSP 120 included in the terminal may include at least one of one or more telecom bundles, one or more payment bundles, or one or more electronic ID bundles. For example, as shown in FIG. 1, when the SSP includes a plurality of telecom bundles 140 and 150, the terminal 110 may use a mobile communication network by operating the plurality of telecom bundles 140 and 150 simultaneously or in time division, according to a configuration. Also, when the SSP 120 includes a payment bundle 170 and an electronic ID bundle 180, the terminal 110 may use the payment bundle 170 to use online payment through a terminal app or offline payment through an external credit card point-of-sale (PoS) device, and may use the electronic ID bundle 180 to authenticate identity of a terminal owner.

Figure 2:
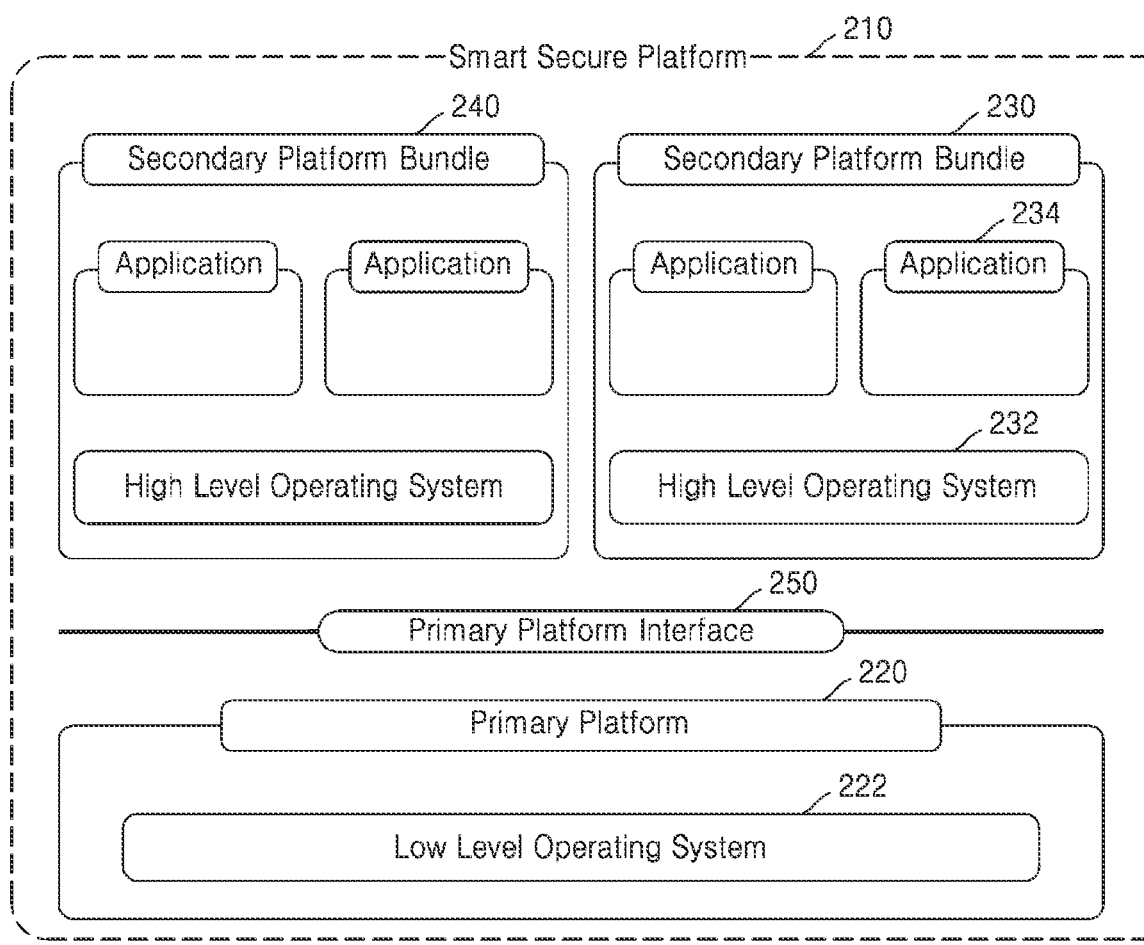
FIG. 2 illustrates a conceptual diagram of an internal structure of an SSP, according to an embodiment of the disclosure.

FIG. 2 illustrates a conceptual diagram of an internal structure of an SSP, according to an embodiment of the disclosure.

Referring to FIG. 2, according to an embodiment of the disclosure, an SSP 210 may include one primary platform (PP) 220 and at least one of secondary platform bundles (SPBs) 230 and 240 operating thereon.

According to various embodiments, the PP 220 may include hardware (not shown) and at least one low-level operating system (LLOS) 222.

According to various embodiments, the SPB 230 may include a high-level operating system (HLOS) 232 and at least one application 234 operating thereon.

According to various embodiments, each of the SPBs 230 and 240 may use a primary platform interface (PPI) 250 to access resources, such as a central processing unit and a memory, of the PP 220, and be driven in the SSP 210 through the resources.

Figure 3:
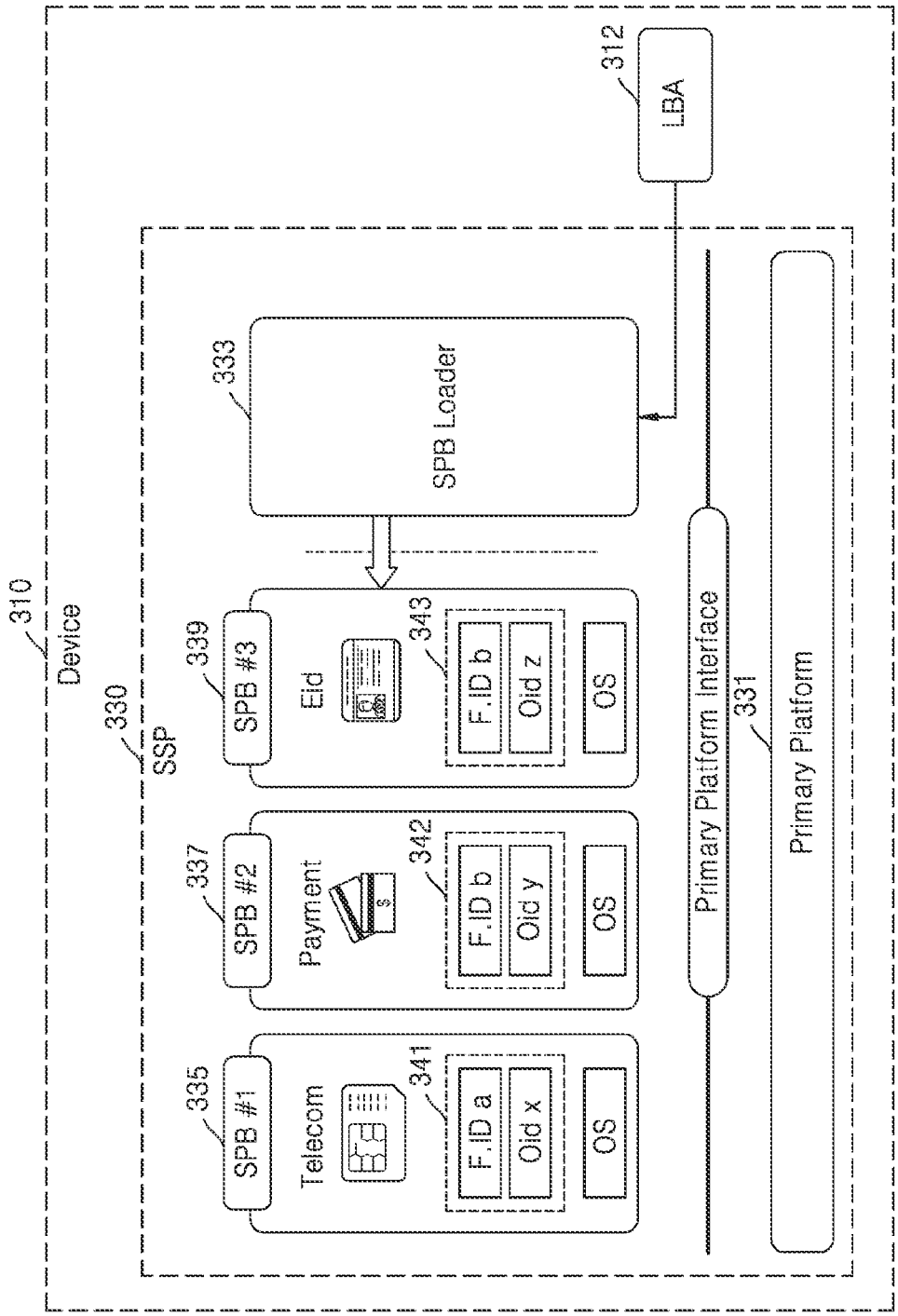
FIG. 3 is a diagram showing an example of components in a terminal used by the terminal to download and install a bundle to and in an SSP, according to an embodiment of the disclosure.

FIG. 3 is a diagram showing an example of components in a terminal used by the terminal to download and install a bundle to and in an SSP, according to an embodiment of the disclosure.

Referring to FIG. 3, according to an embodiment of the disclosure, a terminal 310 may include an SSP 330 and/or an LBA 312 for controlling the SSP 330. For example, the terminal 310 may be a terminal in which the SSP 330 is mounted and the LBA 312 for controlling the SSP 330 is installed. The SSP 330 may be embedded in or detachable from the terminal 310.

According to various embodiments, the SSP 330 may include at least one of a primary platform 331, a secondary platform bundle loader (SPBL) 333, and one or more secondary platform bundles 335, 337, and 339.

According to various embodiments, the secondary platform bundle 335, 337, or 339 may not be installed in the SSP 330 at a time when the terminal is released, but may be remotely downloaded and installed after the release.

According to various embodiments, as shown in FIG. 3, the bundles may include different FIDs and/or OIDs 341, 342, and 343. Such FIDs and/or OIDs 341, 342, and 343 may be used as information required to download and install the bundles. In other words, the SSP 330 or SPBL 333 may allow or reject downloading and installing of a specific bundle according to the FIDs and/or OIDs 341, 342, and 343.

Figure 4:
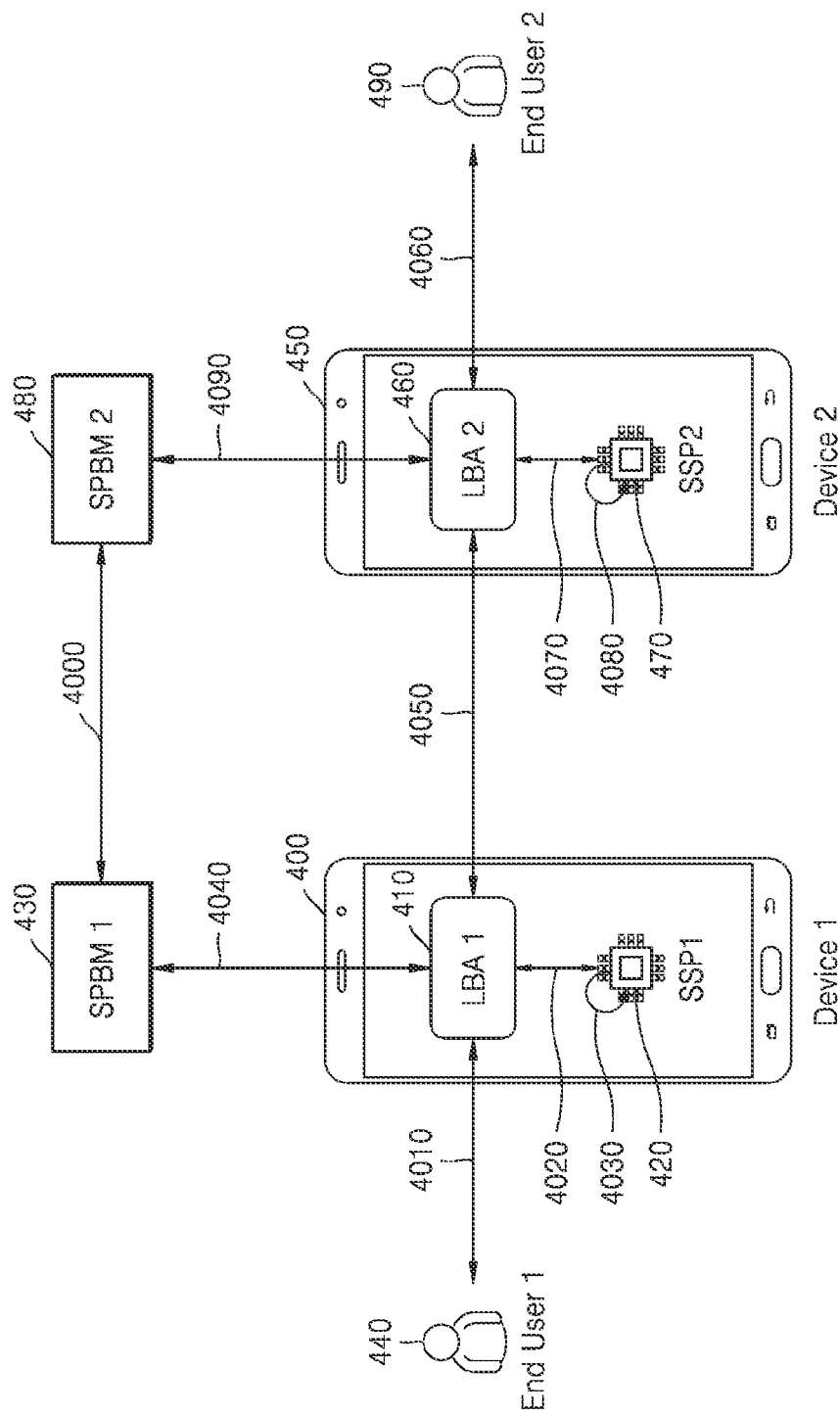
FIG. 4 is a diagram showing an example of a method by which two terminals and a server mutually operate such that a bundle is transmitted online from one terminal to another terminal, according to an embodiment of the disclosure.

FIG. 4 is a diagram showing an example of a method by which two terminals and a server mutually operate such that a bundle is transmitted online from one terminal to another terminal, according to an embodiment of the disclosure.

Referring to FIG. 4, according to an embodiment of the disclosure, a terminal may include at least one LBA and at least one SSP. For example, a first terminal 400 may include a first LBA 410 and a first SSP 420, and a second terminal 450 may include a second LBA 460 and a second SSP 470.

According to various embodiments, in operations 4020 and 4070, the first and second LBAs 410 and 460 may transmit commands to the first and second SSPs 420 and 470 or transmit/receive data to/from the first and second SSPs 420 and 470. Also, in operations 4030 and 4080, the first and second SSPs 420 and 470 may generate, process, or verify data required inside the first and second SSPs 420 and 470.

According to various embodiments, in operation 4050 (hereinafter, a third operation) the first and second LBAs 410 and 460 may be connected to each other to transmit a command to a counterpart, or transmit/receive data to/from the counterpart. In the third operation, the connection in operation 4050 may be a direct connection between the first terminal 400 and the second terminal 450 or, although not illustrated, an indirect connection in which an external entity (for example, an external server) is connected between the first LBA 410 and the second LBA 460. Detailed descriptions about a method of connecting the first LBA 410 and the second LBA 460 will be described below with reference to accompanying drawings.

According to various embodiments, a user may transmit a command to the terminal or receive information to be provided from the terminal. For example, as in operations 4010 and 4060, first and second users 440 and 490 may transmit commands to the first and second LBAs 410 and 460 of the first and second terminals 400 and 450 or receive information to be provided to the user from the first and second LBAs 410 and 460. The first user 440 and the second user 490 may denote different users or may denote a same user.

According to various embodiments, a bundle management server may transmit/receive data to/from the terminal. For example, as in operations 4040 and 4090, first and second bundle management servers 430 and 480 may receive or transmit messages to or from the first and second LBAs 410 and 460 of the first and second terminals 400 and 450. The first bundle management server 430 and the second bundle management server 480 may be different bundle management servers or a same bundle management server. When the first bundle management server 430 and the second bundle management server 480 are different from each other, the two servers may transmit/receive messages as in operation 4000.

FIG. 4 illustrates an example in which the first bundle management server 430 and the second bundle management server 480 directly transmit/receive messages, but according to an embodiment, there may be one or more other bundle management servers between the two bundle management servers. For example, although not illustrated, there may be a third bundle management server between the first bundle management server and the second bundle management server, and when the first or second bundle management server is to transmit a message to the second or first bundle management server, the first or second bundle management server may transmit the message to the third bundle management server first, and the third bundle management server may transmit the message to the second or first bundle management server. Similarly, there may be a plurality of bundle management servers and/or relay servers between the first bundle management server and the second bundle management server.

In the disclosure, for convenience of descriptions, all of one or more bundle management servers may be referred to as one bundle management server. For example, the first bundle management server 430 and the second bundle management server 480 may be integrally referred to as the bundle management server. In this case, for example, a process by which the first terminal transmits/receives a message to/from the second terminal through the first bundle management server and the second bundle management server may be described as a process by which the first terminal transmits/receives a message to/from the second terminal through the bundle management server. Even when there are one or more bundle management servers between the first bundle management server and the second bundle management server, these bundle management servers may be collectively referred to as the bundle management server as described above.

Figure 5:
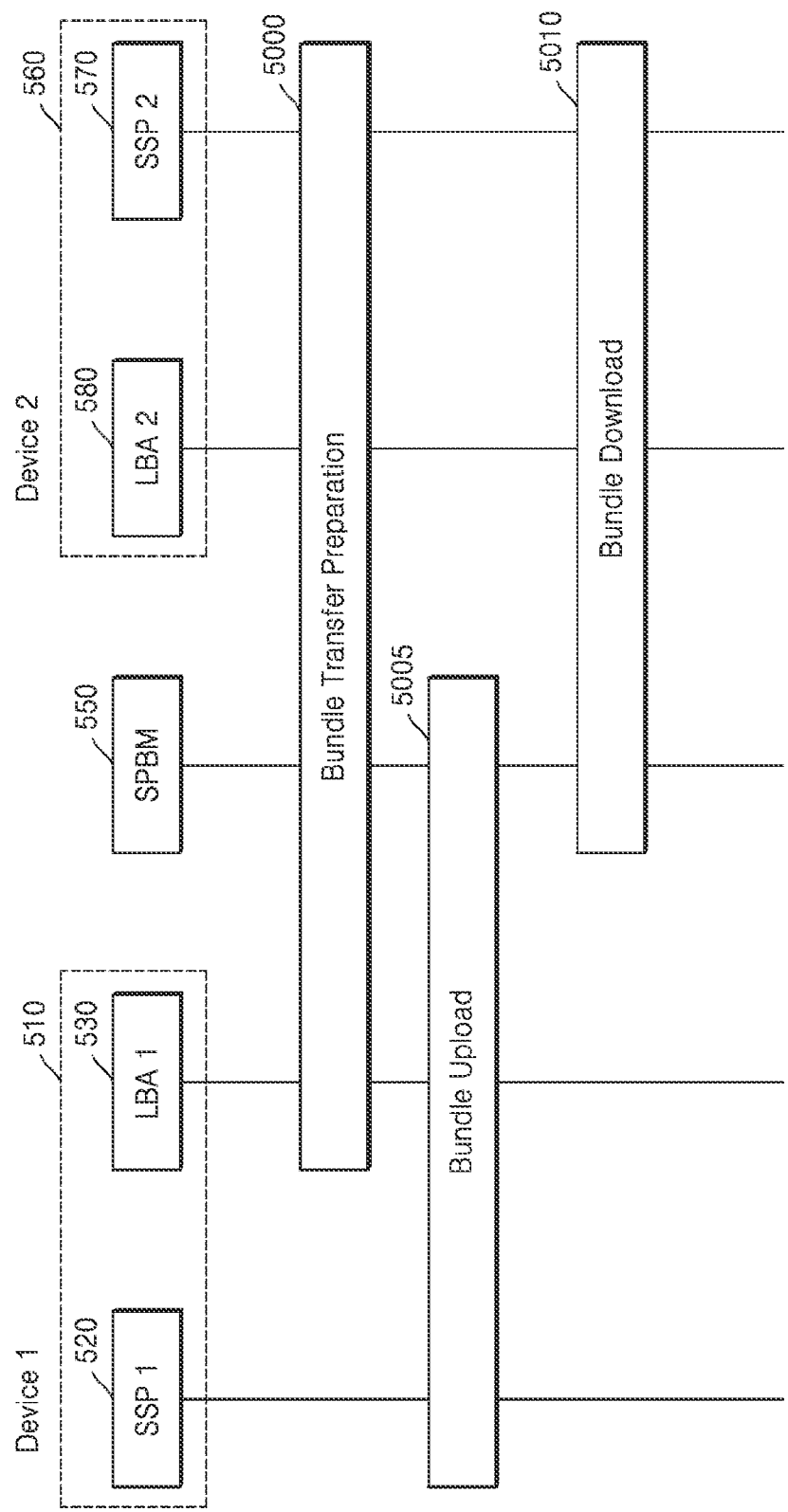
FIG. 5 is a diagram conceptually illustrating an example of a procedure for transmitting a bundle online from one terminal to another terminal, according to an embodiment of the disclosure.

FIG. 5 is a diagram conceptually illustrating an example of a procedure for transmitting a bundle online from one terminal to another terminal, according to an embodiment of the disclosure.

Referring to FIG. 5, a terminal may include at least one LBA and at least one SSP. For example, a first terminal 510 may include a first LBA 530 and a first SSP 520, and a second terminal 560 may include a second LBA 580 and a second SSP 570. Details about a bundle management server have been described with reference to FIG. 4.

In operation 5000, the first terminal 510 and the second terminal 560 may perform preparation procedures (bundle transmission preparation procedures) required to transmit a bundle. Details about the bundle transmission preparation procedures will be described below with reference to FIG. 6.

In operation 5005, the first terminal 510 may upload, to a bundle management server 550, a bundle to be transmitted to the second terminal. Details about a corresponding procedure will be described below with reference to FIG. 7.

In operation 5010, the second terminal 560 may download, from the bundle management server 550, the bundle uploaded in operation 5005, and install the bundle. Details about a corresponding procedure will be described below with reference to FIG. 8.

Figure 6:
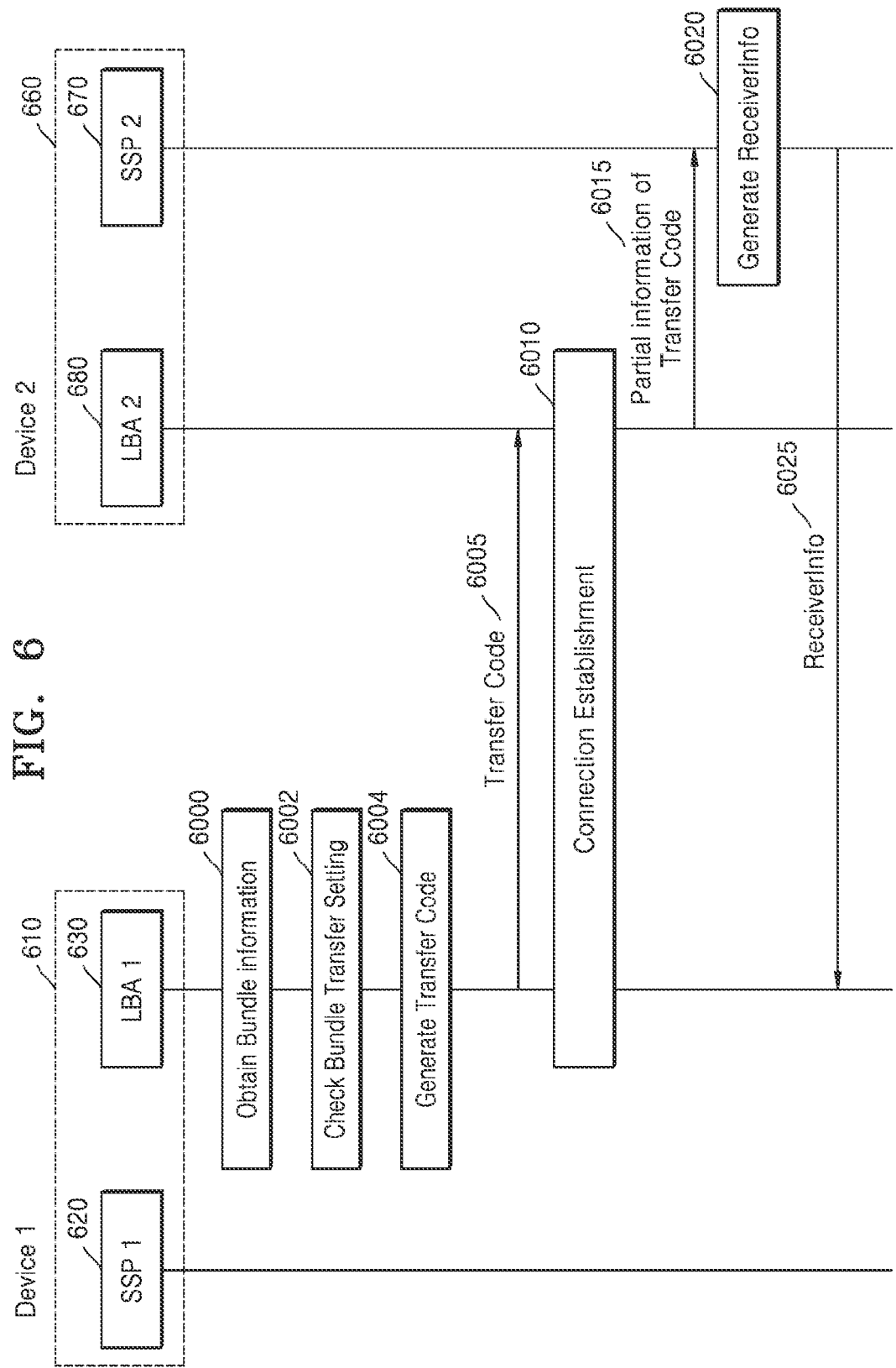
FIG. 6 is a diagram showing detailed procedures of a procedure for preparing to transmit a bundle, from among procedures proposed in FIG. 5, according to an embodiment of the disclosure.

FIG. 6 is a diagram showing detailed procedures of a procedure for preparing to transmit a bundle, from among the procedures proposed in FIG. 5, according to an embodiment of the disclosure.

Referring to FIG. 6, a terminal may include at least one LBA and at least one SSP. For example, a first terminal 610 may include a first LBA 630 and a first SSP 620, and a second terminal 660 may include a second LBA 680 and a second SSP 670.

According to various embodiments, the first terminal 610 may include pre-installed bundles, and further include metadata associated with the pre-installed bundles.

According to various embodiments, the first terminal 610 may include at least one of a bundle ID (SPB ID), FID (SPB family ID), or OID (SPB family custodian object ID), which is related to the pre-installed bundle.

According to various embodiments, the first terminal 610 may include a bundle transfer configuration related to the pre-installed bundle.

The bundle transfer configuration is information about whether transfer of a bundle between devices is possible, and may be generated by a service provider who is an initial provider, by a bundle management server, or by cooperation of the service provider and the bundle management server. The bundle transfer configuration may be updated by the service provider, the bundle management server, or cooperation of the service provider and the bundle management server. Alternatively, the bundle transfer configuration may be updated by cooperation of a terminal and at least one entity from among the service provider and the bundle management server. An update time point and/or an updating method may be determined by policies of the service provider, bundle management server, and a terminal manufacturer.

The bundle transfer configuration may selectively include a factor (or indication) indicating whether transfer of the bundle between devices is allowed. Also, the bundle transfer configuration may further selectively include a factor specifying a condition where the transfer of the bundle between devices is allowed. For example, a factor indicating whether online transfer of the bundle between devices may be included.

Referring to FIG. 6, in operation 6000, the first LBA 630 may obtain information about a bundle to be transmitted between devices. Alternatively, the information about the bundle to be transmitted between devices may be delivered to the first LBA 630. For example, the first LBA 630 may obtain the information about the bundle to be transmitted by receiving a user input of a user selecting the bundle through a user interface (UI) provided by the first terminal 610. Alternatively, the information about the bundle to be transmitted may be input to the first LBA 630 through a push input from a remote server or the first LBA 630 may read the information about the bundle to be transmitted by accessing the remote server.

In operation 6002, the first LBA 630 may identify whether transmission of the bundle between devices is possible, by using the bundle transfer configuration. Also, the first LBA 630 may identify whether online transmission of the bundle between devices is possible by checking the bundle transfer configuration.

In operation 6004, the first LBA 630 may generate a bundle transmission code. The bundle transmission code may include a bundle delimiter of the bundle to be transmitted, such as a bundle ID (SPB ID), an FID (SPB family ID), or an OID (SPB family custodian object ID). Also, the bundle transmission code may further include other information (for example, metadata of the bundle or a part of the metadata) indicating an attribute of the bundle. The bundle transmission code may include n address (SPBM Addr) of a bundle management server associated with the bundle to be transmitted. The bundle transmission code may include information required to connect two terminals in operation 6010. For example, information (for example, an SSID and/or BSSID of the first terminal 610, a pre-shared key to be used for connection authentication of the two terminals, an IP address of the first terminal, and a port number to be used for communication between the two terminals) required for Wi-Fi connection of the two terminals may be included.

Also, the bundle transmission code may include information (Supported Crypto Info) about encryption algorithms supported by the first terminal (for example, first SSP). The information about the encryption algorithms supported by the first terminal may selectively include at least one of following pieces of information: an oval curve list supported by the first terminal, a key agreement algorithm list supported by the first terminal, and an encryption algorithm list supported by the first terminal.

Although it is described that the first LBA 630 identifies the bundle transfer configuration in the drawing, such a process may be replaced by a following process: The first LBA 630 may transmit the information (for example, bundle ID) about the bundle to be transmitted to the first SSP 620, the first SSP 620 may identify the bundle transfer configuration of the bundle corresponding to the received bundle ID, and the first SSP 620 may transmit a result of identifying to the first LBA 630.

Although it is described that the first LBA 630 generates the bundle transmission code, such a process may be replaced by a following process: The first LBA 630 may transmit, to the first SSP 620, information required for the bundle transmission code, the first SSP 620 may transmit the requested information to the first LBA 630, and the first LBA 630 may configure the bundle transmission code based on the information.

Referring to FIG. 6, in operation 6005, the bundle transmission code generated in operation 6004 may be transmitted from the first LBA 630 to the second LBA 680. The bundle transmission code may be transmitted via any one of various methods.

For example, the first LBA 630 may provide information to be delivered to the second LBA 680 to a first user of the first terminal 610 through a UI of the first terminal 610. The first user may provide the provided information to a second user of the second terminal 660. The second user may input the provided information to the second LBA 680 by using a UI of the second terminal 660.

Alternatively, the first LBA 630 may generate an image (for example, a QR code) of the information to be delivered to the second LBA 680 and display the same on a screen of the first terminal 610, and the second user may scan the image displayed on the screen of the first terminal 610 by using the second terminal 660 and deliver the information to the second LBA 680.

Referring to FIG. 6, in operation 6010, a connection may be established (or configured) between the first LBA 630 and the second LBA 680. The first LBA 630 and the second LBA 680 may establish the connection by using the information included in the bundle transmission code. The connection between the first LBA 630 and the second LBA 680 may be a direct connection between devices (for example, NFC, Bluetooth, UWB, Wi-Fi direct, LTE device-to-device (D2D), or 5G D2D), or a remote connection in which a remote server (for example, a relay server) is located between the first LBA 630 and the second LBA 680.

It is shown that operation 6005 is performed first and then operation 6010 is performed in the drawing, but such an order may be switched. In other words, the connection between the first LBA 630 and the second LBA 680 may be established first (corresponds to operation 6010), and the bundle transmission code may be transmitted from the first LBA 630 to the second LBA 680 through the established connection (corresponds to operation 6005).

Referring to FIG. 6, in operation 6015, the second LBA 680 may transmit, to the second SSP 670, a part and/or all of the received bundle transmission code.

Referring to FIG. 6, in operation 6020, the second SSP 670 may identify the received encryption algorithms supported by the first terminal to identify whether there are encryption algorithms supported by the second terminal (for example, second SSP) thereamong. When there are encryption algorithms supported by the second terminal among the received encryption algorithms supported by the first terminal, one of the encryption algorithms supported by the second terminal may be selected to configure the same as a selected encryption algorithm. The selected encryption algorithm may selectively include at least one of following pieces of information: Oval curve information, key agreement algorithm information, and encryption algorithm information.

The second SSP 670 may generate, based on the selected encryption algorithm, a key pair (a temporary public key ssp2.ePK.BT and a corresponding secret key ssp2.eSK.BT) of the second terminal 660 to be used later to generate an encryption key for encryption communication with the first terminal 610. The second SSP 670 may map the generated key pair to the received bundle ID (SPB ID). The second SSP 670 may generate selected encryption information (ssp2.SelectedCryptoInfo). The selected encryption information may selectively include at least one of following pieces of information: A part and/or all of the selected encryption algorithm and ssp2.eEPK.BT.

In operation 6020, the second SSP 670 may generate information (collectively referred to as eligibility package or ssp2.EligibilityPackage) that may be later used to determine whether the bundle to be transmitted by the first terminal 610 is able to be received from an RSP server and installed.

The eligibility package may include certificate negotiation information of the second terminal 660 to be used later when the RSP server and the second terminal communicate with each other. The certificate negotiation information may selectively include at least one of following pieces of information: Information about certificates that may be used to verify the second SSP, information about a certificate that may be used by the second SSP to verify the RSP server, information about key agreement algorithms supported by the second SSP, and information about encryption algorithms supported by the second SSP.

The eligibility package may include information that may be used to determine whether a specific bundle is able to be normally installed and/or operated in the second terminal. Such information may selectively include at least one of following pieces of information: An SSP ID of the second SSP and a part number ID of the second SSP.

In operation 6020, the second SSP may generate ReceiverInfo. The ReceiverInfo may selectively include at least one of following pieces of information: Selected encryption information (ssp2.SelectedCryptoInfo) and the eligibility package (ssp2.EligibilityPackage).

Referring to FIG. 6, in operation 6025, the second SSP 670 may transmit the ReceiverInfo to the first LBA 630 through the second LBA 680.

Figure 7:
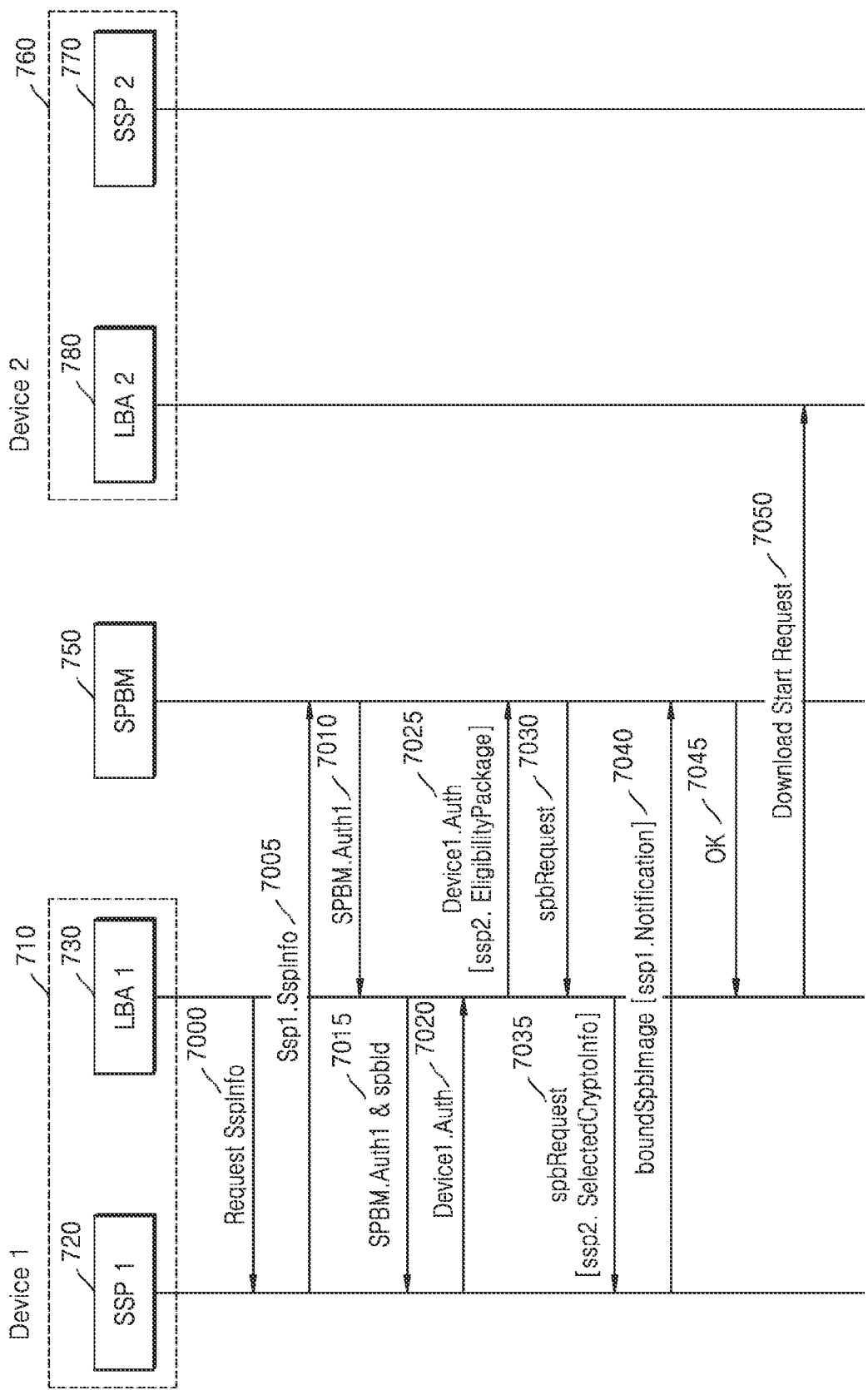
FIG. 7 is a diagram showing a procedure by which a terminal that is to transmit a bundle uploads the bundle to be transmitted to a server, from among the procedures proposed in FIG. 5, according to an embodiment of the disclosure.

FIG. 7 is a diagram showing a procedure by which a terminal that is to transmit a bundle uploads the bundle to be transmitted to a server, from among the procedures proposed in FIG. 5, according to an embodiment of the disclosure.

Referring to FIG. 7, a terminal may include at least one LBA and at least one SSP. For example, a first terminal 710 may include a first LBA 730 and a first SSP 720, and a second terminal 760 may include a second LBA 780 and a second SSP 770. Details about a bundle management server have been described with reference to FIG. 4.

Referring to FIG. 7, in operation 7000, the first LBA 730 may request the first SSP 720 for SSP information (SspInfo).

When requesting the first SSP 720 for the SSP information (SspInfo), the first LBA 730 may notify the first SSP 720 that bundle transfer between devices is to be performed. When requesting the first SSP 720 for the SSP information (SspInfo), the first LBA 730 may notify the first SSP 720 that online bundle transfer between devices is to be performed. For example, a request message may include an indicator indicating that the bundle transfer between devices is to be performed. As another example, the request message may include an indicator indicating that the online bundle transfer between devices is to be performed. The request message may include the indicator or a value of the indicator may be configured to 1, thereby notifying the first SSP 720 that the bundle transfer between devices or the online bundle transfer between devices is to be performed.

The first LBA 730 may provide, to the first SSP 720, information about a bundle to be transmitted. The information may include at least one of FID (SPB family ID) and OID (SPB family custodian object ID).

Operation 7000 may be automatically performed immediately after all processes described in FIG. 6 or may be performed after receiving an external input. Here, the external input may be a user input input by a first user of the first terminal 710 through a UI provided by the first terminal 710, or a push input input to the first LBA 730 from a remote server. Also, operation 7000 may be initiated when the first LBA 730 accesses the remote server.

Referring to FIG. 7, in operation 7005, the first SSP 720 may generate its SSP information (ssp1.SspInfo) and transmit the SSP information to a bundle management server (SPBM) 750 through the first LBA 730.

The SSP information may include information about the first SSP 720 to be provided for bundle transmission. Here, the SSP information may include information (certificate negotiation information) for a certificate negotiation process to be performed for the first SSP 720 to communicate with the bundle management server. The certificate negotiation information may include certificate information that may be used by the first SSP 720 to verify the bundle management server and/or certificate information that may be used by the bundle management server to verify the first SSP 720. Also, the certificate negotiation information may further include a list of key agreement algorithms supported by the first SSP 720, and further include a list of encryption algorithms supported by the first SSP 720.

The SSP information may further include SSP version information including at least one piece of version information from among pieces of version information of the standard supported by a loader and primary platform included in the first SSP 720.

According to an embodiment, the first SSP 720 may transmit the SSP information to the bundle management server 750 through the first LBA 730.

In operations 7000 through 7005, the first LBA 730 may request the first SSP 720 for the SSP information, the first SSP 720 may generate its SSP information, and the first SSP 720 may transmit the SSP information to the bundle management server 750 through the first LBA 730. However, according to an embodiment, the first LBA 730 may self-generate the SSP information and transmit the SSP information to the bundle management server 750.

Referring to FIG. 7, in operation 7010, the bundle management server 750 may identify the received SSP information, generate server authentication information (SPBM.Auth1) based on the SSP information, and transmit the server authentication information to the first LBA 730.

The server authentication information may include at least one of following pieces of information.

a) A key agreement certificate (referred to as SPBM.Cert.KA) that may be used to verify an SPBM itself and certificates required to verify the key agreement certificate.

b) Certificate information (referred to as CiPkIdToBeUsed) that may be used by an SPBM to verify a first SSP.

c) Encryption algorithm information (referred to as CryptoToBeUsed) that is to be used for an SPBM to perform encryption communication with a first SSP.

According to an embodiment, the bundle management server 750 may transmit the server authentication information to the first LBA 730.

Referring to FIG. 7, in operation 7015, the first LBA 730 may transmit the server authentication information to the first SSP 720. Also, the first LBA 730 may further transmit, to the first SSP 720, a bundle delimiter of the bundle to be transmitted.

According to an embodiment, the first SSP 720 may perform at least one of operations specified below.

a) Validity of received SPBM.Cert.KA may be identified.
   b) At least one of signature certificates (ssp1.Cert.DS) capable of verifying a first SSP based on received CiPkIdToBeUsed may be selected.
   c) Received CryptoToBeUsed may be identified and an encryption key pair, i.e., a public key ssp1.ePK.KA and a secret key ssp1.eSK.KA, which is to be used to generate an encryption key for encryption communication with a bundle management server may be generated. Also, the first SSP 720 may generate ShKeyM1 that is a session key to be used for encryption communication with the bundle management server 750, by using the ssp1.eSK.KA and a key agreement public key included in the SPBM.Cert.KA.

In operation 7020, the first SSP 720 may generate first terminal authentication information (Device1.Auth) and transmit the first terminal authentication information (Device1.Auth) to the first LBA 730. The first terminal authentication information (Device1.Auth) may include at least one of following pieces of information.
  a) ssp1.Cert.DS
  b) ssp1.ePK.KA
  c) Transaction ID referring to current session
  d) SSP ID of first SSP 720
  e) Bundle delimiter of bundle to be transmitted A part or all of the first terminal authentication information (Device1.Auth) may be digitally signed such that verification is possible by using the ssp1.Cert.DS to guarantee integrity of information, and digital signature data may be added as a part of the first terminal authentication information.

Also, a part or all of the first terminal authentication information (Device1.Auth) may be encoded by using the generated session key ShKeyM1.

According to an embodiment, the first SSP 720 may transmit the first terminal authentication information (Device1.Auth) to the first LBA 730.

Referring to FIG. 7, in operation 7025, the first LBA 730 may transmit the first terminal authentication information to the bundle management server 750. The first LBA 730 may further transmit ssp2.EligibilityPackage to the bundle management server 750. Details about the ssp2.EligibilityPackage have been described with reference to FIG. 6. The first LBA 730 may further transmit, to the bundle management server 750, the bundle delimiter of the bundle to be transmitted.

Referring to FIG. 7, in operation 7030, the bundle management server 750 may perform at least one of following processes.
  a) The bundle management server may verify validity of the ssp1.Cert.DS included in the first terminal authentication information. Also, when the first terminal authentication information includes an electronic signature, the bundle management server may verify validity of the signature by using the ssp1.Cert.DS.
  b) When the first terminal authentication information includes encoded data, the bundle management server may generate the session key ShKeyM1 to be used for encryption communication with the first terminal by using the ssp1.ePK.KA and the secret key corresponding to the key agreement public key included in the SPBM.Cert.KA, and decode the encoded data by using the session key.
  c) The bundle management server may identify and/or store the received transaction ID and/or the SSP ID of the first SSP.
  d) The bundle management server may identify and/or store the bundle delimiter of the bundle to be transmitted by the first terminal.

In operation 7030, the bundle management server may further perform at least one of following processes.
  a) The bundle management server may verify whether the first terminal (for example, first SSP) is a rightful subject for using a current bundle, by using the SSP ID of the first SSP and the bundle delimiter of the bundle to be transmitted by the first terminal.
  b) The bundle management server may verify whether the bundle to be transmitted by the first terminal is a bundle capable of being transmitted online.
  c) The bundle management server may verify at least one of following matters by verifying the ssp2.EligibilityPackage: Whether certificate negotiation with the second terminal is successful and whether the bundle to be transmitted by the first terminal is normally installed and/or operated in the second terminal (for example, second SSP).

In operation 7030, the bundle management server 750 may generate a message (referred to as spbRequest) requesting the first terminal 710 for the bundle, and transmit the spbRequest to the first LBA. The spbRequest may include at least one of following pieces of information.
  a) SSP ID of first SSP
  b) SSP ID of second SSP
  c) Bundle delimiter of bundle to be transmitted by first terminal
  d) Transaction ID A part and/or all of information included in the spbRequest may be encoded by using the ShKeyM1, and the SHKeyM1 may be included as a part of the spbRequest.

A part and/or all of the information included in the spbRequest may be electronically signed by using SPBM.Cert.DS, and a value of the electronic signature may be included as a part of the spbRequest.

According to an embodiment, the bundle management server may transmit the spbRequest to the first LBA.

Referring to FIG. 7, in operation 7035, the first LBA 730 may transmit the spbRequest to the first SSP 720. In operation 7035, the first LBA 730 may further transmit ssp2.SelectedCryptoInfo to the first SSP 720. Details about the ssp2.SelectedCryptoInfo have been described with reference to FIG. 6.

According to an embodiment, the first SSP 720 may perform at least one of processes below.
  a) When the spbRequest includes encoded information, decode the encoded information by using the ShKeyM1.
  b) When the spbRequest includes a value of an electronic signature, verify the value by using the SPBM.Cert.DS.
  c) Verify whether the SSP ID of the first SSP and/or the SSP ID of the second SSP and/or the bundle delimiter of the bundle to be transmitted by the first terminal and/or the transaction ID, which are included in the spbRequest, have correct values.

The first SSP 720 may identify information included in the ssp2.SelectedCryptoInfo.

The first SSP 720 may configure the public key ssp1.ePK.BT and the secret key ssp1.eSK.BT, which are the encryption key pair. A value of the encryption key value may be the same as the values of ssp1.ePK.KA and ssp1.eSK.KA, according to an embodiment.

According to an embodiment, the first SSP 720 may generate a key ShKeyBT for encryption communication with the bundle management server 750, by using the generated ssp1.eSK.BT and a secret key corresponding to the public key included in the SPBM.Cert.KA.

According to an embodiment, the first SSP 720 may generate the key ShKeyBT for encryption communication with the second terminal, by using the generated ssp1.eSK.BT and ssp2.ePK.BT.

The first SSP 720 may prepare the bundle to be transmitted to the second terminal 760. A part and/or all of information included in the bundle may be encoded by using the ShKeyBT. The prepared bundle may be referred to as boundSpbImage.

The first SSP 720 may delete the prepared bundle.

The first SSP 720 may delete the bundle and generate a token (referred to as ssp1.Notification) for notifying the bundle management server 750 of information about the deletion.

In operation 7040, the first SSP 720 may transmit the boundSpbImage to the bundle management server 750. The first SSP 720 may further transmit the ssp1.ePK.BT to the bundle management server 750. The first SSP 720 may further transmit the ssp1.Notification to the bundle management server 750.

Referring to FIG. 7, in operation 7045, the bundle management server 750 may verify the ssp1.Notification and transmit a response message to the first LBA 730.

When the boundSpbImage is encoded by the encryption key generated by using the ssp1.eSK.BT and the public key included in the SPBM.Cert.KA, the bundle management server 750 may generate the encryption key ShKeyBT by using the ssp1.ePK.BT and the secret key corresponding to the public key included in the SPBM.Cert.KA, and then decode encoded data included in the boundSpbImage by using the encryption key.

The boundSpbImage received by the bundle management server 750 may be referred to as a bundle.

The bundle management server 750 may map some or all of following pieces of information to each other: The bundle, the bundle delimiter of the bundle to be transmitted by the first terminal, and the SSP ID of the second SSP.

The bundle management server 750 may transmit the response message to the first LBA 730.

Referring to FIG. 7, in operation 7050, the first LBA 730 may notify the second LBA 780 that bundle request initiation is possible. The first LBA 730 may transmit, to the second LBA 780, a message (referred to as startRequest) notifying that the bundle request initiation is possible. The startRequest may include the SSP ID of the second SSP installed in the second terminal. The startRequest may include the bundle delimiter of the bundle to be transmitted. The startRequest may include an indicator indicating that the bundle request initiation is now possible. The first LBA may add the indicator to the startRequest, or set a specific value to the indicator and then add the same to the startRequest, and transmit the startRequest to the second LBA, thereby notifying the second LBA that the bundle request initiation is possible.

Figure 8:
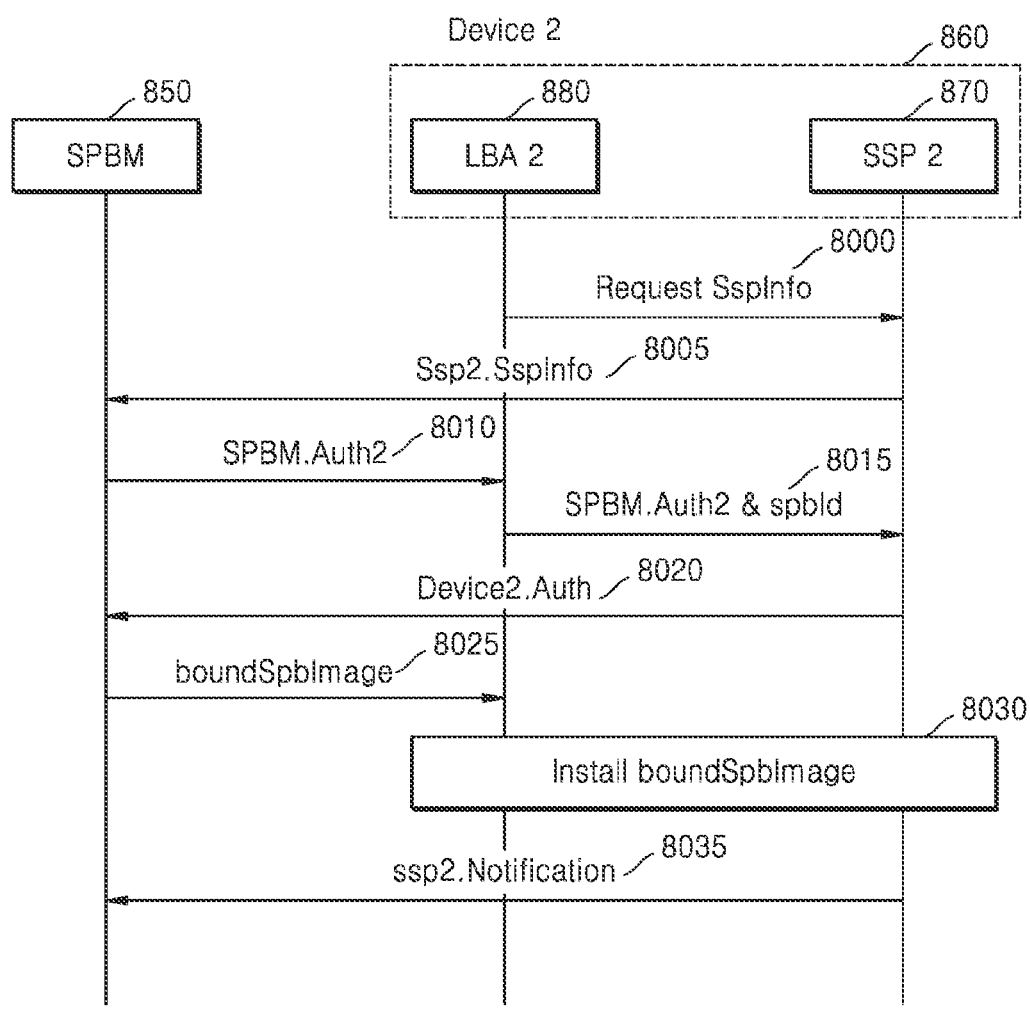
FIG. 8 is a diagram showing a procedure for downloading a bundle that was uploaded to a server to a terminal that is to receive the bundle, from among the procedures proposed in FIG. 5, according to an embodiment of the disclosure.

FIG. 8 is a diagram showing a procedure for downloading a bundle that was uploaded to a server to a terminal that is to receive the bundle, from among the procedures proposed in FIG. 5, according to an embodiment of the disclosure.

Referring to FIG. 8, a terminal may include at least one LBA and at least one SSP. For example, a second terminal 860 may include a second LBA 880 and a second SSP 870. Details about a bundle management server have been described with reference to FIG. 4.

Referring to FIG. 8, in operation 8000, the second LBA 880 may request the second SSP 870 for SSP information (SspInfo).

When requesting the second SSP 870 for the SSP information (SspInfo), the second LBA 880 may notify the second SSP that bundle transfer between devices is to be performed. When requesting the second SSP 870 for the SSP information (SspInfo), the second LBA 880 may further notify the second SSP that online bundle transfer between devices is to be performed. For example, a request message may include an indicator indicating that the bundle transfer between devices is to be performed. As another example, the request message may include an indicator indicating that the online bundle transfer between devices is to be performed. The request message may include the indicator or a value of the indicator may be set to a specific value, thereby notifying the second SSP that the bundle transfer between devices or the online bundle transfer between devices is to be performed.

The second LBA 880 may provide, to the second SSP 870, information about a bundle to be transmitted. The information may include at least one of FID (SPB family ID) and OID (SPB family custodian object ID).

Referring to FIG. 8, in operation 8005, the second SSP 870 may generate its SSP information (ssp2.SspInfo) and transmit the SSP information to a bundle management server 850 through the second LBA 880.

The SSP information may include information about the second SSP to be provided for bundle transmission. Here, the SSP information may include information (certificate negotiation information) for a certificate negotiation process to be performed for the second SSP 870 to communicate with the bundle management server 850. The certificate negotiation information may include certificate information that may be used by the second SSP 870 to verify the bundle management server and/or certificate information that may be used by the bundle management server 850 to verify the second SSP. Also, the certificate negotiation information may further include a list of key agreement algorithms supported by the second SSP 870, and further include a list of encryption algorithms supported by the second SSP 870.

The SSP information may further include SSP version information including at least one piece of version information from among pieces of version information of the standard supported by a loader and primary platform included in the second SSP 870.

According to an embodiment, the second SSP 870 may transmit the SSP information to the bundle management server 850 through the second LBA.

In operations 8000 through 8005, the second LBA 880 may request the second SSP 870 for the SSP information, the second SSP 870 may generate its SSP information, and the second SSP 870 may transmit the SSP information to the bundle management server 850 through the second LBA 880. However, according to an embodiment, the second LBA 880 may self-generate the SSP information and transmit the SSP information to the bundle management server 850.

Referring to FIG. 8, in operation 8010, the bundle management server 850 may identify the received SSP information, generate server authentication information (SPBM.Auth2) based on the SSP information, and transmit the server authentication information to the second LBA.

The server authentication information may include at least one of following pieces of information.

a) A key agreement certificate (referred to as SPBM.Cert.KA) that may be used to verify an SPBM itself and certificates required to verify the key agreement certificate.

b) Certificate information (referred to as CiPkIdToBeUsed) that may be used by an SPBM to verify a second SSP.

c) Encryption algorithm information (referred to as CryptoToBeUsed) that is to be used for an SPBM to perform encryption communication with a second SSP.

According to an embodiment, the bundle management server 850 may transmit the server authentication information to the second LBA 880.

Referring to FIG. 8, in operation 8015, the second LBA 880 may transmit the server authentication information to the second SSP 870. The second LBA 880 may further transmit, to the second SSP 870, a bundle delimiter of the bundle to be received.

According to an embodiment, the second SSP 870 may perform at least one of operations specified below.
a) Validity of SPBM.Cert.KA may be identified.
b) At least one of signature certificates (ssp2.Cert.DS) capable of verifying a second SSP based on received CiPkIdToBeUsed may be selected.
c) Received CryptoToBeUsed may be identified and an encryption key pair, i.e., a public key ssp2.ePK.KA and a secret key ssp2.eSK.KA, which is to be used to generate an encryption key for encryption communication with a bundle management server may be generated. Also, the second SSP may generate ShKeyM2 that is a session key to be used for encryption communication with the bundle management server, by using the ssp2.eSK.KA and a key agreement public key included in the SPBM.Cert.KA.

In operation 8020, the second SSP 870 may generate second terminal authentication information (Device2.Auth) and transmit the second terminal authentication information (Device2.Auth) to the bundle management server 850. The second terminal authentication information (Device2.Auth) may include at least one of following pieces of information.
a) ssp2.Cert.DS
b) ssp2.ePK.KA
c) Transaction ID referring to current session
d) SSP ID of second SSP 870
e) Bundle delimiter of bundle to be received A part or all of the second terminal authentication information (Device2.Auth) may be digitally signed such that verification is possible by using the ssp2.Cert.DS to guarantee integrity of information, and digital signature data may be added as a part of the second terminal authentication information.

Also, a part or all of the second terminal authentication information (Device2.Auth) may be encoded by using the generated session key ShKeyM2.

According to an embodiment, the second SSP 870 may transmit the second terminal authentication information (Device2.Auth) to the bundle management server 850 through the second LBA 880.

According to an embodiment, the bundle management server 850 may perform at least one of processes below.
a) The bundle management server may verify validity of the ssp2.Cert.DS included in the second terminal authentication information. Also, when the second terminal authentication information includes an electronic signature, the bundle management server may verify validity of the signature by using the ssp2.Cert.DS.
b) When the second terminal authentication information includes encoded data, the bundle management server may generate the session key ShKeyM2 to be used for encryption communication with the second terminal by using the ssp2.ePK.KA and the secret key corresponding to the key agreement public key included in the SPBM.Cert.KA, and decode the encoded data by using the session key.
c) The bundle management server may identify and/or store the received transaction ID and/or the SSP ID of the second SSP.
d) The bundle management server may identify and/or store the bundle delimiter of the bundle to be received by the second terminal.

According to an embodiment, the bundle management server 850 may further perform at least one of processes below.
a) The bundle management server may identify whether there is the bundle to be transmitted to the second terminal, by using the SSP ID of the second SSP.
b) The bundle management server may identify whether there is the bundle to be transmitted to the second terminal, by using the bundle delimiter of the bundle to be received by the second terminal.
c) The bundle management server may prepare the bundle when there is the bundle to be transmitted to the second terminal. (The prepared bundle is referred to as boundSpbImage)

For example, when there is a bundle mapped to the SSP ID of the second SSP and/or the bundle delimiter of the bundle to be received by the second terminal from among bundles uploaded from the first terminal in FIG. 7, the such a bundle may be selected.

Here, when the selected bundle is not required to be encoded again, the bundle management server may prepare to transmit the bundle.

Alternatively, when the selected bundle needs to be encoded by using an encryption key between the bundle management server and the second terminal, the bundle management server may encode a part and/or all of the bundle by using ShKeyM2 and then prepare to transmit the bundle.

Alternatively, when the selected bundle needs to be encoded by using the encryption key between the bundle management server and the second terminal, the bundle management server may generate a public key SPBM.ePK.BT and a secret key SPBM.eSK.BT, which are a key pair, generate the encryption key ShKeyBT by using the SPBM.eSK.BT and the ssp2.ePK.KA, encode the part and/or all of the bundle by using the encryption key, and then prepare to transmit the bundle.

In operation 8025, the bundle management server 850 may transmit the boundSpbImage to the second LBA 880. The bundle management server 850 may further transmit the SPBM.ePK.BT to the second LBA 880. The bundle management server 850 may further transmit the ssp1.ePK.BT to the second LBA 880.

Referring to FIG. 8, in operation 8030, the bundle may be installed in the second SSP.

According to an embodiment, when the bundle is encoded by using a key for encryption between the bundle management server 850 and the second terminal 860, the second SSP 870 may decode encoded information by using the ShKeyM2.

According to another embodiment, when the bundle is encoded by using the key for encryption between the bundle management server 850 and the second terminal 860, the second SSP 870 may generate the encryption key ShKeyBT by using the SPBM.ePK.BT, and then decode the encoded information by using the encryption key.

According to another embodiment, when the bundle is encoded by using a key for encryption between the first terminal and the second terminal, the second SSP 870 may generate the encryption key ShKeyBT by using the ssp1.ePK.BT, and then decode the encoded information by using the encryption key.

Referring to FIG. 8, in operation 8035, the second SSP 870 may notify the bundle management server 850 of a result of installing the bundle. For example, the second SSP 870 may transmit, to the bundle management server 850, a message (referred to as ssp2.Notification) containing the result of installing the bundle.

Figure 9:
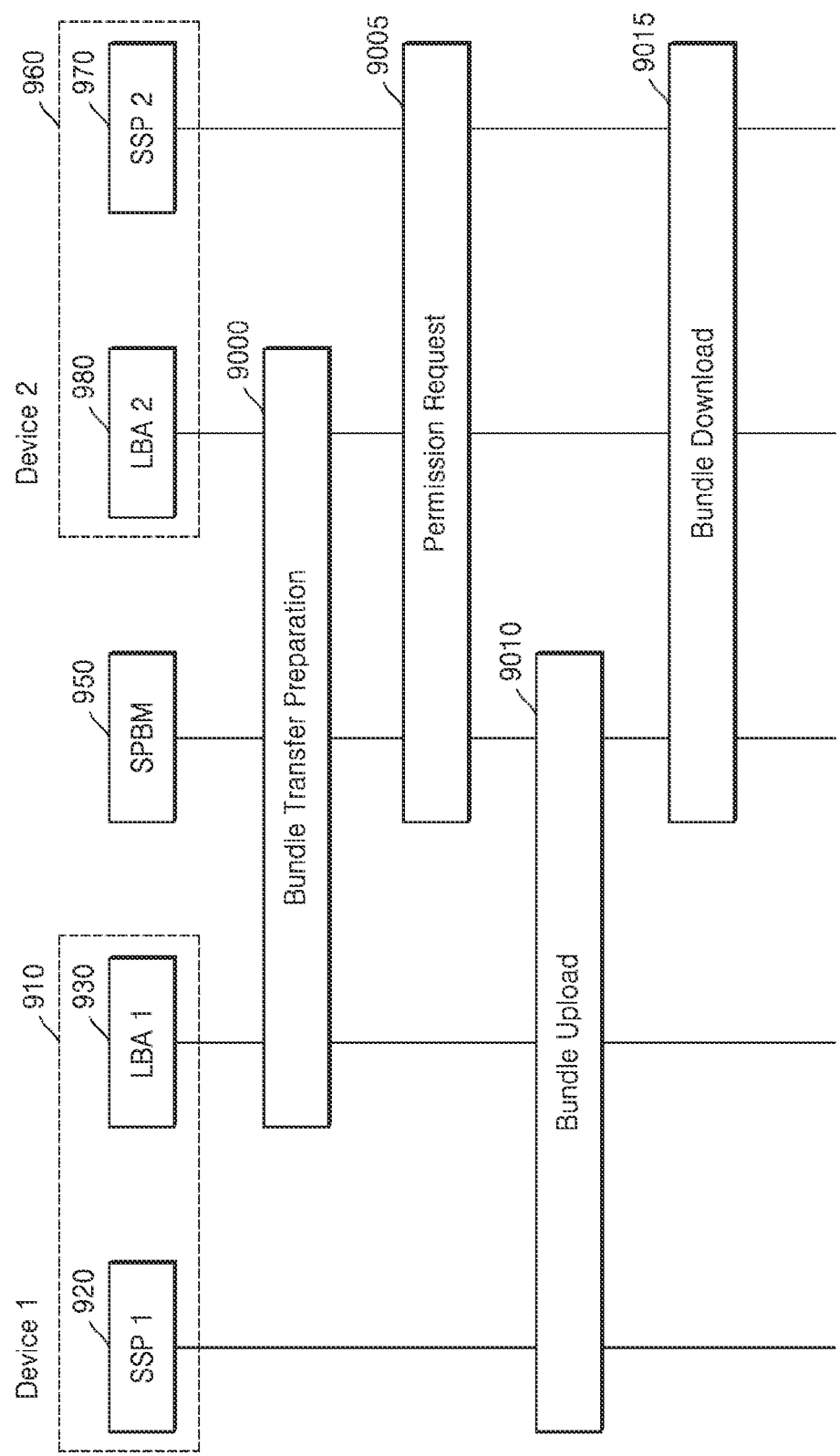
FIG. 9 is a diagram conceptually illustrating another example of a procedure for transmitting a bundle online from one terminal to another terminal, according to an embodiment of the disclosure.

FIG. 9 is a diagram conceptually illustrating another example of a procedure for transmitting a bundle online from one terminal to another terminal, according to an embodiment of the disclosure.

Referring to FIG. 9, a terminal may include at least one LBA and at least one SSP. For example, as shown in FIG. 9, a first terminal 910 may include a first LBA 930 and a second SSP 920, and a second terminal 960 may include a second LBA 980 and a second SSP 970. Details about a bundle management server have been described with reference to FIG. 4.

In operation 9000, the first terminal 910 and the second terminal 960 may perform preparation procedures (bundle transmission preparation procedures) required to transmit a bundle. Details about the bundle transmission preparation procedures will be described below with reference to FIG. 10.

In operation 9005, the second terminal 960 may receive a bundle transmission approval from a bundle management server 950. Details about a corresponding procedure will be described below with reference to FIG. 11.

In operation 9010, the first terminal 910 may upload, to the bundle management server 950, a bundle to be transmitted to the second terminal. Details about a corresponding procedure will be described below with reference to FIG. 12.

In operation 9015, the second terminal 960 may download, from the bundle management server 950, the bundle uploaded in operation 9010, and install the bundle. Details about a corresponding procedure will be described below with reference to FIG. 13.

Figure 10:
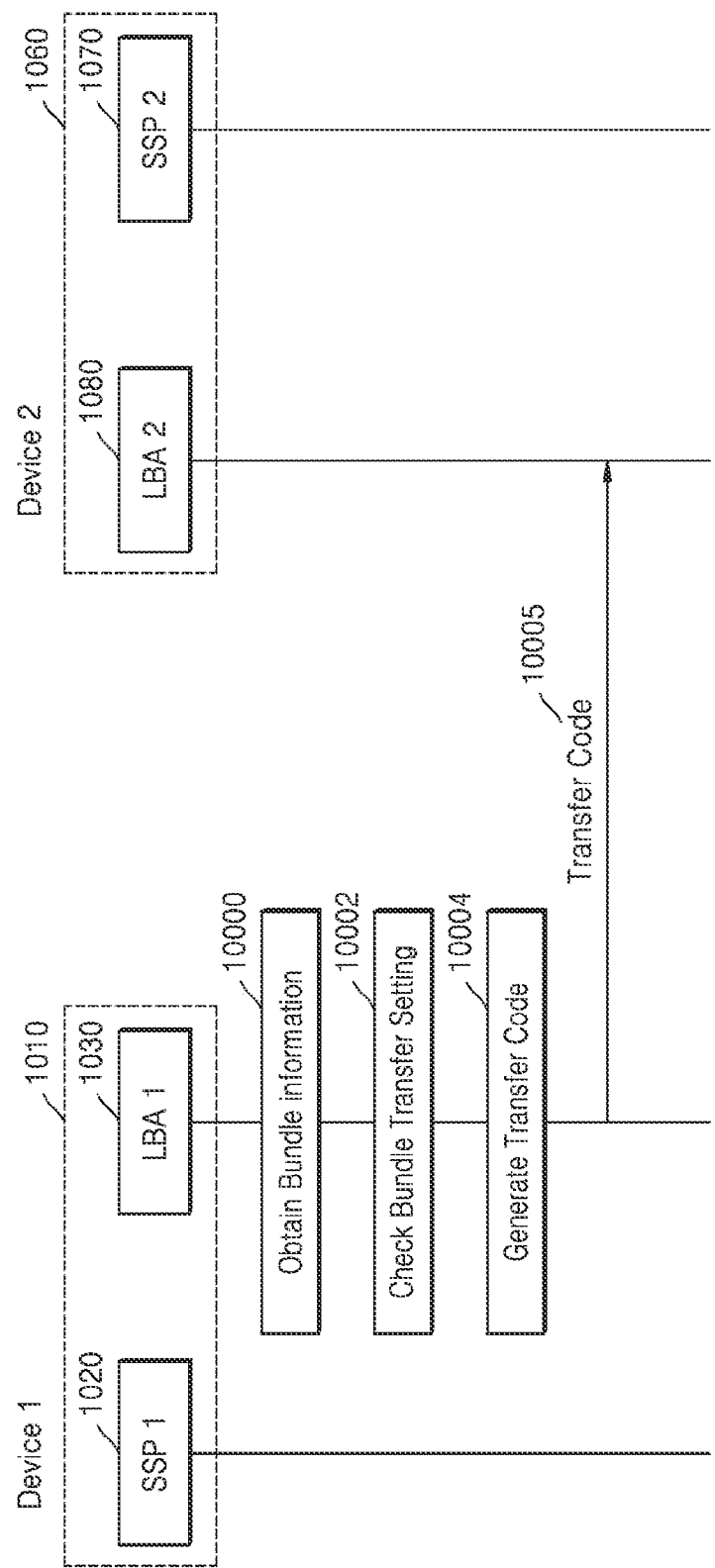
FIG. 10 is a diagram showing detailed procedures of a procedure for preparing to transmit a bundle, from among procedures proposed in FIG. 9, according to an embodiment of the disclosure.

FIG. 10 is a diagram showing detailed procedures of a procedure for preparing to transmit a bundle, from among the procedures proposed in FIG. 9, according to an embodiment of the disclosure.

Referring to FIG. 10, a terminal may include at least one LBA and at least one SSP. For example, a first terminal 1010 may include a first LBA 1030 and a first SSP 1020, and a second terminal 1060 may include a second LBA 1080 and a second SSP 1070.

According to various embodiments, the first terminal 1010 may include pre-installed bundles, and further include metadata associated with the pre-installed bundles. According to various embodiments, the first terminal 1010 may include at least one of a bundle ID (SPB ID), FID (SPB family ID), or OID (SPB family custodian object ID), which is related to the pre-installed bundle.

According to various embodiments, the first terminal 1010 may include a bundle transfer configuration related to the pre-installed bundle. Details about the bundle transfer configuration have been described with reference to FIG. 6.

Referring to FIG. 10, in operation 10000, the first LBA 1030 may obtain information about a bundle to be transmitted between devices. Alternatively, the information about the bundle to be transmitted between devices may be delivered to the first LBA. For example, the first LBA may obtain the information about the bundle to be transmitted by receiving a user input of a user selecting the bundle through a UI provided by the first terminal 1010, the information about the bundle to be transmitted may be input to the first LBA through a push input from a remote server, or the first LBA may read the information about the bundle to be transmitted by accessing a remote server.

In operation 10002, the first LBA 1030 may identify whether transmission of the bundle between devices is possible, by using the bundle transfer configuration. Also, the first LBA 1030 may identify whether online transmission of the bundle between devices is possible by checking the bundle transfer configuration.

In operation 10004, the first LBA 1030 may generate a bundle transmission code. The bundle transmission code may include a bundle delimiter of the bundle to be transmitted, such as a bundle ID (SPB ID), an FID (SPB family ID), or an OID (SPB family custodian object ID). Also, the bundle transmission code may further include other information (for example, metadata of the bundle or a part of the metadata) indicating an attribute of the bundle. The bundle transmission code may include n address (SPBM Addr) of a bundle management server associated with the bundle to be transmitted.

Also, the bundle transmission code may include information (Supported Crypto Info) about encryption algorithms supported by the first terminal (for example, first SSP). The information about the encryption algorithms supported by the first terminal may selectively include at least one of following pieces of information: an oval curve list supported by the first terminal, a key agreement algorithm list supported by the first terminal, and an encryption algorithm list supported by the first terminal.

Referring to FIG. 10, in operation 10005, the bundle transmission code generated in operation 10000 may be transmitted from the first LBA 1030 to the second LBA 1080. The bundle transmission code may be transmitted via any one of various methods.

For example, the first LBA 1030 may provide information to be transmitted to the second LBA 1080 to a first user of the first terminal through the UI of the first terminal. The first user may provide the provided information to a second user of the second terminal. The second user may input the provided information to the second LBA by using a UI of the second terminal.

Alternatively, the first LBA 1030 may generate an image (for example, a QR code) of the information to be delivered to the second LBA 1080 and display the same on a screen of the first terminal, and the second user may scan the image displayed on the screen of the first terminal by using the second terminal and transmit the information to the second LBA.

Alternatively, the first LBA 1030 may establish a connection between the first LBA 1030 and the second LBA 1080 and deliver the information to be transmitted by using the established connection. Here, the connection between the first LBA 1030 and the second LBA 1080 may be a direct connection between devices (for example, NFC, Bluetooth, UWB, Wi-Fi direct, LTE device-to-device (D2D), or 5G D2D), or a remote connection in which a remote server (for example, a relay server) is located between the first LBA 1030 and the second LBA 1080.

Figure 11:
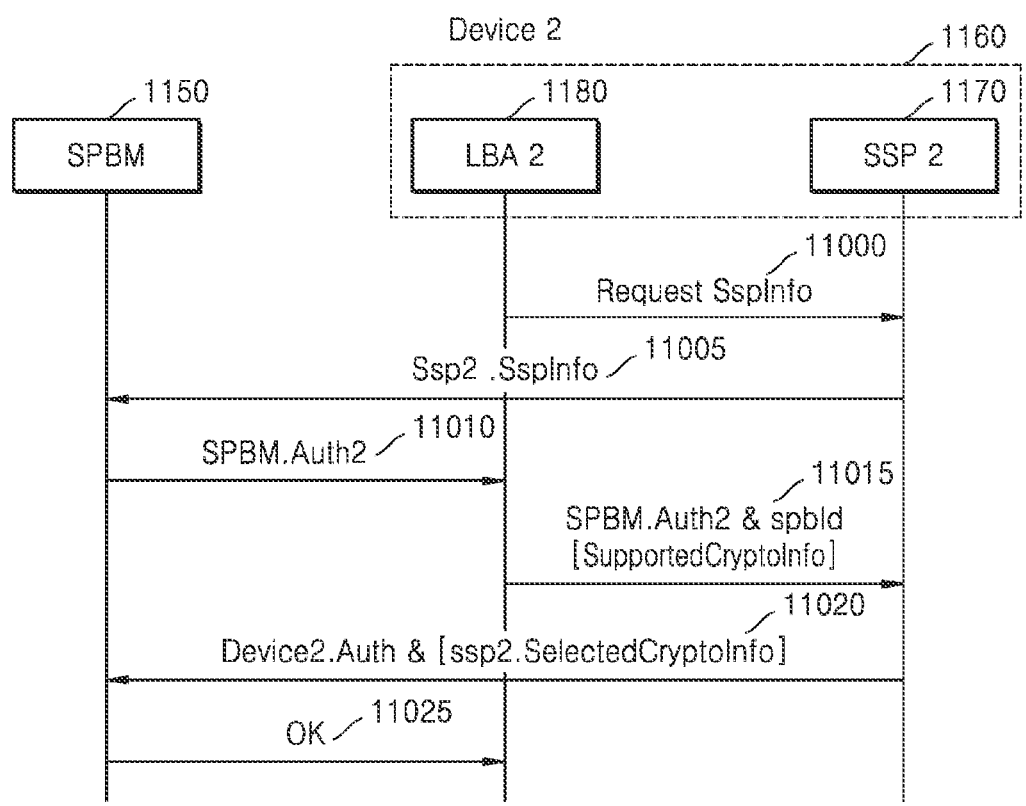
FIG. 11 is a diagram showing a procedure by which a terminal that received a bundle receives approval by communicating with a server, from among the procedures proposed in FIG. 9, according to an embodiment of the disclosure.

FIG. 11 is a diagram showing a procedure by which a terminal that received a bundle receives approval by communicating with a server, from among the procedures proposed in FIG. 9, according to an embodiment of the disclosure.

Referring to FIG. 11, a terminal may include at least one LBA and at least one SSP. For example, a second terminal 1160 may include a second LBA 1180 and a second SSP 1170. Details about a bundle management server 1150 have been described with reference to FIG. 4.

Referring to FIG. 11, in operation 11000, the second LBA 1180 may request the second SSP 1170 for SSP information (SspInfo).

When requesting the second SSP 1170 for the SSP information (SspInfo), the second LBA 1180 may notify the second SSP that bundle transfer between devices is to be performed. When requesting the second SSP 1170 for the SSP information (SspInfo), the second LBA 1180 may further notify the second SSP that online bundle transfer between devices is to be performed. For example, a request message may include an indicator indicating that the bundle transfer between devices is to be performed. As another example, the request message may include an indicator indicating that the online bundle transfer between devices is to be performed. The request message may include the indicator or a value of the indicator may be set to a specific value, thereby notifying the second SSP that the bundle transfer between devices or the online bundle transfer between devices is to be performed.

The second LBA 1180 may provide, to the second SSP 1170, information about a bundle to be transmitted. The information may include at least one of FID (SPB family ID) and OID (SPB family custodian object ID).

Referring to FIG. 11, in operation 11005, the second SSP may generate its SSP information (ssp2.SspInfo) and transmit the SSP information to the bundle management server 1150 through the second LBA 1180.

The SSP information may include information about the second SSP to be provided for bundle transmission. Here, the SSP information may include information (certificate negotiation information) for a certificate negotiation process to be performed for the second SSP 1170 to communicate with the bundle management server 1150. The certificate negotiation information may include certificate information that may be used by the second SSP 1170 to verify the bundle management server 1150 and/or certificate information that may be used by the bundle management server 1150 to verify the second SSP 1170. Also, the certificate negotiation information may further include a list of key agreement algorithms supported by the second SSP, and further include a list of encryption algorithms supported by the second SSP.

The SSP information may further include SSP version information including at least one piece of version information from among pieces of version information of the standard supported by a loader and primary platform included in the second SSP.

According to an embodiment, the second SSP 1170 may transmit the SSP information to the bundle management server 1150 through the second LBA 1180.

According to operations 11000 and 11005, the second LBA may request the second SSP for the SSP information, the second SSP may generate its SSP information, and then the second SSP may transmit the SSP information to the bundle management server through the second LBA. However, according to an embodiment, the second LBA may self-generate the SSP information and transmit the SSP information to the bundle management server.

Referring to FIG. 11, in operation 11010, the bundle management server 1150 may identify the received SSP information, generate server authentication information (SPBM.Auth2) based on the SSP information, and transmit the generated server authentication information to the second LBA.

The server authentication information may include at least one of following pieces of information.

a) A key agreement certificate (referred to as SPBM.Cert.KA) that may be used to verify an SPBM itself and certificates required to verify the key agreement certificate.
b) Certificate information (referred to as CiPkIdToBeUsed) that may be used by an SPBM to verify a second SSP.
c) Encryption algorithm information (referred to as CryptoToBeUsed) that is to be used for an SPBM to perform encryption communication with a second SSP.

According to an embodiment, the bundle management server 1150 may transmit the server authentication information to the second LBA 1180.

Referring to FIG. 11, in operation 11015, the second LBA 1180 may transmit the server authentication information to the second SSP 1170. The second LBA 1180 may further transmit, to the second SSP 1170, a bundle delimiter of the bundle to be received.

The second LBA 1180 may further transmit Supported Crypto Info to the second SSP 1170. Details about the Supported Crypto Info have been described with reference to FIG. 10.

Referring to FIG. 11, in operation 11020, the second SSP 1170 may perform at least one of operations specified below.

a) Validity of SPBM.Cert.KA may be identified.
b) At least one of signature certificates (ssp2.Cert.DS) capable of verifying a second SSP based on received CiPkIdToBeUsed may be selected.
c) Received CryptoToBeUsed may be identified and an encryption key pair, i.e., a public key ssp2.ePK.KA and a secret key ssp2.eSK.KA, which is to be used to generate an encryption key for encryption communication with a bundle management server may be generated. Also, the second SSP may generate ShKeyM2 that is a session key to be used for encryption communication with the bundle management server, by using the ssp2.eSK.KA and a key agreement public key included in the SPBM.Cert.KA.

According to an embodiment, the second SSP 1170 may generate second terminal authentication information (Device2.Auth). The second terminal authentication information (Device2.Auth) may include at least one of following pieces of information.

a) ssp2.Cert.DS
b) ssp2.ePK.KA
c) Transaction ID referring to current session
d) SSP ID of second SSP
e) Part number ID of second SSP
f) Bundle delimiter of bundle to be received According to an embodiment, the second SSP 1170 may identify the received Supported Crypto Info and identify whether encryption algorithms supported by the second terminal (for example, second SSP) are present thereamong. When the encryption algorithms supported by the second terminal are present among the received Supported Crypto Info, the second SSP 1170 may select one of the encryption algorithms as a selected encryption algorithm. The selected encryption algorithm may selectively include at least one of following pieces of information: Oval curve information, key agreement algorithm information, and encryption algorithm information.

The second SSP 1170 may generate, based on the selected encryption algorithm, a key pair (a temporary public key ssp2.ePK.BT and a corresponding secret key ssp2.eSK.BT) of the second terminal to be used later to generate an encryption key for encryption communication with the first terminal. The second SSP 1170 may map the generated key pair to the received bundle ID (SPB ID). The second SSP 1170 may generate selected encryption information (ssp2.SelectedCryptoInfo). The selected encryption information may selectively include at least one of following pieces of information: A part and/or all of the selected encryption algorithm and ssp2.eEPK.BT.

To guarantee integrity of information, a part or all of second terminal authentication information (Device2.Auth) and/or selected encryption information (ssp2.SelectedCryptoInfo) may be digitally signed so as to be verifiable by using ssp2.Cert.DS, and digital signature data may be added as a part of the second terminal authentication information.

Also, a part or all of the second terminal authentication information (Device2.Auth) and/or selected encryption information (ssp2.SelectedCryptoInfo) may be encoded by using a session key ShKeyM2 generated above.

In operation 11020, the second SSP 1170 may transmit, to the bundle management server 1150 through the second LBA 1180, the second terminal authentication information (Device2.Auth) and/or the selected encryption information (ssp2.SelectedCryptoInfo).

Referring to FIG. 11, in operation 11025, the bundle management server 1150 may perform at least one of following processes.
  a) The bundle management server may verify validity of the ssp2.Cert.DS included in the second terminal authentication information. Also, when the second terminal authentication information includes an electronic signature, the bundle management server may verify validity of the signature by using the ssp2.Cert.DS.
  b) When the second terminal authentication information includes encoded data, the bundle management server may generate the session key ShKeyM2 to be used for encryption communication with the second terminal by using the ssp2.ePK.KA and the secret key corresponding to the key agreement public key included in the SPBM.Cert.KA, and decode the encoded data by using the session key.
  c) The bundle management server may identify and/or store the received transaction ID and/or the SSP ID of the second SSP.
  d) The bundle management server may identify and/or store the bundle delimiter of the bundle to be received by the second terminal.

According to an embodiment, the bundle management server 1150 may further perform at least one of processes below.
  a) The bundle management server may identify the bundle delimiter of the bundle to be received by the second terminal and verify whether the bundle is a bundle capable of being transmitted online. For example, a process of verifying whether the bundle is a bundle capable of being transmitted online may be performed as the bundle management server 1150 performs verification by using a value of the bundle transfer configuration of the bundle.
  b) The bundle management server may identify whether the bundle to be received by the second terminal is normally installed and/or operated in the second terminal (for example, second SSP). For example, such an identifying process may be performed by using the part number ID of the second terminal (for example, second SSP) and/or the bundle delimiter of the bundle to be received by the second terminal.

According to an embodiment, the bundle management server 1150 may map some or all of following pieces of information: The SSP ID of the second SSP, the bundle delimiter of the bundle to be received, and the selected encryption information (ssp2.SelectedCryptoInfo).

In operation 11025, the bundle management server 1150 may transmit, to the second LBA 1180, a response message indicating that all processes are completed. A process of transmitting the response message indicating that all processes are completed may be omitted.

Figure 12:
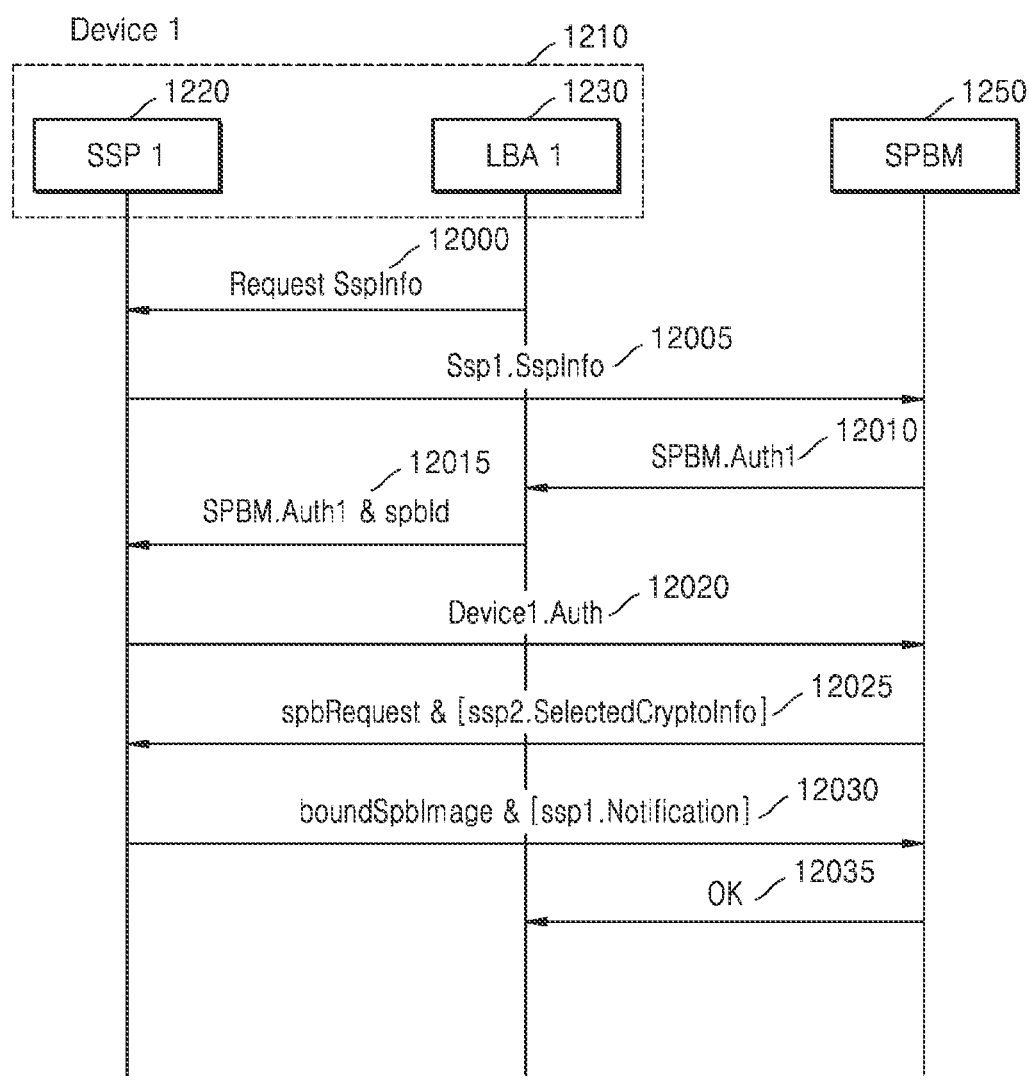
FIG. 12 is a diagram showing a procedure by which a terminal that is to transmit a bundle uploads the bundle to be transmitted to a server, from among the procedures proposed in FIG. 9, according to an embodiment of the disclosure.

FIG. 12 is a diagram showing a procedure by which a terminal that is to transmit a bundle uploads the bundle to be transmitted to a server, from among the procedures proposed in FIG. 9, according to an embodiment of the disclosure.

Referring to FIG. 12, a terminal may include at least one LBA and at least one SSP. For example, a first terminal 1210 may include a first LBA 1230 and a first SSP 1220. Details about a bundle management server 1250 have been described with reference to FIG. 4.

Referring to FIG. 12, in operation 12000, the first LBA 1230 may request the first SSP 1220 for SSP information (SspInfo).

When requesting the first SSP for the SSP information (SspInfo), the first LBA may notify the first SSP that bundle transfer between devices is to be performed. When requesting the first SSP for the SSP information (SspInfo), the first LBA may further notify the first SSP that online bundle transfer between devices is to be performed. For example, a request message may include an indicator indicating that the bundle transfer between devices is to be performed. As another example, the request message may include an indicator indicating that the online bundle transfer between devices is to be performed. The request message may include the indicator or a value of the indicator may be set to 1, thereby notifying the first SSP that the bundle transfer between devices or the online bundle transfer between devices is to be performed.

The first LBA may provide, to the first SSP, information about a bundle to be transmitted. The information may include at least one of FID (SPB family ID) and OID (SPB family custodian object ID).

Referring to FIG. 12, in operation 12005, the first SSP may generate its SSP information (ssp1.SspInfo) and transmit the SSP information to the bundle management server 1250 through the first LBA 1230.

The SSP information may include information about the first SSP to be provided for bundle transmission. Here, the SSP information may include information (certificate negotiation information) for a certificate negotiation process to be performed for the first SSP to communicate with the bundle management server. The certificate negotiation information may include certificate information that may be used by the first SSP to verify the bundle management server and/or certificate information that may be used by the bundle management server to verify the first SSP. Also, the certificate negotiation information may further include a list of key agreement algorithms supported by the first SSP, and further include a list of encryption algorithms supported by the first SSP.

The SSP information may further include SSP version information including at least one piece of version information from among pieces of version information of the standard supported by a loader and primary platform included in the first SSP.

According to an embodiment, the first SSP 1220 may transmit the SSP information to the bundle management server 1250 through the first LBA 1230.

According to operations 12000 and 12005, the first LBA may request the first SSP for the SSP information, the first SSP may generate its SSP information, and then the first SSP may transmit the SSP information to the bundle management server through the first LBA. However, according to an embodiment, the first LBA may self-generate the SSP information and transmit the SSP information to the bundle management server.

Referring to FIG. 12, in operation 12010, the bundle management server 1250 may identify the received SSP information, generate server authentication information (SPBM.Auth1) based on the SSP information, and transmit the server authentication information to the first LBA 1230.

The server authentication information may include at least one of following pieces of information.
- a) A key agreement certificate (referred to as SPBM.Cert.KA) that may be used to verify an SPBM itself and certificates required to verify the key agreement certificate.
- b) Certificate information (referred to as CiPkIdToBeUsed) that may be used by an SPBM to verify a first SSP.
- c) Encryption algorithm information (referred to as CryptoToBeUsed) that is to be used for an SPBM to perform encryption communication with a first SSP.

According to an embodiment, the bundle management server 1250 may transmit the server authentication information to the first LBA 1230.

Referring to FIG. 12, in operation 12015, the first LBA 1230 may transmit the server authentication information to the first SSP 1220. Also, the first LBA 1230 may further transmit, to the first SSP 1220, a bundle delimiter of the bundle to be transmitted.

Referring to FIG. 12, in operation 12020, the first SSP 1220 may perform at least one of operations specified below.
- a) Validity of received SPBM.Cert.KA may be identified.
- b) At least one of signature certificates (ssp1.Cert.DS) capable of verifying a first SSP based on received CiPkIdToBeUsed may be selected.
- c) Received CryptoToBeUsed may be identified and an encryption key pair, i.e., a public key ssp1.ePK.KA and a secret key ssp1.eSK.KA, which is to be used to generate an encryption key for encryption communication with a bundle management server may be generated. Also, the first SSP may generate ShKeyM1 that is a session key to be used for encryption communication with the bundle management server, by using the ssp1.eSK.KA and a key agreement public key included in the SPBM.Cert.KA.

In operation 12020, the first SSP 1220 may generate first terminal authentication information (Device1.Auth) and transmit the first terminal authentication information (Device1.Auth) to the bundle management server 1250. The first terminal authentication information (Device1.Auth) may include at least one of following pieces of information.
- a) ssp1.Cert.DS
- b) ssp1.ePK.KA
- c) Transaction ID referring to current session
- d) SSP ID of first SSP
- e) Bundle delimiter of bundle to be transmitted A part or all of the first terminal authentication information (Device1.Auth) may be digitally signed such that verification is possible by using the ssp1.Cert.DS to guarantee integrity of information, and digital signature data may be added as a part of the first terminal authentication information.

Also, a part or all of the first terminal authentication information (Device1.Auth) may be encoded by using the generated session key ShKeyM1.

According to an embodiment, the first SSP 1220 may transmit the first terminal authentication information (Device1.Auth) to the bundle management server 1250 through the first LBA 1230.

Referring to FIG. 12, in operation 12025, the bundle management server 1250 may perform at least one of following processes. (Hereinafter, a series of such processes will be referred to as a process A).
- a) The bundle management server may verify validity of the ssp1.Cert.DS included in the first terminal authentication information. Also, when the first terminal authentication information includes an electronic signature, the bundle management server may verify validity of the signature by using the ssp1.Cert.DS.
- b) When the first terminal authentication information includes encoded data, the bundle management server may generate the session key ShKeyM1 to be used for encryption communication with the first terminal by using the ssp1.ePK.KA and the secret key corresponding to the key agreement public key included in the SPBM.Cert.KA, and decode the encoded data by using the session key.
- c) The bundle management server may identify and/or store the received transaction ID and/or the SSP ID of the first SSP.
- d) The bundle management server may identify and/or store the bundle delimiter of the bundle to be transmitted by the first terminal.

According to an embodiment, the bundle management server 1250 may further perform at least one of processes below. (Hereinafter, a series of such processes will be referred to as a process B).
- a) The bundle management server may verify whether the first terminal (for example, first SSP) is a rightful subject for using a current bundle, by using the SSP ID of the first SSP and the bundle delimiter of the bundle to be transmitted by the first terminal.
- b) The bundle management server may verify whether the bundle to be transmitted by the first terminal is a bundle of which bundle transmission is already requested and approved. For example, the bundle management server may identify whether the bundle delimiter of the bundle to be transmitted by the first terminal is a bundle delimiter stored in operation 11025 of FIG. 11.

Between the process A and the process B, the bundle management server 1250 may stand by until the operations proposed in FIG. 11 are completed. In other words, the process A may be performed regardless of whether the operations proposed in FIG. 11 are completed, but the process B is performed only after the operations proposed in FIG. 11 are completed, and in this case, the bundle management server may stand by until the operations proposed in FIG. 11 are completed before performing the process B. Such a standing by process may be performed via any one of various methods described below. However, the standing by process is not limited by the various methods described below, and is not necessarily be one of the methods described below.
- a) The bundle management server may transmit, to the first LBA, a message indicating that a requested operation has been received for now but needs to stand by until a response is received. The first LBA may stand by for a certain period of time, and then transmit a message to the bundle management server to verify whether the requested operation has been performed. When performing of the operation is completed, the process B may be performed. When the performing of the operation is not completed, the bundle management server may transmit, to the first LBA, a message to stand by a little longer. Such processes may be repeated until the operations proposed in FIG. 11 are completed.

b) The bundle management server may stand by within a time range determined between the process A and the process B. In other words, the process B may be performed when the operations proposed in FIG. 11 are completed within a determined time after the process A is performed. When the operations proposed in FIG. 11 are not completed within the determined time after the process A is performed, the bundle transmission may be stopped.

c) After performing the process A, the bundle management server may notify the first LBA that the requested operation has been received for now. Then, the process B may be performed after the operations proposed in FIG. 11 are completed.

In operation 12025, the bundle management server 1250 may generate a message (spbRequest, this may also be referred to as transferOption) requesting the first terminal for a bundle, and transmit, to the first SSP 1220, the message (spbRequest) requesting the bundle. The bundle management server 1250 may further transmit ssp2.SelectedCryptoInfo to the first SSP 1220.

The spbRequest may include at least one of following pieces of information.

a) SSP ID of first SSP
b) SSP ID of second SSP
c) Bundle delimiter of bundle to be transmitted by first terminal
d) Transaction ID A part and/or all of information included in the spbRequest may be encoded by using the ShKeyM1, and the SHKeyM1 may be included as a part of the spbRequest.

A part and/or all of the information included in the spbRequest may be electronically signed by using SPBM.Cert.DS, and a value of the electronic signature may be included as a part of the spbRequest. In this case, a series of pieces of information required to verify the SPBM.Cert.DS and validity of the SPBM.Cert.DS may be included as a part of the spbRequest.

According to an embodiment, the bundle management server 1250 may transmit the spbRequest to the first SSP 1220 through the first LBA 1230.

According to an embodiment, the bundle management server 1250 may further transmit ssp2.SelectedCryptoInfo to the first SSP 1220 through the first LBA 1230. Details about the ssp2.SelectedCryptoInfo have been described with reference to FIG. 6.

Referring to FIG. 12, in operation 12030, the first SSP 1220 may perform at least one of following processes.

a) When the spbRequest includes encoded information, decode the encoded information by using the ShKeyM1.
b) When the spbRequest includes an electronic signature value, verify the validity of the SPBM.Cert.DS and then verify validity of the value of the electronic signature by using the SPBM.Cert.DS.
c) Verify whether the SSP ID of the first SSP and/or the SSP ID of the second SSP and/or the bundle delimiter of the bundle to be transmitted by the first terminal and/or the transaction ID, which are included in the spbRequest, have correct values.

The first SSP 1220 may identify information included in the ssp2.SelectedCryptoInfo.

The first SSP 1220 may configure a public key ssp1.ePK.BT and a secret key ssp1.eSK.BT, which are the encryption key pair. A value of the encryption key value may be the same as the values of ssp1.ePK.KA and ssp1.eSK.KA, according to an embodiment.

According to an embodiment, the first SSP 1220 may generate a key ShKeyBT for encryption communication with the bundle management server, by using the prepared ssp1.eSK.BT and the public key included in the SPBM.Cert.KA.

According to an embodiment, the first SSP 1220 may generate the key ShKeyBT for encryption communication with the second terminal, by using the prepared ssp1.eSK.BT and ssp2.ePK.BT.

The first SSP 1220 may prepare and/or generate the bundle to be transmitted to the second terminal. A part and/or all of information included in the bundle may be encoded by using the ShKeyBT. The prepared bundle may be referred to as boundSpbImage.

The first SSP 1220 may extract and/or prepare a part (for example, i) personal information included in the bundle and/or ii) a setting value and/or iii) a part and/or all of update performed after bundle installation) of content of the bundle to be transmitted to the second terminal. Here, a part and/or all of the information may be encoded by using the ShKeyBT. The prepared data may be referred to as boundSpbImageData or for convenience of descriptions, collectively referred to as boundSpbImage.

The first SSP 1220 may delete the bundle to be transmitted to the second terminal. The first SSP 1220 may delete the bundle and generate a token (referred to as ssp1.Notification) for notifying the bundle management server 1250 of information about the deletion.

In operation 12030, the first SSP 1220 may transmit the boundSpbImage or boundSpbImageData to the bundle management server 1250. The first SSP 1220 may further transmit the ssp1.ePK.BT to the bundle management server 1250. The first SSP 1220 may further transmit the ssp1.Notification to the bundle management server 1250.

Referring to FIG. 12, in operation 12035, the bundle management server 1250 may verify the ssp1.Notification and transmit, to the first LBA 1230, a response message indicating that all processes are performed.

When the boundSpbImage or boundSpbImageData is encoded by the encryption key prepared by using the ssp1.eSK.BT and the public key included in the SPBM.Cert.KA, the bundle management server 1250 may generate the encryption key ShKeyBT by using the ssp1.ePK.BT and the secret key corresponding to the public key included in the SPBM.Cert.KA, and then decode the encoded data included in the boundSpbImage or boundSpbImageData by using the encryption key.

In other words, one of following scenarios may be performed by the bundle management server.

[Case A]
When the bundle management server has received SpbImage encoded by the ShKeyBT generated by using the ssp1.eSK.BT and the public key included in the SPBM.Cert.KA A result generated when the bundle management server performs decoding by using ShKeyBT may be referred to as a decoded bundle.

[Case B]
When the bundle management server has received SpbImageData encoded by the ShKeyBT generated by using the ssp1.eSK.BT and the public key included in the SPBM.Cert.KA A result generated when the bundle management server performs decoding by using ShKeyBT may be referred to as decoded bundle data.

[Case C]

When the bundle management server has received SpbImage encoded by the ShKeyBT generated by using the ssp1.eSK.BT and the ssp2.ePK.BT The bundle management server may store a received result and the stored result may be referred to as a received bundle.

[Case D]

When the bundle management server has received SpbImageData encoded by the ShKeyBT generated by using the ssp1.eSK.BT and the ssp2.ePK.BT The bundle management server may store a received result and the stored result may be referred to as a received bundle data.

The bundle management server 1250 may map some or all of following pieces of information to each other. The SSP ID of the second SSP, the bundle delimiter of the bundle to be received by the second SSP, and the decoded bundle, the decoded bundle data, the received bundle, and the received bundle data, which are described above.

According to an embodiment, the bundle management server 1250 may transmit, to the first LBA 1230, a response message indicating that all processes are performed.

Figure 13:
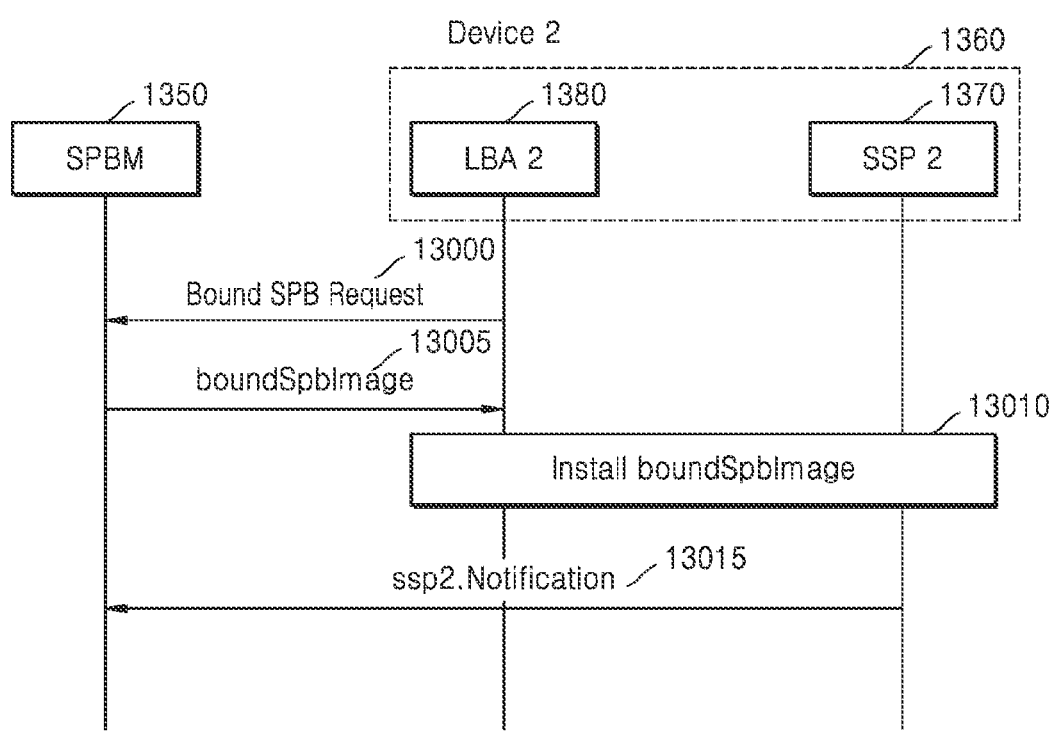
FIG. 13 is a diagram showing a procedure for downloading a bundle that was uploaded to a server to a terminal that is to receive the bundle, from among the procedures proposed in FIG. 9, according to an embodiment of the disclosure.

FIG. 13 is a diagram showing a procedure for downloading a bundle that was uploaded to a server to a terminal that is to receive the bundle, from among the procedures proposed in FIG. 9, according to an embodiment of the disclosure.

Referring to FIG. 13, a terminal may include at least one LBA and at least one SSP. For example, a second terminal 1360 may include a second LBA 1380 and a second SSP 1370. Details about a bundle management server 1350 have been described with reference to FIG. 4.

Referring to FIG. 13, in operation 13000, the second LBA 1380 may request the bundle management server 1350 for a bundle to be received. The request may be performed via any one of various methods. For example, the second LBA 1380 may transmit second terminal authentication information (Device2.Auth) to the bundle management server 1350. Details about the second terminal authentication information (Device2.Auth) have been described with reference to FIG. 11.

Operation 13000 may be replaced by a following process. In other words, the second terminal 1360 may stand by until operation 13005 described below to be performed after operation 11020 proposed in FIG. 11 is performed. Such a standing by process may be performed via any one of various methods described below. However, the standing by process is not limited thereby, and is not necessarily be one of the methods described below.

a) The bundle management server 1350 may transmit, to the second LBA 1380, a message indicating that a requested operation has been received for now but needs to stand by until a response is received. The second LBA 1380 may stand by for a certain period of time, and then transmit a message to the bundle management server 1350 to verify whether the requested operation has been performed. When performing of the operation is completed, operation 13005 may be performed. When the performing of the operation is not completed, the bundle management server 1350 may transmit, to the second LBA 1380, a message to stand by a little longer. In this case, the second LBA 1380 may stand by for a certain period of time again, and then transmit a message again to the bundle management server 1350 to verify whether the requested operation has been performed. Such processes may be repeated until operation 13005 is performed.

b) The second LBA 1380 may stand by until operation 13005 is performed within a determined time range. When operation 13005 is not performed within the determined time, bundle transmission may be stopped.

c) The bundle management server 1350 may notify the second LBA 1380 that the requested operation has been received. Then, when preparation is completed, operation 13005 may be performed.

Referring to FIG. 13, in operation 13005, the bundle management server 1350 may perform at least one of following processes.

The following processes may be performed when the bundle management server 1350 has received the bundle request message from the second LBA 1380 in operation 13000.

a) The bundle management server may identify whether the received second terminal authentication information is same information as second terminal authentication information received in operation 11020 of FIG. 11. Alternatively, the bundle management server may identify which terminal requests a current bundle through the received second terminal authentication information.

b) The bundle management server may identify whether there is the bundle to be transmitted to the second terminal, by using a SSP ID of the second SSP.

c) The bundle management server may identify whether there is the bundle to be transmitted to the second terminal, by using a bundle delimiter of the bundle to be received by the second terminal.

In operation 13005, the bundle management server 1350 may prepare the bundle to be transmitted to the second terminal 1360. In other words, among Decoded bundle, Decoded bundle data, Received bundle, and Received bundle data prepared in FIG. 12, when one of them is mapped to the SSP ID of the second SSP and/or the bundle delimiter of the bundle to be received by the second terminal, the bundle to be transmitted to the second terminal may be prepared. The bundle may be prepared via one of following methods.

[Case A]

When there is the decoded bundle as a result of the processes proposed in FIG. 12, the bundle management server may prepare the bundle to be transmitted to the second terminal by using the decoded bundle. According to an embodiment, the bundle management server may encode a part and/or all of the bundle by using ShKeyM2, and prepare to transmit the bundle. According to another embodiment, the bundle management server may generate a public key SPBM.ePK.BT and a secret key SPBM.eSK.BT, which are a key pair, generate the encryption key ShKeyBT by using the SPBM.ePK.BT and ssp2.ePK.KA, encode the part and/or all of the bundle by using the encryption key, and then prepare the bundle.

[Case B]

When there is the decoded bundle data as the result of the processes proposed in FIG. 12, the bundle management server may prepare the bundle to be transmitted to the second terminal by using the decoded bundle data. According to an embodiment, the bundle management server may prepare the bundle including a part of the decoded bundle data. According to another embodiment, the bundle management server may prepare the bundle to be transmitted to the second terminal, and then add the decoded bundle data as additional data. According to an embodiment, the bundle management server may encode a part and/or all of the bundle prepared by using the ShKeyM2 and/or the additional data. According to another embodiment, the bundle management server may generate the public key SPBM.ePK.BT and the secret key SPBM.eSK.BT, which are the key pair, generate the encryption key ShKeyBT by using the SPBM.ePK.BT and ssp2.ePK.KA, and then encode the part and/or all of the bundle prepared by using the encryption key ShKeyBT and/or the additional data.

[Case C]

When there is the received bundle as the result of the processes proposed in FIG. 12, the bundle management server may prepare the received bundle as the bundle to be transmitted to the second terminal.

[Case D]

When there is the received bundle data as the result of the processes proposed in FIG. 12, the bundle management server may prepare the bundle to be transmitted to the second terminal by using the received bundle data. According to an embodiment, the bundle management server may generate the bundle to be transmitted to the second terminal, and add the received bundle data as additional data. According to an embodiment, a part and/or all of the bundle generated by the bundle management server may be encoded by using the ShKeyM2. According to another embodiment, a part and/or all of the bundle generated by the bundle management server may be encoded by using the encryption key ShKeyBT generated by using the key pair SPBM.ePK.BT and SPBM.eSK.BT generated by the bundle management server.

The bundle and additional data prepared in [Case A] through [Case D] may be referred to as boundSpbImage.

In operation 13005, the bundle management server 1350 may transmit the boundSpbImage to the second LBA 1380. The bundle management server 1350 may further transmit the SPBM.ePK.BT to the second LBA 1380. The bundle management server 1350 may further transmit the ssp1.ePK.BT to the second LBA 1380.

Referring to FIG. 13, in operation 13010, the bundle may be installed in the second SSP. The second SSP 1370 and/or the second LBA 1380 may install the bundle in the second SSP 1370 by using the boundSpbImage received in operation 13005.

According to an embodiment, when the bundle and/or the additional data received from the bundle management server 1350 are encoded by a key for encryption between the bundle management server and the second terminal, the second SSP 1370 may decode encoded information by using ShKeyM2. According to another embodiment, when the bundle and/or the additional data received from the bundle management server 1350 are encoded by the key for encryption between the bundle management server and the second terminal, the second SSP 1370 may generate the encryption key ShKeyBT by using the SPBM.ePK.BT and then decode the encoded information by using the encryption key.

According to another embodiment, when the bundle and/or the additional data received from the bundle management server 1350 are encoded by a key for encryption between the first terminal and the second terminal, the second SSP 1370 may generate the encryption key ShKeyBT by using the ssp1.ePK.BT and then decode the encoded information by using the encryption key. Referring to FIG. 13, in operation 13015, the second SSP 1370 may notify the bundle management server 1350 of a result of installing the bundle. For example, the second SSP 1370 may transmit, to the bundle management server 1350, a message (referred to as ssp2.Notification) containing the result of installing the bundle.

Figure 14:
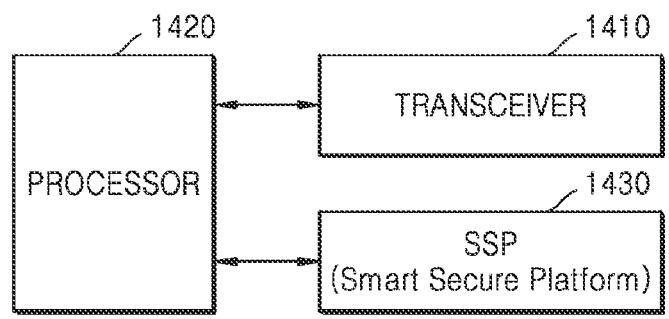
FIG. 14 is a diagram showing a configuration of a terminal on which an SSP is mounted, according to some embodiments of the disclosure.

FIG. 14 is a diagram showing a configuration of a terminal on which an SSP is mounted, according to some embodiments of the disclosure.

As shown in FIG. 4, the terminal may include a transceiver 1410 and at least one processor 1420. Also, the terminal may further include an SSP 1430. For example, the SSP 1430 may be inserted into the terminal or may be embedded in the terminal. The at least one processor 1420 may also be referred to as a controller. However, the configuration of terminal is not limited to FIG. 14, and the terminal may include more or fewer components than those shown in FIG. 14. According to some embodiments, the transceiver 1410, the at least one processor 1420, and a memory (not shown) may be embodied in a form of one chip. Also, when the SSP 1430 is embedded, the one chip may be realized by also including the SSP 1430.

According to various embodiments, the transceiver 1410 may transmit and receive signals, information, and data according to various embodiments of the disclosure to and from a transceiver of another terminal or an external server. The transceiver 1410 may include a RF transmitter for up-converting and amplifying a frequency of a transmitted signal, and a RF receiver for amplifying low-noise and down-converting a frequency of a received signal. However, this is only an embodiment of the transceiver 1410 and components of the transceiver 1410 are not limited to the RF transmitter and the RF receiver. Also, the transceiver 1410 may receive a signal through a wireless channel and output the signal to the at least one processor 1420, and may transmit a signal output from the at least one processor 1420 through the wireless channel.

Meanwhile, the at least one processor 1420 is a component for controlling the terminal in general. The at least one processor 1420 may control overall operations of the terminal according to the various embodiments of the disclosure described above.

Meanwhile, the SSP 1430 may include a processor or controller for installing and controlling a bundle, or may be installed with an application. Also, according to various embodiments, the SSP 1430 may operate according to control by the processor 1420. Alternatively, the SSP 1430 may include a processor or controller for installing and controlling a bundle, or may be installed with an application. A part or all of the application may be installed in the SSP 1430 or the memory (not shown).

The terminal may further include a memory (not shown) and may store data, such as a base program, an application program, configuration information, or the like for operations of the terminal. The memory may include at least one storage medium from among a flash memory type, a hard disk type, a multimedia card micro type, a card type memory (for example, a secure digital (SD) or extreme digital (XD) memory), a magnetic memory, a magnetic disk, an optical disk, random-access memory (RAM), static random-access memory (SRAM), read-only memory (ROM), programmable read-only memory (PROM), and electrically erasable programmable read-only memory (EEPROM). Also, the processor may perform various operations by using various programs, content, and data stored in the memory.

Figure 15:
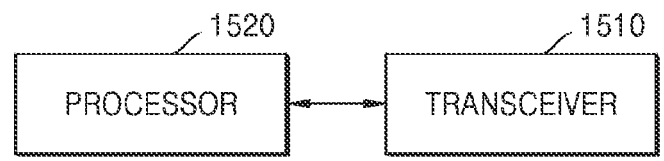
FIG. 15 is a diagram showing a configuration of a bundle management server, according to some embodiments of the disclosure.

FIG. 15 is a diagram showing a configuration of a bundle management server, according to some embodiments of the disclosure.

According to some embodiments, the bundle management server may include a transceiver 1510 and at least one processor 1520. However, the configuration of bundle management server is not limited to FIG. 15, and the bundle management server may include more or fewer components than those shown in FIG. 15.

According to some embodiments, the transceiver 1510 may transmit and receive signals, information, and data according to various embodiments of the disclosure to and from a terminal. The transceiver 1450 may include a RF transmitter for up-converting and amplifying a frequency of a transmitted signal, and a RF receiver for amplifying low-noise and down-converting a frequency of a received signal. However, this is only an embodiment of the transceiver 1510 and components of the transceiver 1510 are not limited to the RF transmitter and the RF receiver. Also, the transceiver 1510 may receive a signal through a wireless channel and output the signal to the at least one processor 1520, and may transmit a signal output from the at least one processor 1520 through the wireless channel.

Meanwhile, the at least one processor 1520 is a component for controlling the bundle management server in general. The processor 1520 may control overall operations of the bundle management server according to the various embodiments of the disclosure described above. The at least one processor 1520 may also be referred to as a controller.

Meanwhile, the bundle management server may further include a memory (not shown) and the memory may store data, such as a base program, an application program, configuration information, or the like for operations of the bundle management server. The memory may include at least one storage medium from among a flash memory type, a hard disk type, a multimedia card micro type, a card type memory (for example, a secure digital (SD) or extreme digital (XD) memory), a magnetic memory, a magnetic disk, an optical disk, random-access memory (RAM), static random-access memory (SRAM), read-only memory (ROM), programmable read-only memory (PROM), and electrically erasable programmable read-only memory (EEPROM).

Figure 16:
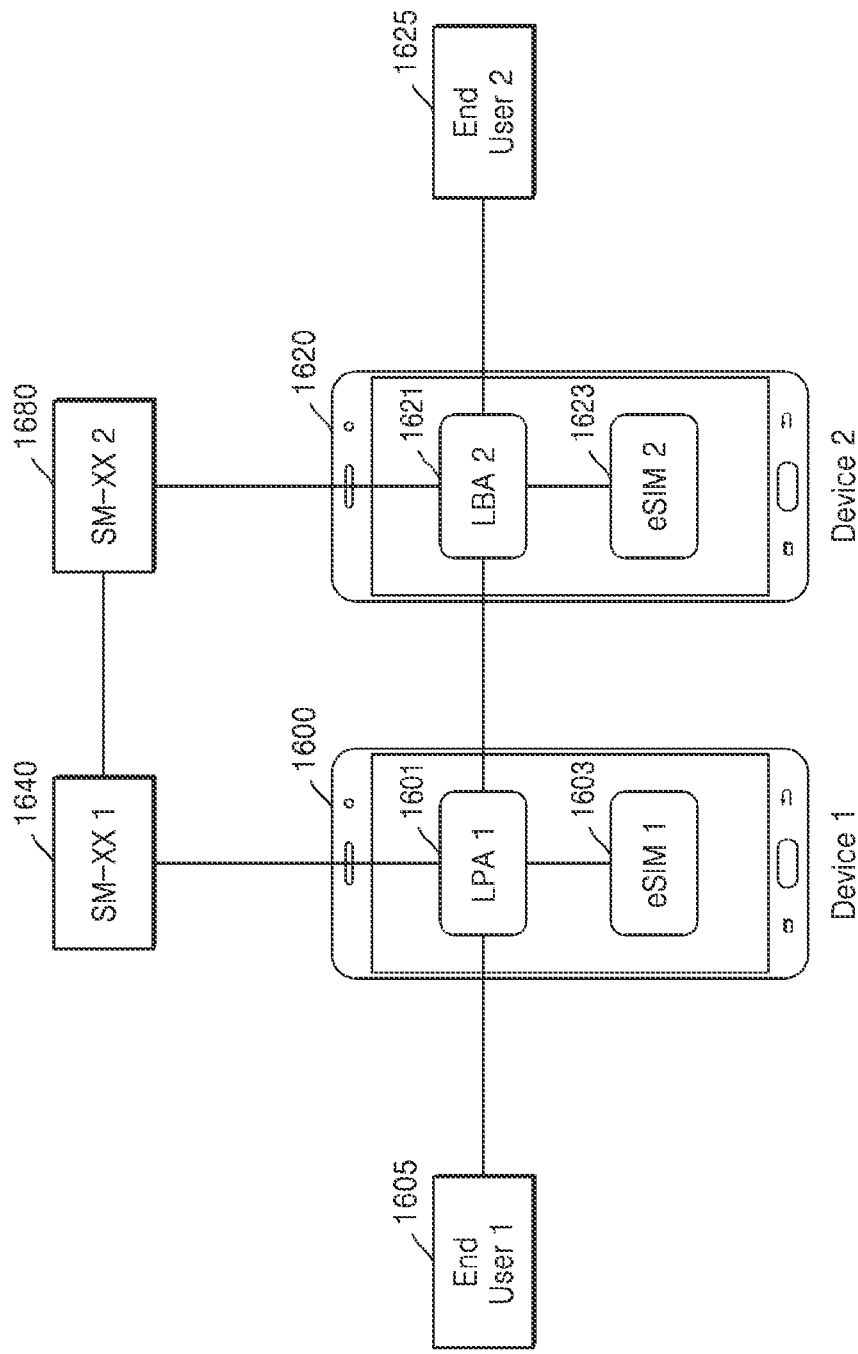
FIG. 16 is a diagram showing an example of a method by which two terminals and a server mutually operate such that a profile is transmitted online from one terminal to another terminal, according to an embodiment of the disclosure.

FIG. 16 is a diagram showing an example of a method by which two terminals and a server mutually operate such that a profile is transmitted online from one terminal to another terminal, according to an embodiment of the disclosure.

As shown in FIG. 16, a first terminal 1600 and a second terminal 1620 may include a first eSIM 1603 and a second eSIM 1623, respectively, and a profile (not shown) may be installed in each of the first eSIM 1603 and the second eSIM 1623. Also, a first LPA 1601 and a second LPA 1621 may be installed in the first terminal 1600 and the second terminal 1620, respectively. The first eSIM 1603 and the second eSIM 1623 may be controlled by the first LPA 1601 and the second LPA 1621, respectively. A first user 1605 and a second user 1625 may control a profile installed in an eSIM (the first eSIM 1603 and the second eSIM 1623) of each terminal through the first LPA 1601 and the second LPA 1621, respectively. Here, the first user 1605 and the second user 1625 may be a same user. Also, the first LPA 1601 and the second LPA 1621 may be connected and communicate with each other. Here, a possible method of connecting LPAs will be described below with reference to accompanying drawings.

The first LPA 1601 of the first terminal 1600 may be connected to a first RSP server 1640, and the second LPA 1621 of the second terminal 1620 may be connected to a second RSP server 1680. Here, the first RSP server 1640 and the second RSP server 1680 may be a same RSP server. Also, in FIG. 16, for convenience, the first RSP server 1640 and the second RSP server 1680 are each illustrated as a single server, but according to an embodiment, one or more profile providing servers (SM-DP+) may be included in a server configuration or one or more subscription mediation servers (SM-DS) assisting establishment of a connection between a specific profile providing server and a terminal may be included in the server configuration. Also, although not illustrated, one or more RSP servers and/or relay servers may be connected between the first RSP server 1640 and the second RSP server 1680.

In addition, although not illustrated, each RSP server and/or relay server may be connected to an operator server. Also, when one or more operator servers are included in the configuration, each operator server may be connected to a separate RSP server and/or relay server, or at least one operator server may be connected to a same RSP server and/or relay server.

It should be noted that such various server configurations may be briefly displayed as single RSP server in the following drawings. For example, when one or more RSP servers and/or relay servers are connected between the first terminal 1600 and the second terminal 1620, and some or all of the RSP servers and/or relay servers are connected to the operator server, various server configurations present between the first terminal and the second terminal may be represented as a single RSP server, and such a single RSP server may be referred to as SM-XX in drawings and embodiments.

Figure 17:
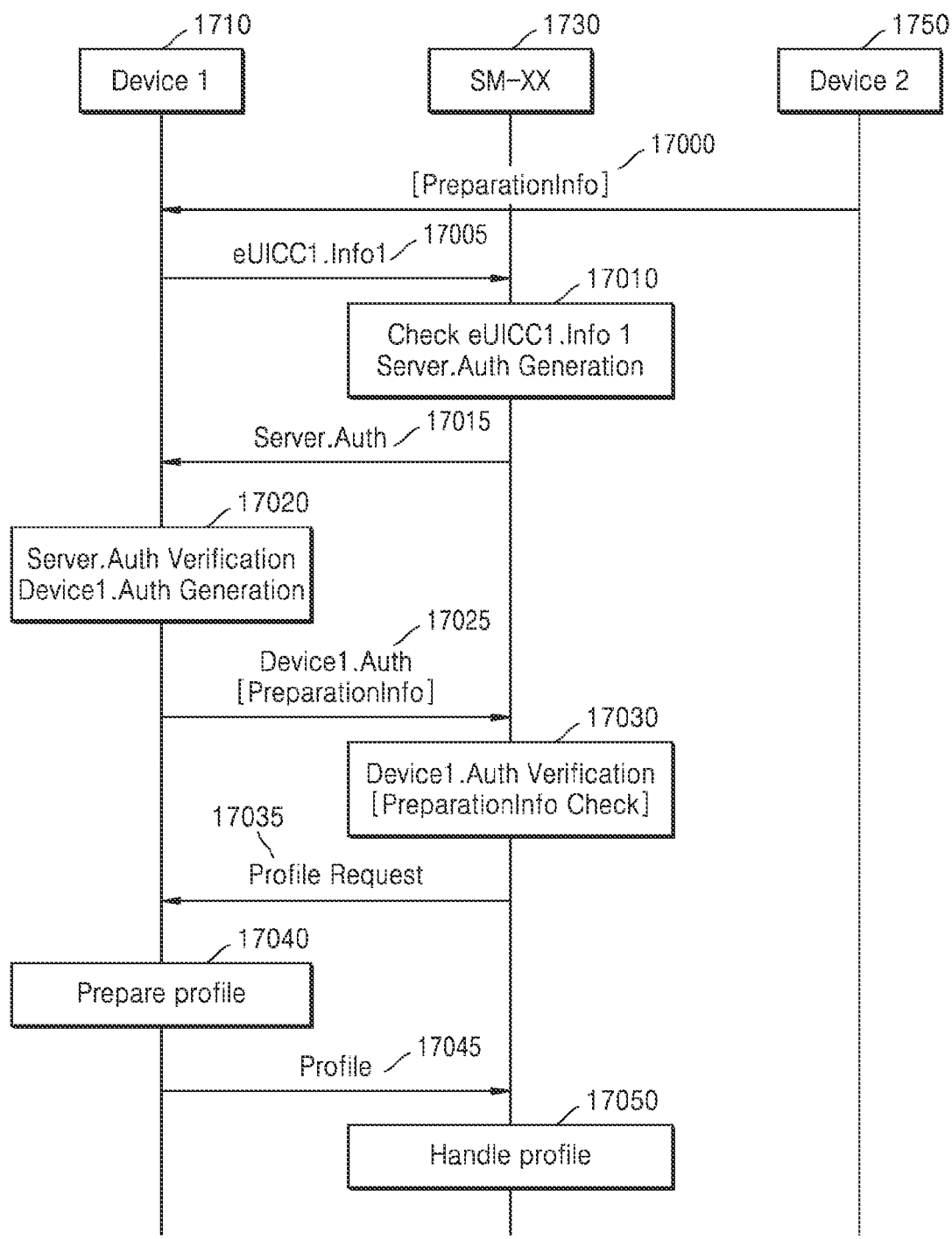
FIG. 17 is a diagram illustrating a first half procedure of processes of transmitting a profile online from one terminal to another terminal, according to an embodiment of the disclosure.

FIG. 17 is a diagram illustrating a first half procedure of processes of transmitting a profile online from one terminal to another terminal, according to an embodiment of the disclosure.

Although not illustrated in FIG. 17, a first terminal 1710 and a second terminal 1750 may each include a eUICC and an LPA therein, as shown in FIG. 16. Also, an RSP server 1730 may include at least one RSP server and/or relay server and/or operator server, as described in FIG. 16.

Although not illustrated in FIG. 17, the first terminal 1710 may include a profile transfer configuration. According to various embodiments, the profile transfer configuration is a policy regarding a possibility of transfer of a profile between devices, and may have been generated by a mobile operator, an RSP server, or cooperation of the mobile operator and the RSP server as described above. According to various embodiments, the profile transfer configuration in the terminal may be updated by the mobile operator, the RSP server, or the cooperation of the mobile operator and the RSP server. Alternatively, the profile transfer configuration may be updated by cooperation of the terminal and at least one entity from among the mobile operator and the RSP server. A time point and/or method for updating the profile transfer configuration may be determined by a policy of the mobile operator, the RSP server, or a terminal manufacturer.

The profile transfer configuration may include a factor (or indication) indicating whether transfer of the profile between devices is allowed. Also, the profile transfer configuration may further selectively include a factor specifying a condition where the transfer of the profile between devices is allowed. For example, whether the profile is capable of being transmitted (or transferred) online from one terminal to another terminal may be configured. Such factors may be electronically signed by at least one entity from among the RSP server, the mobile operator, the terminal manufacturer, the eUICC, or an eUICC manufacturer. A value of the electronic signature may be stored in the first terminal as a part of the profile transfer configuration or together with the profile transfer configuration.

Referring to FIG. 17, in operation 17000, profile transfer preparation information may be transmitted from the second terminal 1750 to the first terminal 1710. The profile transfer preparation information may include an eUICC ID (referred to as EID) of the eUICC installed in the second terminal 1750.

The profile transfer preparation information may include certificate negotiation information used when the second terminal 1750 negotiates a certificate with the RSP server. The certificate negotiation information may be partial information of eUICC2.Info1 of the second terminal described below. The certificate negotiation information may include information about a version(s) supported by the eUICC of the second terminal. The certificate negotiation information may include certificate information that may be used to verify the eUICC of the second terminal. The certificate negotiation information may include certificate information that may be used to verify the RSP server.

The profile transfer preparation information may include information used to determine whether the profile to be received from the first terminal 1710 later is normally installable and operable in the eUICC of the second terminal 1750. The information may be apart and/or all of eUICC2.Info2 of the second terminal described below. For example, the information may include hardware and/or software information of the eUICC installed in the second terminal 1750. For example, the information may include hardware and/or software information of the second terminal.

The profile transfer preparation information may include factors indicating encryption methods supported by the second terminal 1750. The factors may include a list of key agreement algorithms supported by the second terminal 1750 and/or a list of encryption algorithms and/or a public key(s) of the second terminal to be used for key agreement.

Information delivered from the second terminal 1750 to the first terminal 1710 may be transmitted via any one of various methods. For example, the second terminal may provide information to be delivered to the first terminal to a second user of the second terminal through a UI of the second terminal. The second user may provide the provided information to a first user of the first terminal. The first user may input the provided information to the first terminal by using a UI of the first terminal. Alternatively, the second terminal may generate an image (for example, a QR code) of the information to be delivered to the first terminal and display the same on a screen of the second terminal, and the first user may scan the image displayed on the screen of the second terminal and transmit the information to the first terminal. However, the method of delivering the information from the second terminal to the first terminal is not limited to the above-described methods, and may be variously determined. The first user and the second user may denote different users or may denote a same user.

According to an embodiment, the first terminal 1710 may determine whether the profile is transmittable by identifying the profile transfer configuration. Also, the first terminal may determine whether the profile is transmittable online by identifying the profile transfer configuration. The first terminal may select to transmit the profile online by identifying the profile transfer configuration.

According to an embodiment, the first terminal 1710 may identify received profile transfer information. For example, the first terminal 1710 may verify whether there is an encryption method supported by itself from among the encryption methods supported by the second terminal 1750 included in the profile transfer information. In detail, the first terminal may identify whether there is an algorithm supported by itself from among the key agreement algorithms and/or encryption algorithms supported by the second terminal. When there is a supported algorithm, the first terminal may select a key agreement algorithm and/or encryption algorithm. Also, the first terminal may select the public key of the second terminal to be used later to generate an encryption key.

In operation 17005, the first terminal 1710 may transmit its eUICC information (eUICC1.Info1) to the RSP server 1730. The eUICC1.Info1 may include a random character string (eUICC1.Challenge) generated by the eUICC of the first terminal. The eUICC1.Info1 may include information about a version(s) supported by the eUICC of the first terminal. The eUICC1.Info1 may include certificate information that may be used to verify the eUICC of the first terminal. The eUICC1.Info1 may include certificate information that may be used to verify the RSP server. The eUICC1.Info1 may include a list of encryption algorithms supported by the first terminal.

Referring to FIG. 17, in operation 17010, the RSP server 1730 may identify the received eUICC1.Info1 and generate RSP server authentication information (Server.Auth1). The RSP server may identify whether there is a version supported by itself from among eUICC versions supported by the first terminal, by using the received eUICC1.Info1. The RSP server may select a certificate Server.Cert capable of verifying itself, by using the received eUICC1.Info1. The RSP server may select certificate information to be used by the first terminal 1710, by using the received eUICC1.Info1. The RSP server may select an encryption algorithm to be used during encryption communication with the first terminal later, by using the received eUICC1.Info1.

According to an embodiment, the RSP server 1730 may generate the RSP server authentication information (Server.Auth1). The RSP server authentication information (Server.Auth1) may include part or all of the eUICC1.info1. For example, the RSP server authentication information (Server.Auth1) may include the eUICC1.Challenge that has been received by the first terminal 1710. The RSP server authentication information (Server.Auth1) may include a random character string (Server.Challenge1) generated by the RSP server.

The RSP server authentication information (Server.Auth1) may include certificate information to be used by the first terminal. The RSP server authentication information (Server.Auth1) may include certificate chain information related to the certificate Server.Cert capable of verifying itself by the first terminal. The RSP server authentication information (Server.Auth1) may include the encryption algorithm to be used during the encryption communication with the first terminal later.

A part or all of the RSP server authentication information (Server.Auth1) described above may be electronically signed by using the certificate Server.Cert of the RSP server, and such electronically signed data may be included as a part of the RSP server authentication information (Server.Auth1).

Referring to FIG. 17, in operation 17015, the RSP server 1730 may transmit the RSP server authentication information (Server.Auth1) to the first terminal 1710. Referring to FIG. 17, in operation 17020, the first terminal 1710 may verify the received RSP server authentication information (Server.Auth1), and generate first terminal authentication information (Device1.Auth) based on a result of the verifying (for example, when verification is successful). The first terminal may verify validity of the Server.Cert included in the RSP server authentication information (Server.Auth1), and further verify validity of the signature included in the RSP server information (Server.Auth1) by using the Server-.Cert. The first terminal may verify whether a value of eUICC1.Challenge included in the RSP server authentication information (Server.Auth1) is the same as a value of the eUICC1.Challenge transmitted by itself in operation 17005. For example, when the Server.Cert is valid, the signature included in the RSP server authentication information (Server.Auth1) is valid, and the values of eUICC1.Challenge are the same, the verification may be successful.

The first terminal may generate the first terminal authentication information (Device1.Auth) based on the result of verifying (for example, when the verification is successful). The first terminal authentication information (Device1.Auth) may include part or all of the Server.Auth1. For example, the first terminal authentication information (Device1.Auth) may include the Server.Challenge1 that has been received by the first terminal.

The first terminal authentication information (Device1.Auth) may include the eUICC ID of the eUICC installed in the first terminal. Also, the first terminal authentication information (Device1.Auth) may include a profile delimiter of the profile to be transmitted.

The first terminal authentication information (Device1.Auth) may include certificate chain information related to a certificate eUICC1.Cert capable of verifying itself.

Also, the first terminal may select a part and/or all of the profile transfer preparation information received from the second terminal 1750 in operation 17000. (Hereinafter, for convenience, the selected information will be referred to as transfer preparation selection information.) For example, the transfer preparation selection information may include the certificate negotiation information used when the second terminal negotiates a certificate with the second terminal, which has been received from the second terminal, and information used to determine whether the profile to be transmitted by the first terminal is normally installable and operable in the eUICC of the second terminal. Also, the transfer preparation selection information may include an eUICC ID of the second terminal.

Parts and/or all of the first terminal authentication information (Device1.Auth) and the transfer preparation selection information described above may be electronically signed by using the certificate eUICC1.Cert of the first terminal.

Referring to FIG. 17, in operation 17025, the first terminal 1710 may transmit, to the RSP server 1730, the first terminal authentication information (Device1.Auth) and/or the transfer preparation selection information and/or electronic signature information generated in operation 17020.

Referring to FIG. 17, in operation 17030, the RSP server 1730 may verify the received first terminal authentication information (Device1.Auth). The RSP server 1730 may verify validity of the eUICC1.Cert included in the first terminal authentication information (Device1.Auth), and verify validity of the received electronic signature by using the eUICC1.Cert. The RSP server may verify whether a value of Server.Challenge1 included in the first terminal authentication information (Device1.Auth) is the same as the value of Server.Challenge1 transmitted by itself in operation 17015. For example, when eUICC1.Cert is valid, the signature included in the first terminal authentication information (Device1.Auth) is valid, and the values of Server.Challenge1 are the same, validation may be successful.

According to an embodiment, the RSP server may verify that the first terminal is a terminal using the profile, by using the received eUICC ID of the first terminal and the profile delimiter.

According to an embodiment, the RSP server may identify the certificate negotiation information used when the second terminal negotiates a certificate with the RSP server, and the information used to determine whether the profile to be transmitted by the first terminal is normally installable and operable in the eUICC of the second terminal, which are included in the transfer preparation selection information, and when the second terminal requests the profile to be uploaded by the first terminal later, verify whether the a certificate negotiation between the RSP server and the second terminal will be successful and whether the profile will normally operate in the second terminal.

Also, the RSP server may store the received profile delimiter and the eUICC ID of the second terminal.

Referring to FIG. 17, based on a result of the determining, the RSP server 1730 may transmit, to the first terminal 1710, a message requesting the profile (or a profile package), in operation 17035. Such a request message may include a series of pieces of data required to request the profile. For example, the request message may include the profile delimiter of the profile to be requested. Also, the request message may further include a key agreement public key of the RSP server. The key agreement public key of the RSP server may be a temporary key.

A part and/or all of data included in the request message may be electronically signed by using the certificate Server-.Cert of the RSP server, and such electronic signature data may be included as a part of the request message.

Referring to FIG. 17, in operation 17040, the first terminal 1710 may identify the transmitted request message of the RSP server, and when verification of the same is successful, prepare the profile package related to the profile requested by the RSP server. For example, the first terminal may verify validity of the electronic signature included in the request message of the RSP server. Also, the first terminal may verify whether the profile delimiter included in the request message of the RSP server matches a delimiter of the profile to be transmitted.

When the verification is successful, the first terminal may prepare the profile package related to the profile requested by the RSP server. The profile package may include profile information to be transmitted by the first terminal to the second terminal.

A part and/or all of the profile information to be transmitted by the first terminal to the second terminal may be encoded. Some examples of a method of generating an encryption key used at this time are as follows.

A) Generate the encryption key by using the key agreement public key of the RSP server provided in operation 17035, and a key agreement secret key generated by the first terminal.

B) Generate the encryption key by using the public key of the second terminal to be used to generate the encryption key, which has been selected in operation 17005, and a secret key generated by the first terminal.

The profile package may include a public key corresponding to the secret key generated by the first terminal. The profile package may include information related to the encryption key, for example, the key agreement algorithm used to generate the encryption key and/or the encryption algorithm information for using the encryption key.

Content of the profile package may be electronically signed by the certificate eUICC1.Cert of the first terminal, and a value of the electronic signature may be included as a part of the profile package.

The first terminal may disable a state of the profile to be transmitted before generating the profile package.

Referring to FIG. 17, in operation 17045, the first terminal 1710 may transmit the profile package to the RSP server 1730.

Referring to FIG. 17, in operation 17050, the RSP server 1730 may store the received profile package. Also, the RSP server may link the received profile package to the eUICC ID of the second terminal. Also, when the encryption key generated by using the key agreement public key of the server and the key agreement secret key generated by the first terminal is used for encoding in operation 17040, the RSP server may generate the encryption key by using the key agreement public key of the server and the public key corresponding to the secret key generated by the first terminal, and then decode the received profile package by using the encryption key.

Figure 18:
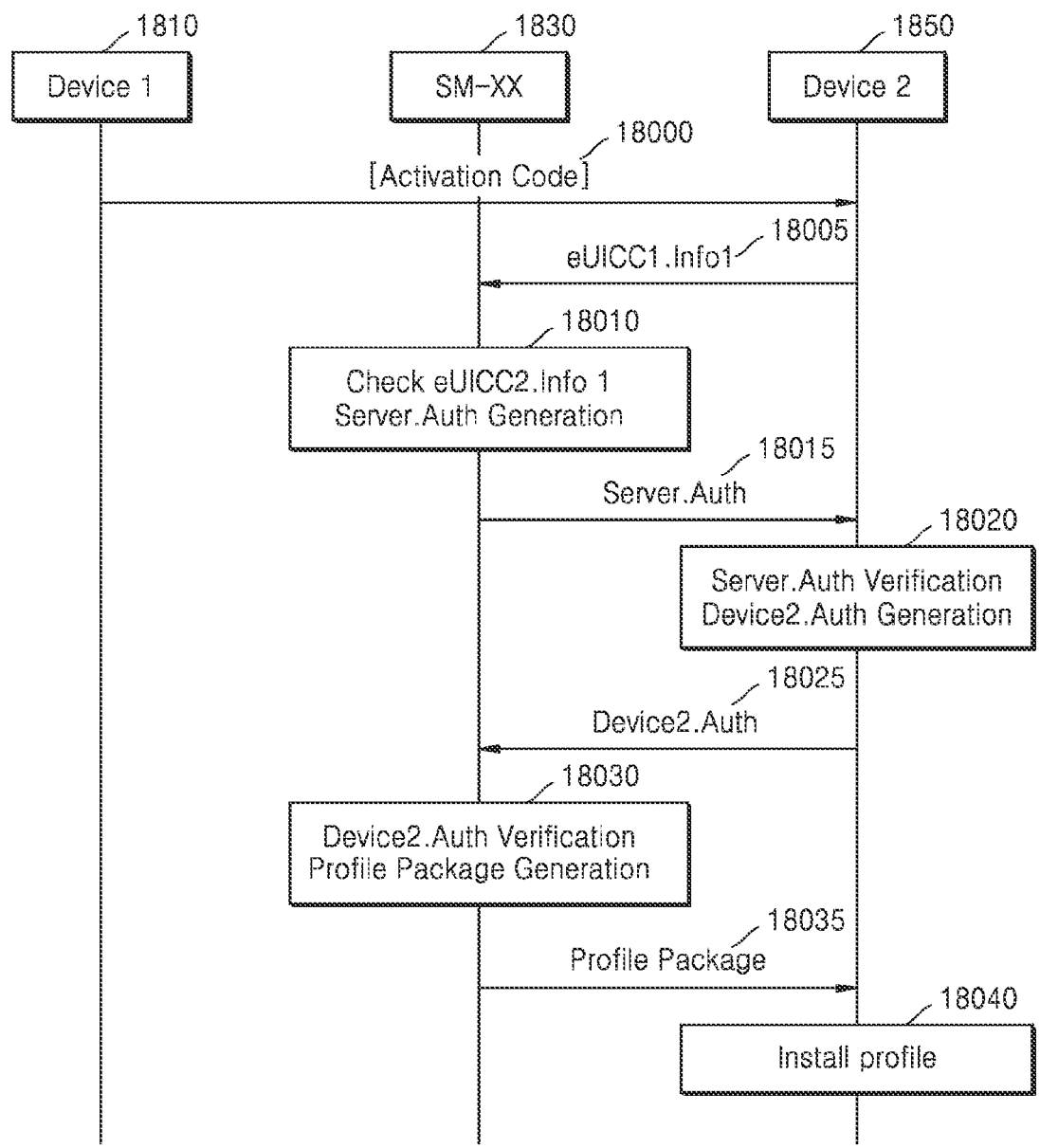
FIG. 18 is a diagram illustrating a latter half procedure of processes of transmitting a profile online from one terminal to another terminal, according to an embodiment of the disclosure.

FIG. 18 is a diagram illustrating a latter half procedure of processes of transmitting a profile online from one terminal to another terminal, according to an embodiment of the disclosure.

Although not illustrated in FIG. 18, a first terminal 1810 and a second terminal 1850 may each include a eUICC and an LPA therein, as shown in FIG. 16. Also, an RSP server 1830 may include at least one RSP server and/or relay server and/or operator server, as described in FIG. 16.

Referring to FIG. 18, in operation 18000, a process by which the second terminal 1850 requests the RSP server 1830 for a profile and receives the profile may be initiated. Such an initiation process may start via any one of various methods.

For example, the initiation process of requesting and receiving the profile may start as the second terminal receive an input of a code (hereinafter, referred to as an activation code) required to request the profile.

Here, the activation code input to the second terminal may be input via any one of various methods. For example, the first terminal may generate an image, such as a QR code, including activation code information and display the same on a screen of the first terminal, and a second user may scan the code displayed on the screen of the first terminal by using the second terminal, and thus the activation code may be input to the second terminal. Alternatively, a connection between the first terminal and the second terminal may be established (a possible connection method at this time may be a direct connection between devices (for example, NFC, Bluetooth, UWB, Wi-Fi direct, LTE D2D, or 5G D2D) or a remote connection in which a remote server (for example, a relay server) is located between the first terminal and the second terminal), and the activation code may be transmitted to the second terminal through this connection. Alternatively, the activation code may be input to the second terminal as the second user inputs the activation code to the second terminal through a UI provided by the second terminal. Alternatively, the activation code may be input to the second terminal as an RSP server and/or a random server associated with the RSP server transmits the activation code to the second terminal. Alternatively, the activation code may be input to the second terminal as the second terminal obtains the activation code by accessing the RSP server and/or the random server associated with the RSP server.

The activation code may include an eUICC ID of the second terminal. The activation code may include a profile delimiter of the profile to be transmitted by the first terminal. The activation code may include an address of the RSP server to be accessed by the second terminal to request the profile. The activation code may include information that was used by the first terminal to generate an encryption key to encode the profile in FIG. 17, for example, a key agreement algorithm used to generate the encryption key and/or encryption algorithm information for using the encryption key and/or a key agreement public key used by the first terminal to generate the encryption key.

Alternatively, the initiation process may start as the second terminal uses a discovery service. For example, the initiation process may start after the second terminal identifies an event by accessing a discovery server and then identifies that a profile download event has occurred.

Alternatively, the initiation process may start as the RSP server notifies the second terminal that the event has occurred. For example, the initiation process may start as the RSP server or the random server associated with the RSP server notifies the second terminal that the profile download event has occurred (for example, a push service of the server may be used).

Alternatively, the initiation process may start as the second user requests the second terminal to download the profile. For example, the initiation process may start as the second user shows intention to download the profile through the UI provided by the second terminal and provides information required to download the profile.

Referring to FIG. 18, in operation 18005, the second terminal 1850 may transmit, to the RSP server 1830, its eUICC information (eUICC2.Info1). The eUICC2.Info1 may include a random character string (eUICC2.Challenge) generated by the eUICC of the second terminal. The eUICC2.Info1 may include information about a version(s) supported by the eUICC of the second terminal. The eUICC2.Info1 may include certificate information that may be used to verify the eUICC of the second terminal. The eUICC2.Info1 may include certificate information that may be used to verify the eUICC of the RSP server. The eUICC2.Info1 may include a list of encryption algorithms supported by the second terminal.

Referring to FIG. 18, in operation 18010, the RSP server 1830 may identify the received eUICC2.Info1 and generate RSP server authentication information (Server.Auth2). The RSP server 1830 may identify whether there is a version supported by itself from among eUICC versions supported by the second terminal, by using the received eUICC2.Info1. The RSP server 1830 may select a certificate Server.Cert capable of verifying itself, by using the received eUICC2.Info1. The RSP server 1830 may select certificate information to be used by the second terminal 1850, by using the received eUICC2.Info1. The RSP server 1830 may select an encryption algorithm to be used during encryption communication with the second terminal later, by using the received eUICC2.Info1.

According to an embodiment, the RSP server 1830 may generate the RSP server authentication information (Server.Auth2). The RSP server authentication information (Server.Auth2) may include part or all of the eUICC2.Info1. For example, the RSP server authentication information (Server.Auth2) may include the eUICC2.Challenge that has been received. The RSP server authentication information (Server.Auth2) may include a random character string (Server.Challenge2) generated by the RSP server.

The RSP server authentication information (Server.Auth2) may include certificate information to be used to verify the second terminal. The RSP server authentication information (Server.Auth2) may include certificate chain information related to a certificate Server.Cert capable of verifying itself. The RSP server authentication information (Server.Auth2) may include the encryption algorithm to be used during the encryption communication with the second terminal later.

A part and/or all of the RSP server authentication information (Server.Auth2) described above may be electronically signed by using the certificate Server.Cert of the RSP server, and such electronically signed data may be included as a part of the RSP server authentication information (Server.Auth2).

Referring to FIG. 18, in operation 18015, the RSP server 1830 may transmit the RSP server authentication information (Server.Auth2) to the second terminal 1850.

Referring to FIG. 18, in operation 18020, the second terminal 1850 may verify the received RSP server authentication information (Server.Auth2), and generate second terminal authentication information (Device2.Auth). The second terminal 1850 may verify validity of the Server.Cert included in the RSP server authentication information (Server.Auth2), and further verify validity of the signature included in the RSP server authentication information (Server.Auth2) by using the Server.Cert. The second terminal 1850 may verify whether a value of eUICC2.Challenge included in the RSP server authentication information (Server.Auth2) is the same as a value of the eUICC2.Challenge transmitted by itself in operation 18005.

The second terminal 1850 may generate the second terminal authentication information (Device2.Auth). The second terminal authentication information (Device2.Auth) may include part or all of the Server.Auth2. For example, the second terminal authentication information may include the received Server.Challenge2.

The second terminal authentication information (Device2.Auth) may include information eUICC2.Info2 for eligibility check of the eUICC installed in the second terminal. The eUICC2.Info2 may be information used to determine whether the profile to be received from the first terminal later is normally installable and operable in the eUICC of the second terminal. For example, the eUICC2.Info2 may include hardware and/or software information of the eUICC mounted on the second terminal. Alternatively, the eUICC2.Info2 may include hardware and/or software information of the second terminal.

The second terminal authentication information (Device2.Auth) may include the eUICC ID of the eUICC installed in the second terminal. Also, the second terminal authentication information (Device2.Auth) may include a profile delimiter of the profile to be requested by the second terminal. The second terminal authentication information (Device2.Auth) may include the activation code received in operation 18000.

The second terminal authentication information (Device2.Auth) may include a key agreement public key generated by the eUICC of the second terminal.

The second terminal authentication information (Device2.Auth) may include certificate chain information related to a certificate eUICC2.Cert capable of verifying itself.

A part and/or all of the second terminal authentication information (Device2.Auth) described above may be electronically signed by using the certificate eUICC2.Cert of the second terminal, and such electronically signed data may be included as a part of the second terminal authentication information (Device2.Auth).

Referring to FIG. 18, in operation 18025, the second terminal 1850 may transmit, to the RSP server 1830, the second terminal authentication information (Device2.Auth).

Referring to FIG. 18, in operation 18030, the RSP server 1830 may verify the received second terminal authentication information (Device2.Auth). The RSP server 1830 may verify validity of the eUICC2.Cert included in the second terminal authentication information (Device2.Auth), and verify validity of the signature included in the second terminal authentication information (Device2.Auth) by using the eUICC2.Cert. The RSP server 1830 may verify whether a value of Server.Challenge2 included in the second terminal authentication information (Device2.Auth) is the same as the value of Server.Challenge2 transmitted by itself in operation 18015.

The RSP server 1830 may identify the information eUICC2.Info2 for the eligibility check of the eUICC included in the second terminal authentication information (Device2.Auth), and determine whether the profile to be transmitted is normally installable and operable in the second terminal.

The RSP server 1830 may identify the received eUICC ID of the second terminal. The RSP server may identify the received eUICC ID of the second terminal to identify whether there is the profile to be transmitted. The RSP server may identify the received eUICC ID of the second terminal to prepare the profile to be transmitted.

The RSP server 1830 may identify the received profile delimiter. The RSP server may identify the received profile delimiter to identify whether there is the profile to be transmitted. The RSP server may identify the received profile delimiter to prepare the profile to be transmitted.

The RSP server 1830 may identify the received activation code. The RSP server may identify the eUICC ID of the second terminal included in the received activation code. The RSP server may identify the eUICC ID of the second terminal included in the received activation code to identify whether there is the profile to be transmitted. The RSP server may identify the eUICC ID of the second terminal included in the received activation code to prepare the profile to be transmitted. The RSP server may identify the profile delimiter included in the received activation code. The RSP server may identify the profile delimiter included in the received activation code to identify whether there is the profile to be transmitted. The RSP server may identify the profile delimiter included in the received activation code to prepare the profile to be transmitted.

The RSP server 1830 may generate an encryption key to be used for encoding by using the received key agreement public key generated by the eUICC of the second terminal, and the key agreement secret key generated by the RSP server. The RSP server 1830 may encode the profile to be transmitted, by using the encryption key.

In operation 18030, the RSP server may prepare the profile package related to the profile requested by the second terminal 1850. The profile package may include profile information to be transmitted by the RSP server to the second terminal.

The profile package may include information that was used by the first terminal to generate an encryption key to encode the profile in FIG. 17, for example, a key agreement algorithm used to generate the encryption key and/or encryption algorithm information for using the encryption key and/or a key agreement public key used by the first terminal to generate the encryption key.

The profile package may include information that was used by the RSP server to generate an encryption key to encode the profile, for example, a key agreement algorithm used to generate the encryption key and/or encryption algorithm information for using the encryption key and/or a key agreement public key used by the RSP server to generate the encryption key.

Content of the profile package may be electronically signed by the certificate Server.Cert of the RSP server, and a value of the electronic signature may be included as a part of the profile package.

Referring to FIG. 18, in operation 18035, the RSP server 1830 may transmit the profile package to the second terminal 1850.

Referring to FIG. 18, in operation 18040, the second terminal 1850 may install the received profile package. Here, when partial and/or all content of the profile package is encoded by the first terminal, the second terminal may generate the encryption key by using the received key agreement public key of the first terminal and the key agreement secret key of the second terminal, and then decode the encoded content. Here, when partial and/or all content of the profile package is encoded by the RSP server, the second terminal may generate the encryption key by using the received key agreement public key of the RSP server and the key agreement secret key of the second terminal, and then decode the encoded content.

Figure 19:
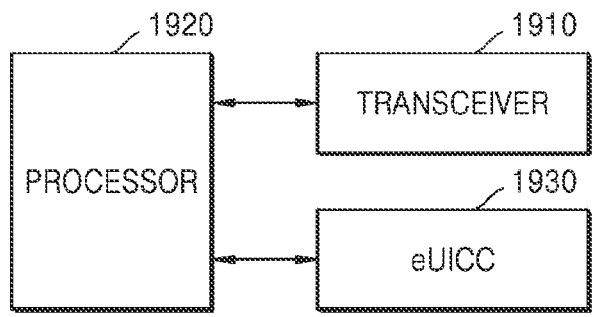
FIG. 19 is a diagram showing a configuration of a terminal on which an embedded universal integrated circuit card (eUICC) is mounted, according to an embodiment of the disclosure.

FIG. 19 is a diagram showing a configuration of a terminal on which an eUICC is mounted, according to some embodiments of the disclosure.

Referring to FIG. 19, the terminal may include a transceiver 1910, a processor 1920, and an eUICC 1930. In the disclosure, some terminals described above may correspond to the terminal described in FIG. 19. For example, the first terminal and the second terminal described in FIGS. 16 through 18 may each include the configuration of the terminal described in FIG. 19.

However, the configuration of terminal is not limited to FIG. 19, and the terminal may include more or fewer components than those shown in FIG. 19. According to some embodiments, the transceiver 1910, the processor 1920, and the eUICC 1930 may be embodied in a form of one chip. Also, the terminal may further include a memory, and the processor 1920 may be configured as at least one processor.

According to various embodiments, the transceiver 1910 may transmit and receive signals, information, and data according to various embodiments of the disclosure to and from a transceiver of another terminal or an external server. The transceiver 1910 may include a RF transmitter for up-converting and amplifying a frequency of a transmitted signal, and a RF receiver for amplifying low-noise and down-converting a frequency of a received signal. However, this is only an embodiment of the transceiver 1910 and components of the transceiver 1910 are not limited to the RF transmitter and the RF receiver. In addition, the transceiver 1910 may receive a signal on a wireless channel and output the signal to the processor 1920, or transmit a signal output from the processor 1920 on a wireless channel.

Meanwhile, the processor 1920 is a component for controlling the terminal in general. The processor 1920 may control overall operations of the terminal according to the various embodiments of the disclosure described above.

The terminal may further include a memory (not shown) and may store data, such as a base program, an application program, configuration information, or the like for operations of the terminal. The memory may include at least one storage medium from among a flash memory type, a hard disk type, a multimedia card micro type, a card type memory (for example, a secure digital (SD) or extreme digital (XD) memory), a magnetic memory, a magnetic disk, an optical disk, random-access memory (RAM), static random-access memory (SRAM), read-only memory (ROM), programmable read-only memory (PROM), and electrically erasable programmable read-only memory (EEPROM). Also, the processor 1920 may perform various operations by using various programs, content, and data stored in the memory.

Figure 20:
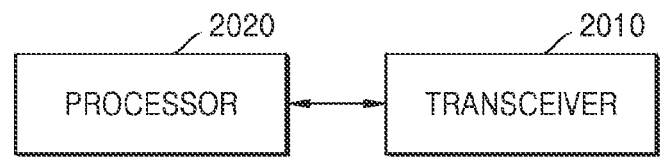
FIG. 20 is a diagram showing a configuration of a remote subscriber identity module (SIM) provisioning (RSP) server, according to an embodiment of the disclosure.

FIG. 20 is a diagram showing a configuration of an RSP server, according to some embodiments of the disclosure.

Referring to FIG. 20, the server may include a transceiver 2010 and a processor 2020. In the disclosure, some servers described above may correspond to the server described in FIG. 20. For example, the server(s) described in FIGS. 16 through 18 may include the configuration of the server described in FIG. 20.

However, the configuration of server is not limited to FIG. 20, and the server may include more or fewer components than those shown in FIG. 20. According to some embodiments, the transceiver 2010 and the processor 2020 may be embodied in a form of one chip. Also, the server may further include a memory, and the processor 2020 may be configured as at least one processor.

According to some embodiments, the transceiver 2010 may transmit and receive signals, information, and data according to various embodiments of the disclosure to and from a terminal. The transceiver 2010 may include a RF transmitter for up-converting and amplifying a frequency of a transmitted signal, and a RF receiver for amplifying low-noise and down-converting a frequency of a received signal. However, this is only an embodiment of the transceiver 2010 and components of the transceiver 2010 are not limited to the RF transmitter and the RF receiver. In addition, the transceiver 2010 may receive a signal on a wireless channel and output the signal to the processor 2020, or transmit a signal output from the processor 2020 on a wireless channel.

Meanwhile, the at least one processor 2020 is a component for controlling the server in general. The processor 2020 may control overall operations of the server according to the various embodiments of the disclosure described above. The at least one processor 2020 may also be referred to as a controller.

Meanwhile, the server may further include a memory (not shown) and the memory may store data, such as a base program, an application program, configuration information, or the like for operations of the server. The memory may include at least one storage medium from among a flash memory type, a hard disk type, a multimedia card micro type, a card type memory (for example, a secure digital (SD) or extreme digital (XD) memory), a magnetic memory, a magnetic disk, an optical disk, random-access memory (RAM), static random-access memory (SRAM), read-only memory (ROM), programmable read-only memory (PROM), and electrically erasable programmable read-only memory (EEPROM). Also, the processor 2020 may perform various operations by using various programs, content, and data stored in the memory.

Figure 21:
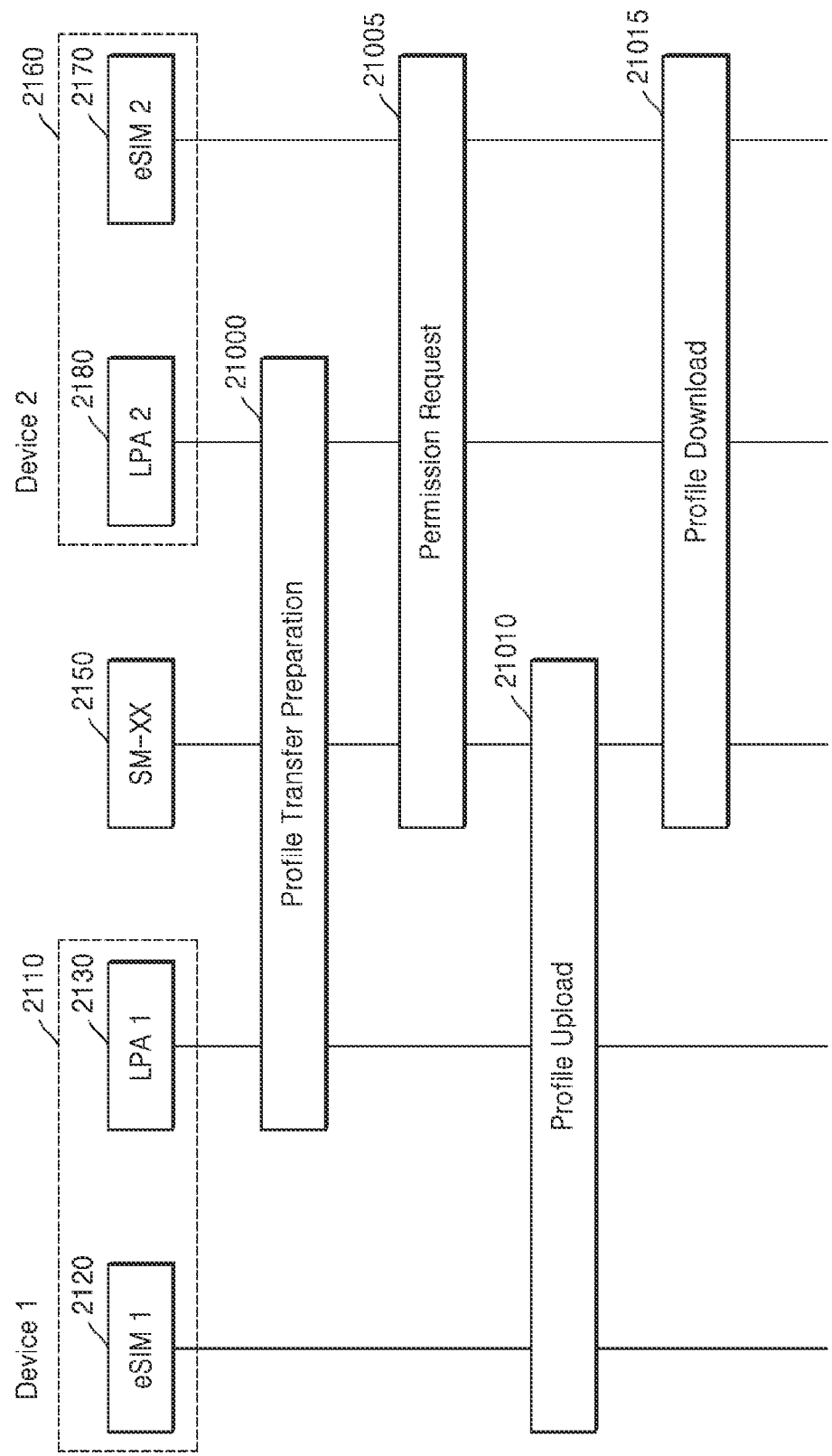
FIG. 21 is a diagram conceptually illustrating another example of a procedure for transmitting a profile online from one terminal to another terminal, according to an embodiment of the disclosure.

FIG. 21 is a diagram conceptually illustrating another example of a procedure for transmitting a profile online from one terminal to another terminal, according to an embodiment of the disclosure.

Referring to FIG. 21, a terminal may include at least one LPA and at least one eSIM. For example, as shown in FIG. 16, a first terminal 2110 may include a first LPA 2130 and a second eSIM 2120, and a second terminal 2160 may include a second LPA 2180 and a second eSIM 2170. Details about an RSP server have been described above (for example, in FIG. 16).

In operation 21000, the first terminal 2110 and the second terminal 2160 may perform preparation procedures (profile transmission preparation procedures) required to transmit a profile. Details about the profile transmission preparation procedures will be described below with reference to FIG. 22.

In operation 21005, the second terminal 2160 may request an RSP server 2150 to transmit a profile. Details about a corresponding procedure will be described below with reference to FIG. 23.

In operation 21010, the first terminal 2110 may upload, to the RSP server 2150, a profile to be transmitted to the second terminal. Details about a corresponding procedure will be described below with reference to FIG. 24.

In operation 21015, the second terminal 2160 may download, from the RSP server 2150, the profile uploaded in operation 21010, and install the profile. Details about a corresponding procedure will be described below with reference to FIG. 25.

Figure 22:
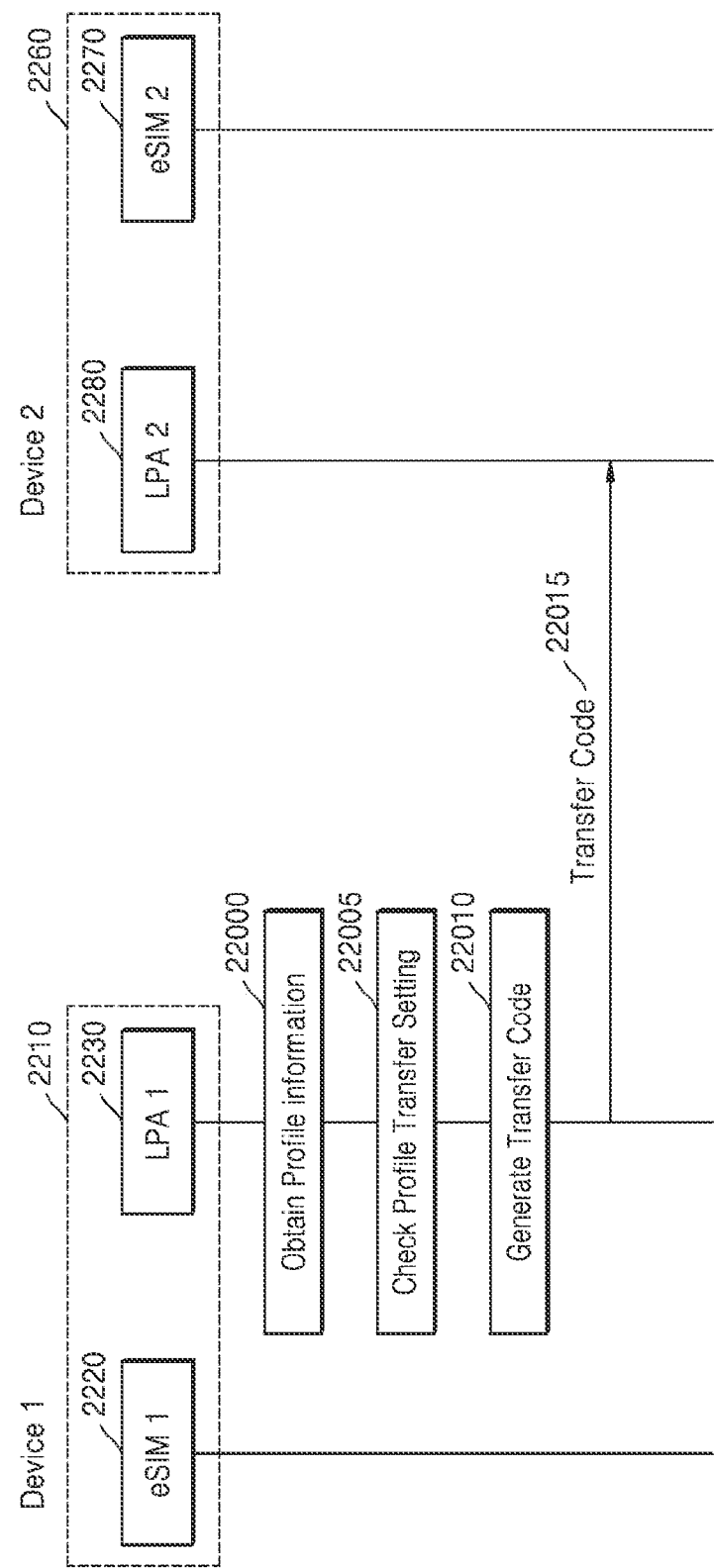
FIG. 22 is a diagram showing detailed procedures of a procedure for preparing to transmit a profile, according to an embodiment of the disclosure.

FIG. 22 is a diagram showing detailed procedures of a procedure for preparing to transmit a profile, according to an embodiment of the disclosure.

Referring to FIG. 22, a terminal may include at least one LPA and at least one eSIM. For example, a first terminal 2210 may include a first LPA 2230 and a first eSIM 2220, and a second terminal 2260 may include a second LPA 2280 and a second eSIM 2270.

According to various embodiments, the first terminal 2210 may include pre-installed profiles, and further include metadata associated with the pre-installed profiles. According to various embodiments, the first terminal 2210 may include a profile delimiter related to the pre-installed profile.

According to various embodiments, the first terminal 2210 may include a profile transfer configuration related to the pre-installed profile. According to various embodiments, the profile transfer configuration is a series of policies related to transfer of a profile between devices, and may have been generated by a mobile operator, an RSP server, or cooperation of the mobile operator and the RSP server as described above. According to various embodiments, the profile transfer configuration in the terminal may be updated by the mobile operator, the RSP server, or the cooperation of the mobile operator and the RSP server. Alternatively, the profile transfer configuration may be updated by cooperation of the terminal and at least one entity from among the mobile operator and the RSP server. A time point and/or method for updating the profile transfer configuration may be determined by a policy of the mobile operator, the RSP server, or a terminal manufacturer.

The profile transfer configuration may include a factor (or indication) indicating whether transfer of the profile between devices is allowed. Also, the profile transfer configuration may further selectively include a factor specifying a condition where the transfer of the profile between devices is allowed. For example, whether the profile is capable of being transmitted (or transferred) online from one terminal to another terminal may be configured in the profile transfer configuration. As another example, a format for transmitting the profile may be configured in the profile transfer configuration. For example, the profile may be transmitted in a form of a profile package or in a form of a profile image, or only partial data (for example, may denote a part or all of a series of updates occurred after the profile is installed in the first terminal. The update may include data stored by a user, a value set by a user, or details about an update performed by a mobile operator or an RSP server) of the profile may be transmitted. The profile transfer configuration may include information about which one(s) are allowed from among the possible transmission formats of the profile described above. Such factors may be electronically signed by at least one entity from among the RSP server, the mobile operator, a terminal manufacturer, an eUICC, or an eUICC manufacturer. A value of the electronic signature may be stored in the first terminal as a part of the profile transfer configuration or together with the profile transfer configuration.

Referring to FIG. 22, in operation 22000, the first LPA 2230 may obtain information about a profile to be transmitted. Alternatively, the information about the profile to be transmitted may be delivered to the first LPA 2230. For example, the first LPA 2230 may obtain the information about the profile to be transmitted by receiving a user input of a user selecting the profile through a UI provided by the first terminal 2210. Alternatively, the information about the profile to be transmitted may be input to the first LPA 2230 through a push input from a remote server or the first LPA 2230 may read the information about the profile to be transmitted by accessing the remote server. However, a method by which the first LPA 2230 obtains the information about the profile to be transmitted is not limited thereto.

Referring to FIG. 22, in operation 22005, the first LPA 2230 may identify whether the profile is transmittable, by using the profile transfer configuration. Also, the first LPA 2230 may identify whether online transmission of the profile is possible by checking the profile transfer configuration. Also, the first LPA 2230 may identify a format (for example, a profile image, a profile package, or partial data of the profile) for transmitting the profile by checking the profile transfer configuration.

Referring to FIG. 22, in operation 22010, the first LPA 2230 may generate a profile transmission code. The profile transmission code may include the profile delimiter of the profile to be transmitted. Also, the profile transmission code may include an address of an RSP server related to the profile to be transmitted. (Later, the second terminal 2260 may download the profile by accessing the RSP server using the address.) Also, profile transmission code may further include other information (for example, metadata of the profile or a part of the metadata) indicating an attribute of the profile. Also, the profile transmission code may include information (Supported Crypto Info) about encryption algorithms supported by the first terminal (for example, first eSIM). The information about the encryption algorithms supported by the first terminal may selectively include at least one of following pieces of information: an oval curve list supported by the first terminal, a key agreement algorithm list supported by the first terminal, and an encryption algorithm list supported by the first terminal.

Referring to FIG. 22, in operation 22015, the profile transmission code generated in operation 22010 may be transmitted from the first LPA 2230 to the second LPA 2280. The profile transmission code may be transmitted via any one of various methods.

For example, the first LPA 2230 may provide information to be transmitted to the second LPA 2280 to a first user of the first terminal through the UI of the first terminal. The first user may provide the provided information to a second user of the second terminal. The second user may input the provided information to the second LPA by using a UI of the second terminal.

Alternatively, the first LPA 2230 may generate an image (for example, a QR code) of the information to be delivered to the second LPA 2280 and display the same on a screen of the first terminal, and the second user may scan the image displayed on the screen of the first terminal by using the second terminal and transmit the information to the second LPA.

Alternatively, the first LPA 2230 may establish a connection between the first LPA 2230 and the second LPA 2280 and transmit the information to be transmitted by using the established connection. Here, the connection established between the first LPA 2230 and the second LPA 2280 may be a direct connection between devices (for example, a wireless connection, such as NFC, Bluetooth, UWB, Wi-Fi direct, LTE device-to-device (D2D), or 5G D2D, or a wired connection such as a cable connection), or a remote connection in which a remote server (for example, a relay server) is located between the first LPA 2230 and the second LPA 2280.

Figure 23:
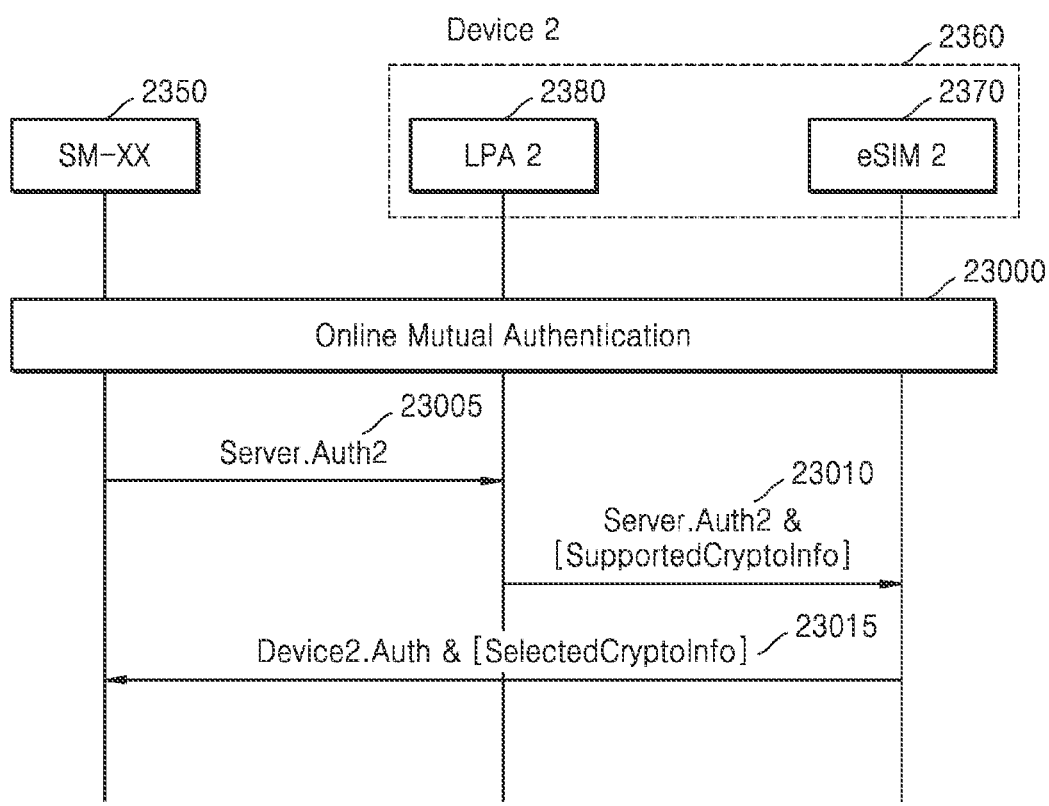
FIG. 23 is a diagram showing a procedure by which a second terminal requests an RSP server to transmit a profile, according to an embodiment of the disclosure.

FIG. 23 is a diagram showing a procedure by which a second terminal 2360 requests an RSP server 2350 to transmit a profile, according to an embodiment of the disclosure.

Referring to FIG. 23, a terminal may include at least one LPA and at least one eSIM. For example, the second terminal 2360 may include a second LPA 2380 and a second eSIM 2370. Details about the RSP server 2350 have been described with reference to FIG. 16.

Referring to FIG. 23, in operation 23000, mutual authentication may be performed between the second terminal 2360 and the RSP server 2350. Such a mutual authentication process may include at least one of following processes.

The mutual authentication process may include a certificate negotiation process to be performed for communication between the second terminal and the RSP server. For example, the second terminal may transmit, to the RSP server, pieces of certificate information that may be used to verify the RSP server and/or pieces of certificate information that may be used by the RSP server to verify the second terminal. Upon receiving such information, the RSP server may select the pieces of certificate information that may be used by the second terminal to verify the RSP server and the pieces of certificate information used by the RSP server to verify the second terminal. Here, pieces of certificate information selected by the RSP server may be transmitted to the second terminal. Through such processes, the second terminal and the RSP server may obtain the pieces of certificate information for verifying each other. Here, the certificate information may denote a certificate and/or information included in the certificate and/or a series of pieces of information that may refer to the certificate.

The second terminal may transmit, to the RSP server, a value of a random number (eUICC Challenge) generated by itself. The RSP server may electronically sign the received value or random number, and transmit the signed value to the second terminal. The second terminal may verify the received signed value to authenticate the RSP server.

The RSP server may transmit, to the second terminal, a value of a random number (server Challenge) generated by itself. The second terminal may electronically sign the received value or random number, and transmit the signed value to the RSP server. The RSP server may verify the received signed value to authenticate the second terminal.

While the RSP server and the second terminal communicate with each other, an ID (transaction ID) for managing a session may be exchanged. For example, the RSP server may generate the transaction ID and transmit a value thereof to the second terminal. Here, a value of an electronic signature of the RSP server may be added to identify reliability and integrity of the transaction ID.

The RSP server and the second terminal may exchange a profile delimiter associated with a profile to be transmitted in the disclosure. For example, the second terminal may transmit, to the RSP server, a delimiter of the profile to be received. Here, the profile delimiter may be transmitted together with the value of electronic signature of the second terminal to guarantee reliability and integrity.

The RSP server and the second terminal may exchange each other's ID. For example, the RSP server may provide its object identifier (OID) to the second terminal. As another example, the second terminal may provide its eUICC ID to the RSP server.

Referring to FIG. 23, following processes may be performed in operation 23005.

The RSP server 2350 may identify a profile transfer configuration. For example, the RSP server 2350 may identify the received profile delimiter and identify whether transmission of the profile is possible by checking the profile transfer configuration associated with the profile. Also, the RSP server 2350 may identify whether online transmission of the profile is possible by checking the profile transfer configuration. Also, the RSP server 2350 may identify a format (for example, a profile image, a profile package, or partial data of the profile) for transmitting the profile by checking the profile transfer configuration.

The RSP server 2350 may perform eligibility check to identify whether the profile is capable of being installed and used in the second terminal. For example, the RSP server 2350 may check whether the profile is capable of being installed and operable in the second terminal by using a received eUICC ID of the second terminal and the received profile delimiter.

The RSP server 2350 may generate a transfer option in response to a profile reception request of the second terminal. The transfer option may include information about whether the profile is transmittable to the second terminal, and when the transmission is possible, information about a type of transmission. For example, the transfer option may include at least one of following values.

The profile is transmittable in a form of profile image

The profile is transmittable in a form of profile package

Partial data of the profile is transmittable

Transmission of the profile is not possible

The RSP server 2350 may transmit the transfer option to the second LPA 2380. Here, the transfer option may be electronically signed by the RSP server 2350. A value of the electronic signature may be transmitted to the second LPA 2380 together with the transfer option. Also, a certificate and related information of the RSP server including an encryption key used for the electronic signature may be transmitted to the second LPA 2380.

Referring to FIG. 23, following processes may be performed in operation 23010.

The second LPA 2380 may identify the received transfer option and obtain a user's consent.

The second LPA 2380 may transmit the received transfer option to the second eSIM 2370. The second LPA 2380 may transmit the value of signature of the received transfer option to the second eSIM 2370. The second LPA 2380 may transmit, to the second eSIM 2370, a certificate and related information to be used to verify the value of electronic signature of the received transfer option.

The second LPA 2380 may selectively further transmit, to the second eSIM 2370, the Supported Crypto Info received in operation 22015.

Referring to FIG. 23, following processes may be performed in operation 23015.

The second eSIM 2370 may verify validity of the certificate and related information received in operation 23010.

The second eSIM 2370 may verify validity of the value of electronic signature received in operation 23010.

The second eSIM 2370 may identify details of the transfer option received in operation 23010.

When the Supported Crypto Info is received, the second eSIM 2370 may identify details of the received Supported Crypto Info, and identify whether encryption algorithms supported by itself are present thereamong. When the encryption algorithms supported by the second eSIM are present among the received Supported Crypto Info, the second eSIM 2370 may select one of the encryption algorithms as a selected encryption algorithm (Selected Crypto Info). The selected encryption algorithm may selectively include at least one of following pieces of information: Oval curve information, key agreement algorithm information, and encryption algorithm information.

The second eSIM 2370 may generate a public key otPK.EUICC.KA and a secret key otSK.EUICC.KA, which are a key pair for encryption to be used to generate an encryption key for encryption communication. Here, the generated encryption key may be for encryption communication between the RSP server and the second terminal or for encryption communication between the first terminal and the second terminal. Here, when the generated encryption key is for the encryption communication between the first terminal and the second terminal, the encryption key (otPK.EUICC.KA and otSK.EUICC.KA) may be an encryption key following an encryption algorithm included in the Selected Crypto Info.

The second eSIM 2370 may transmit the generated otPK.EUICC.KA to the RSP server 2350. The encryption key may be electronically signed by the second eSIM. A value of the electronic signature generated by the second eSIM may be transmitted to the RSP server. The encryption key and/or the value of electronic signature may be referred to as Device2.Auth.

The second eSIM 2370 may selectively further transmit the Selected Crypto Info to the RSP server 2350 through the second LPA 2380.

Figure 24:
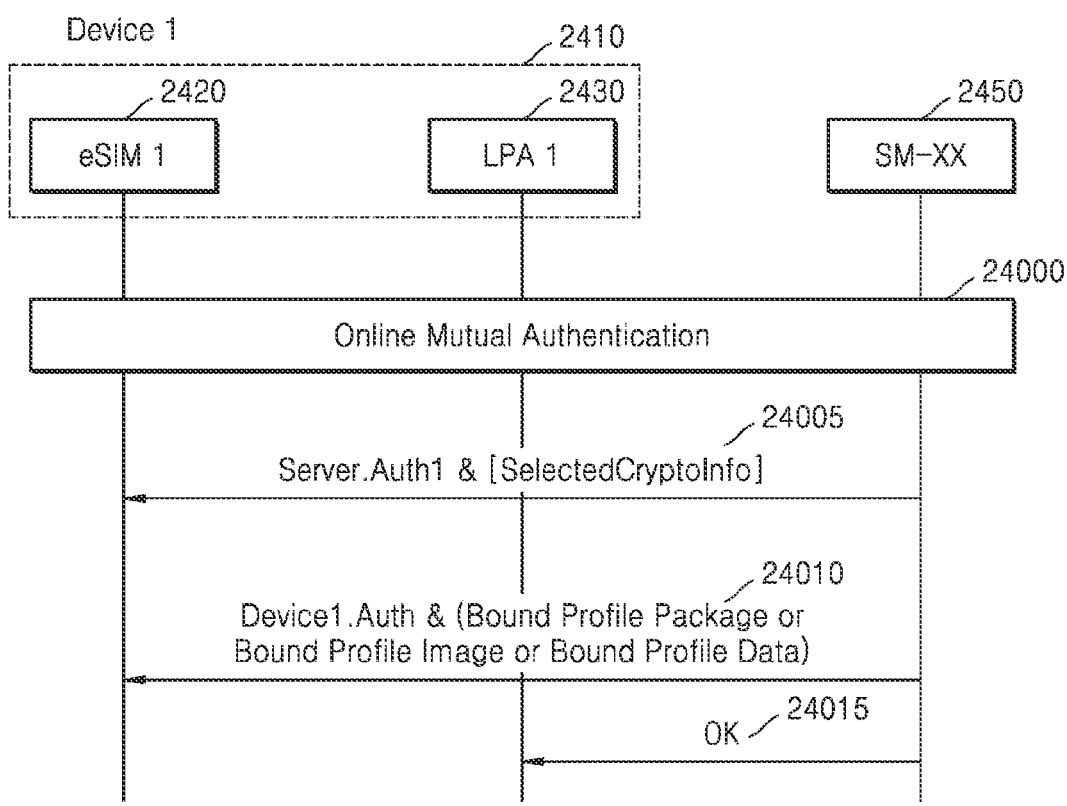
FIG. 24 is a diagram showing a procedure by which a first terminal uploads, to an RSP server, a profile to be transmitted to a second terminal, according to an embodiment of the disclosure.

FIG. 24 is a diagram showing a procedure by which a first terminal 2410 uploads, to an RSP server 2450, a profile to be transmitted to a second terminal, according to an embodiment of the disclosure.

Referring to FIG. 24, a terminal may include at least one LPA and at least one eSIM. For example, the first terminal 2410 may include a first LPA 2430 and a first eSIM 2420. Details about the RSP server 2450 have been described with reference to FIG. 16.

Referring to FIG. 24, in operation 24000, mutual authentication may be performed between the first terminal 2410 and the RSP server 2450. Such a mutual authentication process may include at least one of following processes.

The mutual authentication process may include a certificate negotiation process to be performed for communication between the first terminal 2410 and the RSP server 2450. For example, the first terminal 2410 may transmit, to the RSP server 2450, pieces of certificate information that may be used to verify the RSP server 2450 and/or pieces of certificate information that may be used by the RSP server 2450 to verify the first terminal 2410. Upon receiving such information, the RSP server 2450 may select pieces of certificate information to be used by the first terminal 2410 to verify the RSP server 2450 and pieces of certificate information to be used by the RSP server 2450 to verify the first terminal 2410. Here, the pieces of certificate information selected by the RSP server 2450 may be transmitted to the first terminal 2410. Through such processes, the first terminal 2410 and the RSP server 2450 may obtain the pieces of certificate information for verifying each other. Here, the certificate information may denote a certificate and/or information included in the certificate and/or a series of pieces of information that may refer to the certificate.

The first terminal 2410 may transmit, to the RSP server 2450, a value of a random number (eUICC Challenge) generated by itself. The RSP server 2450 may electronically sign the received value or random number, and transmit the signed value to the first terminal 2410. The first terminal 2410 may verify a value of the received signature to authenticate the RSP server 2450.

The RSP server 2450 may transmit, to the first terminal 2410, a value of a random number (server Challenge) generated by itself. The first terminal 2410 may electronically sign the received value or random number, and transmit the signed value to the RSP server 2450. The RSP server 2450 may verify the received signed value to authenticate the first terminal 2410.

While the RSP server 2450 and the first terminal 2410 communicate with each other, an ID (transaction ID) for managing a session may be exchanged. For example, the RSP server 2450 may generate the transaction ID and transmit a value thereof to the first terminal 2410. Here, a value of an electronic signature of the RSP server may be added to identify reliability and integrity of the transaction ID.

The RSP server 2450 and the first terminal 2410 may exchange a profile delimiter associated with a profile to be transmitted in the disclosure. For example, the first terminal 2410 may transmit, to the RSP server 2450, a delimiter of the profile to be transmitted. Here, the profile delimiter may be transmitted together with the value of electronic signature of the first terminal 2410 to guarantee reliability and integrity.

The RSP server 2450 and the first terminal 2410 may exchange each other's ID. For example, the RSP server 2450 may provide its object identifier (OID) to the first terminal 2410. As another example, the first terminal 2410 may provide its eUICC ID to the RSP server 2450.

Although not illustrated, the first terminal 2410 may stand by between operations 24000 and 24005.

Referring to FIG. 24, following processes may be performed in operation 24005.

The RSP server 2450 may generate a public key otPK.DP.KA and a secret key otSK.DP.KA, which are a key pair for encryption to be used to generate an encryption key for encryption communication with the first eSIM 2420.

The RSP server 2450 may transmit a public key otPK.XX.KA to the first eSIM 2420 through the first LPA 2430. Here, the otPK.XX.KA may be the otPK.EUICC.KA received in operation 23015 or otPK.DP.KA.

The RSP server 2450 may transmit a transfer option to the first eSIM 2420 through the first LPA 2430. The transfer option may include information about whether the profile is transmittable to the second terminal, and when the transmission is possible, information about a type of transmission. For example, the transfer option may include at least one of following values.

The profile is transmittable in a form of profile image
The profile is transmittable in a form of profile package
Partial data of the profile is transmittable
Transmission of the profile is not possible Here, the otPK.XX.KA and/or transfer option transmitted to the first eSIM 2420 may be electronically signed by the RSP server 2450. A value of the electronic signature may be transmitted to the first eSIM 2420 through the first LPA 2430. Also, a certificate and related information of the RSP server, which may be used to verify the electronic signature may be transmitted to the first eSIM 2420 through the first LPA 2430.

The RSP server 2450 may selectively further transmit the Selected Crypto Info received in operation 23015 to the first eSIM 2420 through the first LPA 2430.

The first terminal 2410 (for example, the first LPA 2430) may receive end user consent in relation to the received transfer option.

Referring to FIG. 24, following processes may be performed in operation 24010.

The first eSIM 2420 may verify validity of the certificate and related information received in operation 24005.

The first eSIM 2420 may verify validity of the value of electronic signature received in operation 24005.

The first eSIM 2420 may identify details of the transfer option received in operation 24005.

The first eSIM 2420 may generate a public key otPK.EUICC.KA and a secret key otSK.EUICC.KA, which are a key pair for encryption to be used to generate an encryption key for encryption communication. Here, the generated encryption key may be for encryption communication between the RSP server and the first terminal or for encryption communication between the first terminal and the second terminal. For which encryption communication the generated encryption key is used may be determined based on a value of the otPK.XX.KA received in operation 24005. The first eSIM 2420 may calculate the value of electronic signature of the generated otPK.EUICC.KA. The otPK.EUICC.KA and/or the value of electronic signature may be collectively referred to as Device1.Auth.

The first eSIM 2420 may generate a session key to be used for the encryption communication by using the otSK.EUICC.KA generated by itself and the otPK.XX.KA received in operation 24005.

The first eSIM 2420 (when necessary, with the help of first LPA) may prepare the profile to be transmitted to the second terminal. Here, a format of the prepared profile may match the transfer option received in operation 24005. In other words, the format of prepared profile may be one of followings.

Profile image
Profile package
Partial data of profile

All and/or a part of the prepared profile may be encoded by the session key. Also, the all and/or part of the prepared profile may be electronically signed by the first terminal, and a value of the electronic signature may be included as a part of the prepared profile.

The first eSIM 2420 may delete the profile. Whether to delete the profile may be notified to the RSP server 2450.

The first eSIM 2420 may transmit the Device1.Auth and/or the prepared profile to the RSP server 2450 through the first LPA 2430.

Referring to FIG. 24, in operation 24015, the RSP server 2450 may transmit, to the first LPA 2430, a response message indicating that all processes are performed.

Figure 25:
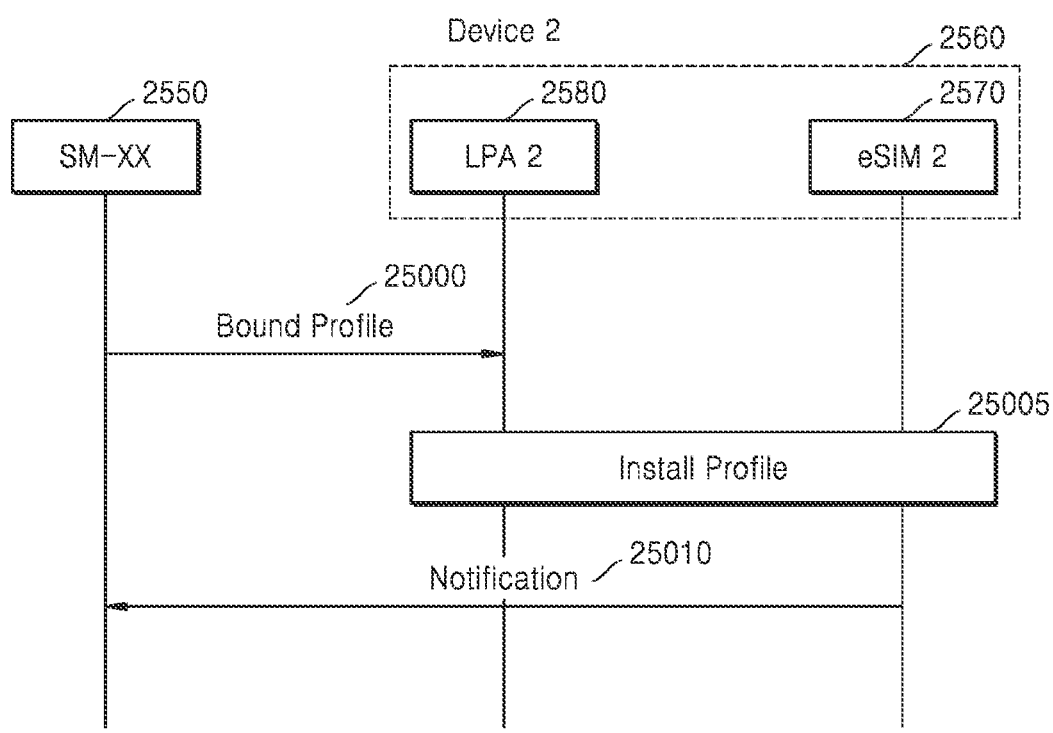
FIG. 25 is a diagram showing a procedure by which a second terminal downloads and installs a prepared profile uploaded from an RSP server, according to an embodiment of the disclosure.

FIG. 25 is a diagram showing a procedure by which a second terminal 2560 downloads and installs a prepared profile uploaded from an RSP server 2550, according to an embodiment of the disclosure.

Referring to FIG. 25, a terminal may include at least one LPA and at least one eSIM. For example, the second terminal 2560 may include a second LPA 2580 and a second eSIM 2570. Details about the RSP server 2550 have been described with reference to FIG. 16.

Although not illustrated, the second terminal 2560 may stand by until operation 25000 described below is performed after operation 23015 proposed in FIG. 23 is performed. Such a standing by process may be performed via any one of various methods described below. However, the standing by process is not limited thereby, and is not necessarily be one of the methods described below.

a) The RSP server 2550 may transmit, to the second LPA 2580, a message indicating that a requested operation has been received for now but needs to stand by until a response is received. The second LPA 2580 may stand by for a certain period of time, and then transmit a message to the RSP server 2550 to verify whether the requested operation has been performed. When performing of the operation is completed, operation 25000 may be performed. When performing of the operation is not completed, the RSP server 2550 may transmit a message indicating to stand by a little longer. In this case, the second LPA 2580 may stand by for a certain period of time again, and then transmit a message again to the bundle management server to verify whether the requested operation has been performed. Such processes may be repeated until operation 25000 is performed.

b) The second LPA 2580 may stand by until operation 25000 is performed within a determined time range. When operation 25000 is not performed within the determined time, profile transmission may be stopped.

c) The RSP server 2550 may notify the second LPA 2580 that the requested operation has been received. (For example, the RSP server may transmit a push message to the second LPA.) Then, operation 25000 may be performed.

Referring to FIG. 25, following processes may be performed in operation 25000.

The RSP server 2550 may verify validity of the value of electronic signature of the Device2.Auth received in operation 23015.

The RSP server 2550 may identify details of the Device2.Auth received in operation 23015.

The RSP server 2550 may generate a public key otPK.DP.KA and a secret key otSK.DP.KA, which are a key pair for encryption to be used to generate an encryption key for encryption communication. Here, the generated encryption key may be for encryption communication between the RSP server and the second terminal. The RSP server may generate a session key for encryption communication with the second terminal, by using the generated key pair for encryption.

The RSP server 2550 may prepare a bound profile to be transmitted to the second terminal.

Here, the prepared bound profile may be in one of following formats.

The profile image received in operation 24010
The profile package received in operation 24010

A profile package and/or image generated by including the partial data of the profile received in operation 24010

A profile package or image including, as additional data, the partial data of the profile received in operation 24010.

When the data received in operation 24010 is encoded by the session key for encryption communication between the first terminal and the RSP server, following processes may be additionally performed. The RSP server may decode the received data. The RSP server may encode the decoded data by the session key for encryption communication between the second terminal and the RSP server.

The RSP server 2550 may transmit the bound profile to the second LPA 2580.

Referring to FIG. 25, following processes may be performed in operation 25005.

The second LPA 2580 may verify the received bound profile. For example, the second LPA 2580 may identify and verify details of metadata included in the bound profile. Also, the second LPA 2580 may receive end user consent in relation to the bound profile.

The second LPA 2580 and the second eSIM 2570 may install the received bound profile in the second eSIM.

Referring to FIG. 25, in operation 25010, the second eSIM 2570 may notify the RSP server 2550 through the second LPA 2580 that the profile is installed.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments have been described in the detailed description of the disclosure, but various modifications may be possible without departing from the scope of the disclosure. Therefore, the scope of the disclosure should not be limited to the embodiments described above, but should be determined not only by the scope of the following claims, but also by the equivalents of the claims.

It should be understood that the various embodiments of the disclosure and the terms used herein are not intended to limit the techniques described in the disclosure to specific embodiments, and include various modifications, equivalents, and/or alternatives of corresponding embodiments. In relation to the description of drawings, like reference numerals may denote like elements. An expression used in the singular may encompass the expression in the plural, unless it has a clearly different meaning in the context. In the disclosure, the expression such as "A or B", "at least one of A and/or B", "A B, or C", or "at least one of A, B, and/or C", include all possible combinations of listed elements. Expressions such as "first", "second", and the like may modify corresponding elements regardless of their order or importance, and are merely used to distinguish one element from another and do not limit the corresponding elements. When an element (for example, a first element) is "(functionally or communicably) connected" or "accessed" to another element (for example, a second element), the element may be connected to the other element directly or via another element (for example, a third element).

The term "module" used in the disclosure includes a unit consisting of hardware, software, or firmware, and for example, may be interchangeably used with the term such as logic, a logical block, a component, or a circuit. The module may be an integrally configured component, a minimum unit performing one or more functions, or a part thereof. For example, the module may be configured as an application-specific integrated circuit (ASIC).

Various embodiments of the disclosure may be implemented as a machine (for example, computer)-readable storage media (for example, software including instructions stored in an internal memory or external memory (for example, a program). The machine is an apparatus capable of invoking a stored instruction from a storage medium and operating according to the invoked instruction, and may include a terminal according to various embodiments. When the instruction is executed by a processor (for example, the processor 1420 of FIG. 14), the processor may perform a function corresponding to the instruction directly or by using other components controlled by the processor. The instruction may include code generated or executed by a compiler or interpreter.

A machine-readable storage medium may be provided in a form of a non-transitory storage medium. The term "non-transitory" only means that a storage medium does not include a signal and is tangible, and does not distinguish whether data is stored in the storage medium semi-permanently or temporarily.

A method according to various embodiments of the disclosure may be provided by being included in a computer program product. The computer program products are products that can be traded between sellers and buyers. The computer program product may be distributed in a form of machine-readable storage medium (for example, a compact disc read-only memory (CD-ROM)), or distributed through an application store (for example, Play Store™) online. In the case of online distribution, at least a part of the computer program product may be temporarily stored or temporarily generated in the storage medium such as a server of a manufacturer, a server of an application store, or a memory of a relay server. Each of components (e.g., modules or programs) according to the various embodiments may include a single or plurality of entities, and some sub-components among the above-described sub-components may omitted, or other sub-components may be further included in various embodiments. Alternatively or additionally, some components (e.g., modules or programs) may be integrated into one entity, and functions performed by each component prior to the integration may be performed identically or similarly. Operations performed by modules, programs, or other components, according to various embodiments, may be sequentially, parallel, repetitively or heuristically executed, at least some operations may be executed in a different order or omitted, or other operations may be added.

The invention claimed is:

1. A first terminal for providing a bundle to a second terminal in a wireless communication system, the first terminal comprising:
   a transceiver; and
   at least one processor configured to:
   obtain information about the bundle to be transmitted to the second terminal;
   based on bundle transfer configuration information including an indicator indicating whether the first terminal is able to transmit a bundle to another terminal, determine that the first terminal is able to transmit the bundle to the second terminal;

generate a bundle transmission code including identification information of the bundle to be transmitted to the second terminal;

transmit the generated bundle transmission code to the second terminal;

upload the bundle to be transmitted to the second terminal to a bundle management server:

transmit, to the bundle management server, bundle transfer authentication information including at least one of first smart secure platform (SSP) information of the first terminal, certificate negotiation information for authentication between the first terminal and the bundle management server, or version information of the first SSP; and receive server authentication information from the bundle management server, based on the transmitted bundle transfer authentication information, wherein the bundle to be transmitted to the second terminal is installed in the second terminal by being transmitted to the second terminal through the bundle management server.

2. The first terminal of claim 1, wherein the bundle transfer configuration information comprises at least one of information about a condition required for bundle transmission between the first terminal and the second terminal, or an indicator indicating whether bundle transmission between the first terminal and the second terminal through the bundle management server is allowed.

3. The first terminal of claim 1, wherein the identification information of the bundle comprises at least one of an identity (ID), a bundle family ID (Fid), or a bundle family custodian object ID (Oid) of the bundle to be transmitted to the second terminal, and the bundle transmission code further comprises at least one of information related to an attribute of the bundle to be transmitted to the second terminal, an address of the bundle management server, information for connecting the first terminal and the second terminal, or encryption algorithm information supported by the first terminal.

4. The first terminal of claim 1, wherein the at least one processor is further configured to:

transmit, to the bundle management server, first terminal authentication information and a bundle ID of the bundle to be transmitted to the second terminal, based on the received server authentication information;

receive a bundle request message from the bundle management server, in response to the bundle management server determining, based on the first terminal authentication information, the first terminal as a terminal capable of transmitting the bundle to be transmitted to the second terminal; and upload the bundle to be transmitted to the second terminal to the bundle management server, based on the received bundle request message.

5. A second terminal for receiving a bundle from a first terminal in a wireless communication system, the second terminal comprising:

a transceiver; and at least one processor configured to:

receive, from the first terminal, a bundle transmission code including identification information of the bundle to be received by the second terminal;

perform an authentication procedure with a bundle management server, based on the received bundle transmission code;

transmit, to the bundle management server, information of the bundle to be received, in response to the authentication procedure with the bundle management server being successfully performed;

receive first bundle and first bundle information, in response to the bundle management server determining that a bundle received by the second terminal corresponds to the bundle to be received;

transmit, to the bundle management server, second smart secure platform (SSP) information including certificate negotiation information for authentication between the bundle management server and a second SSP of the second terminal; and receive, from the bundle management server, server authentication information generated by the bundle management server based on the second SSP information.

6. The second terminal of claim 5, wherein the identification information of the bundle to be received by the second terminal comprises at least one of an identity (ID), a bundle family ID (Fid), or a bundle family custodian object ID (Oid) of the bundle to be received by the second terminal, and the bundle transmission code further comprises at least one of information related to an attribute of the bundle to be received by the second terminal, an address of the bundle management server, information for connecting the first terminal to the second terminal, or encryption algorithm information supported by the first terminal.

7. The second terminal of claim 5, wherein the at least one processor is further configured to:

transmit, to the bundle management server, second terminal information including an ID of the second SSP and an ID of the bundle to be received, based on the server authentication information; and receive, from the bundle management server, the first bundle and the first bundle information, in response to the bundle management server determining that an ID of the second SSP received from the first terminal and the identification information of the bundle to be received by the second terminal respectively correspond to the ID of the second SSP received from the second terminal and the ID of the bundle to be received.

8. The second terminal of claim 5, wherein the bundle management server is configured to determine the second terminal as a terminal capable of receiving a bundle from another terminal, based on bundle transfer configuration information, and the bundle management server is configured to determine the bundle to be received as a bundle capable of being installed in the second terminal.

9. A first terminal for providing a profile to a second terminal in a wireless communication system, the first terminal comprising:

a transceiver; and at least one processor configured to:

determine a first profile to be transmitted to the second terminal from among profiles installed in the first terminal;

determine that the first profile is capable of being transmitted to the second terminal through a profile management server, based on profile transfer configuration information including an identity (ID) of an embedded universal integrated circuit card (eUICC) of the second terminal;

transmit, to the profile management server, first terminal authentication information including a first profile ID and eUICC ID of the first terminal, in response to verifying the profile management server;

receive a profile request message from the profile management server, in response to the profile management server verifying that the first terminal is using the first profile, by using the first profile ID and eUICC ID of the first terminal;

transmit, to the profile management server, a profile package for the first profile, based on the profile request message;

when the transmitted profile package for the first profile is encoded by the first terminal, decode the profile package for the first profile by using a first public key of the first terminal and a secret key of the second terminal; and when the transmitted profile package for the first profile is encoded by the profile management server, decode the profile package for the first profile by using a second public key of the profile management server and the secret key of the second terminal.

10. The first terminal of claim 9, wherein the at least one processor is further configured to receive, from the second terminal, the profile transfer configuration information including the ID of the eUICC and eUICC information of the second terminal, wherein the eUICC information of the second terminal comprises information used to determine whether a profile to be received from the first terminal is capable of being normally installed and operated in the eUICC of the second terminal.

11. The first terminal of claim 9, wherein the at least one processor is further configured to:

transmit the eUICC information of the first terminal to the profile management server;

receive server authentication information of the profile management server, generated by the profile management server based on the eUICC information of the first terminal; and verify the profile management server based on the eUICC information of the first terminal and the server authentication information of the profile management server.

12. The first terminal of claim 9, wherein the profile package comprises at least one of information about the first profile, first encryption key generation information used by the first terminal to encode the first profile, a first public key of the first terminal, second encryption key generation information used by the profile management server to encode the first profile, or a second public key of the profile management server.

13. A second terminal for receiving a profile from a first terminal in a wireless communication system, the second terminal comprising:

a transceiver; and at least one processor configured to:

transmit, to the first terminal, profile transfer configuration information including an identity (ID) of an embedded universal integrated circuit card (eUICC) of the second terminal;

transmit eUICC information of the second terminal to a profile management server;

receive authentication information of the profile management server, based on the eUICC information of the second terminal;

transmit, to the profile management server, second terminal authentication information including an ID of a profile to be received and an eUICC ID of the second terminal, in response to verifying the profile management server based on the authentication information of the profile management server;

receive a profile package for a first profile from the profile management server, based on the second terminal authentication information:

when the received profile package for the first profile is encoded by the first terminal, decode the profile package for the first profile by using the first public key of the first terminal and a secret key of the second terminal; and when the received profile package for the first profile is encoded by the profile management server, decode the profile package for the first profile by using the second public key of the profile management server and the secret key of the second terminal.

14. The second terminal of claim 13, wherein the second terminal authentication information comprises information used to determine whether a profile to be received from the first terminal is capable of being normally installed and operated in the eUICC of the second terminal.

15. The second terminal of claim 13, wherein the profile package comprises at least one of information about the first profile, first encryption key generation information used by the first terminal to encode the first profile, a first public key of the first terminal, second encryption key generation information used by the profile management server to encode the first profile, or a second public key of the profile management server.

* * * * *